(12) United States Patent
Nakano et al.

(10) Patent No.: US 11,693,509 B2
(45) Date of Patent: Jul. 4, 2023

(54) SENSING DEVICE AND DRIVING METHOD OF SENSING DEVICE

(71) Applicant: Japan Display Inc., Tokyo (JP)

(72) Inventors: Fumihoru Nakano, Tokyo (JP); Naoki Takada, Tokyo (JP); Takayuki Nakanishi, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/900,327

(22) Filed: Aug. 31, 2022

(65) Prior Publication Data
US 2023/0076426 A1 Mar. 9, 2023

(30) Foreign Application Priority Data

Sep. 6, 2021 (JP) .................................. 2021-145066

(51) Int. Cl.
*G06F 3/041* (2006.01)
*G06F 3/044* (2006.01)
*G06F 3/047* (2006.01)

(52) U.S. Cl.
CPC .......... *G06F 3/04166* (2019.05); *G06F 3/047* (2013.01); *G06F 3/0416* (2013.01); *G06F 3/0443* (2019.05); *G06F 3/0446* (2019.05); *G06F 2203/04108* (2013.01)

(58) Field of Classification Search
CPC ...... G06F 3/0446; G06F 3/0416; G06F 3/047; G06F 3/04166; G06F 3/041662; G06F 3/041661; G06F 3/044; G06F 3/0443; G06F 3/0445; G06F 3/0412; G06F 2203/04108
See application file for complete search history.

(56) References Cited

U.S. PATENT DOCUMENTS

| | | | | |
|---|---|---|---|---|
| 9,804,711 | B2* | 10/2017 | Noguchi | G06F 3/0446 |
| 10,712,847 | B2* | 7/2020 | Kim | G06F 3/0412 |
| 2015/0248180 | A1 | 9/2015 | Wakuda | |
| 2017/0090610 | A1* | 3/2017 | Shepelev | G06F 3/04166 |
| 2017/0315655 | A1* | 11/2017 | Weinerth | G06F 3/0446 |
| 2018/0204037 | A1* | 7/2018 | Hargreaves | G06V 40/1306 |
| 2020/0257387 | A1* | 8/2020 | Tanemura | G06F 3/0443 |
| 2020/0272329 | A1* | 8/2020 | Tang | G06F 3/044 |

FOREIGN PATENT DOCUMENTS

| | | | |
|---|---|---|---|
| JP | 2015-166921 A | 9/2015 | |
| WO | WO-2019172053 A1 * | 9/2019 | G06F 3/04166 |

* cited by examiner

*Primary Examiner* — Darlene M Ritchie
(74) *Attorney, Agent, or Firm* — K&L Gates LLP

(57) ABSTRACT

A sensing device includes a plurality of sensing electrodes arranged in the row and column directions to detect a close object, a plurality of wirings connected to each of the plurality of sensing electrodes, a sensing circuit connected to the plurality of wirings and detecting voltage values of a plurality of sensing electrodes in a plurality of sensing periods and a calculation circuit calculating a position of the close object in proximity using the voltage values detected by the sensing circuit. The sensing circuit uses a set of sensing electrodes adjacent to each other in row and column direction as a sensing unit, sets the plurality of sensing periods consecutively, and changes the sensing electrodes included in the sensing unit to be different by one row in the row direction or one column for each sensing periods.

16 Claims, 39 Drawing Sheets

Graph used in S413
S413: judgment of presence or absence of sensing object,
comparison of difference value (|ΔV|>Th,Sum(|ΔV|)>Th)

| Bundle Scan No. | 0 | 1 | 2 | 3 | 4 | 5 | 6 | 7 | 8 |
|---|---|---|---|---|---|---|---|---|---|
| electrode ratio of HS(1,1) | 1 | 1 | 1 | 1 | 1/2 | 1/2 | 1/4 | 1/2 | 1/2 |
| electrode ratio of HS(1,4) | 1 | 1/2 | 1 | 1/2 | 1 | 1 | 1 | 1/2 | 1/4 |
| electrode ratio of HS(10,1) | 1 | 1 | 1/2 | 1/2 | 1/4 | 1/2 | 1/2 | 1 | 1 |
| electrode ratio of HS(10,4) | 1 | 1/2 | 1/2 | 1/4 | 1/2 | 1 | 1 | 1 | 1/2 |

SENSING DEVICE AND DRIVING METHOD OF SENSING DEVICE

CROSS-REFERENCE TO RELATED APPLICATIONS

This application is based upon and claims the benefit of priority from the prior Japanese Patent Application No. 2021-145066 filed on Sep. 6, 2021, the entire contents of which are incorporated herein by reference.

FIELD

An embodiment of the present invention relates to a sensing device and a driving method of the sensing device.

BACKGROUND

A touch panel and a proximity sensor are known as an interface for a user to input data into a display device. By providing a touch panel or a proximity sensor on a display device, an operator can operate input buttons, icons, and the like displayed on a screen using the operator's fingers or a touch pen. The display device having a proximity sensor has a function, so-called hover sensing (proximity sensing), that senses, for example, the proximity state of the operator's finger while not touching the screen with the operator's finger.

For example, a display device having a hover sensing function includes a plurality of hover-detectable electrodes. In the following descriptions, a display device having a hover sensing function or a device having a hover sensing function is collectively referred to as a sensing device, and a hover detectable electrode is referred to as a sensing electrode. In recent years, a sensing device that improves the sensitivity of hover sensing by bundling a plurality of sensing electrodes has been developed.

SUMMARY

A sensing device in an embodiment according to the present invention includes a plurality of sensing electrodes arranged in a row and column direction to detect a close object, a plurality of wirings connected to each of the plurality of sensing electrodes, a sensing circuit connected to the plurality of wirings and detecting voltage values of the plurality of sensing electrodes in a plurality of sensing periods and a calculation circuit connected to the sensing circuit and calculating a position of the close object in proximity using the voltage values detected by the sensing circuit. In the sensing device, the sensing circuit uses a set of sensing electrodes adjacent to each other in the row direction and column direction as a sensing unit, sets the plurality of sensing periods consecutively, and changes the sensing electrodes included in the sensing unit to be different by one row in the row direction or one column for each sensing periods.

A driving method of a sensing device in an embodiment according to the present invention including a plurality of sensing electrodes arranged in a row and column direction to detect a close object, a plurality of wirings connected to each of the plurality of sensing electrodes, a sensing circuit connected to the plurality of wirings and detecting the voltage of the plurality of sensing electrodes by a plurality of sensing periods, and a calculation circuit connected to the sensing circuit. The method includes detecting voltage values of the plurality of sensing electrodes using a set of sensing electrodes adjacent to each other in the row direction and the column direction among the plurality of sensing electrodes that is used as a sensing unit, in a plurality of sensing periods, and calculating a position of a close object using the detected voltages of the plurality of sensing electrodes. In addition, the method includes setting the plurality of sensing periods consecutively, and changing the sensing electrodes included in the sensing unit to be different by one row in the row direction or one column in the column direction for each sensing periods.

BRIEF DESCRIPTION OF DRAWINGS

Figure 29:
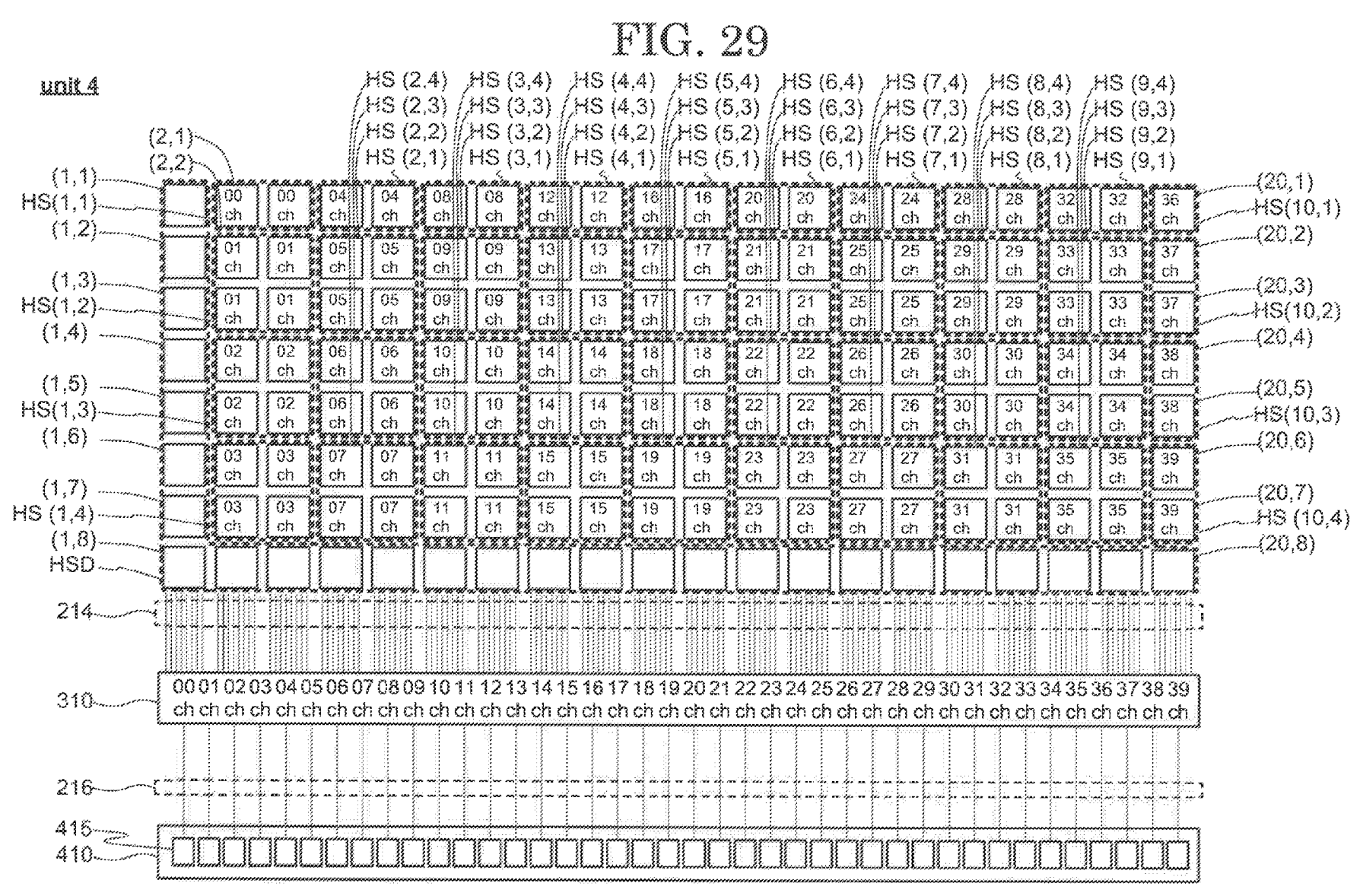

FIG. 29 is a diagram for explaining a bundle scan 4 (bundlescan4) of a driving method of a sensing device according to the third embodiment.

FIG. 34 is a diagram showing an example of size ratios of sensing electrodes in each bundle scan of a driving method of a sensing device according to the third embodiment.

Figure 36:
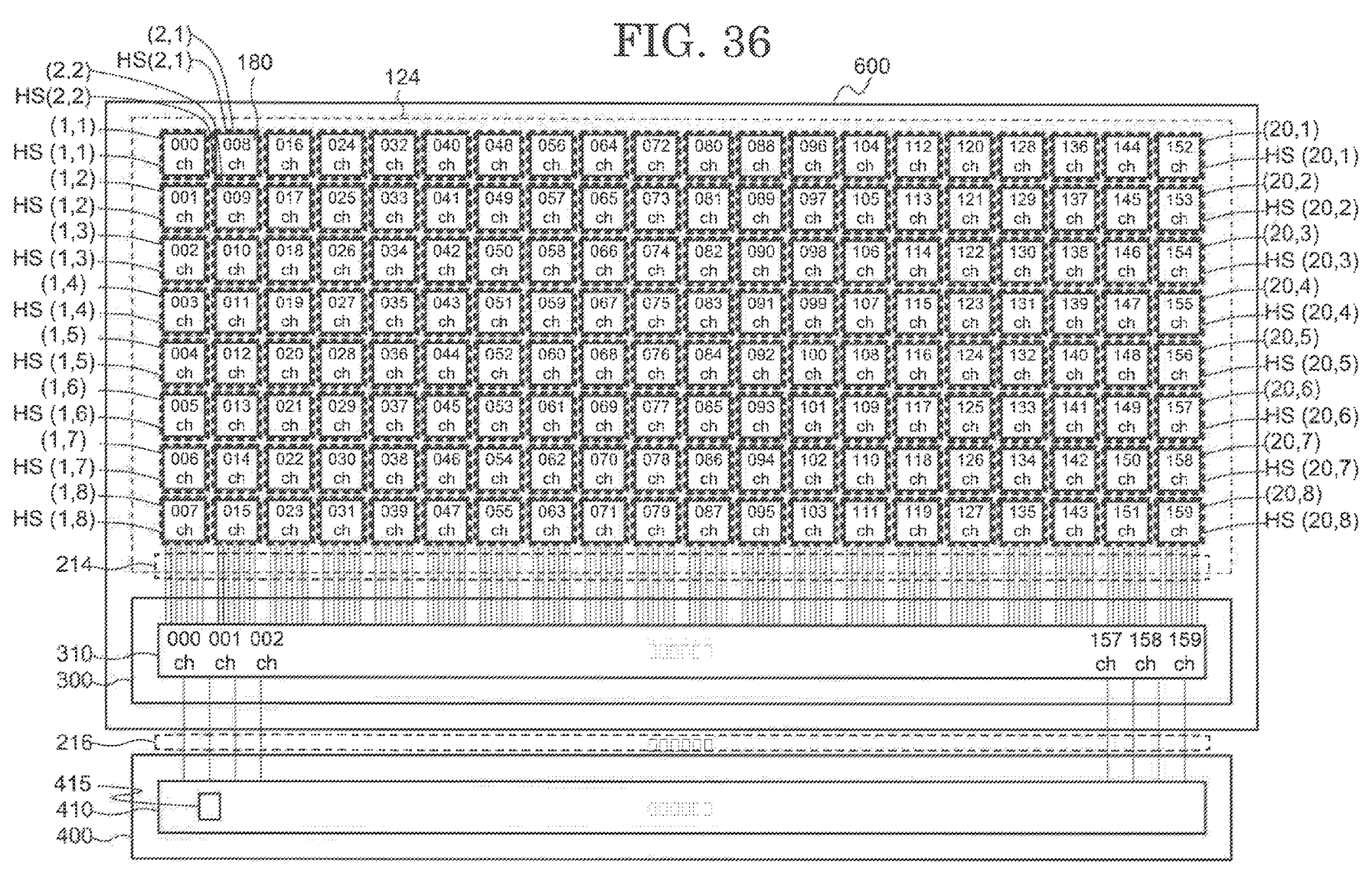

FIG. 36 is a schematic plan view showing a configuration of a sensing electrode, an electrode-connecting circuit, and a sensing circuit according to the fifth embodiment of the present invention.

DESCRIPTION OF EMBODIMENTS

Embodiments of the present invention will be described below with reference to the drawings and the like. However, the present invention can be implemented in many different modes and should not be construed as being limited to the description of the following embodiments. For clarity of explanation, although the drawings may be schematically represented with respect to configurations and the like of the respective parts as compared with actual embodiments, they are merely examples and do not limit the interpretation of the present invention. Further, in the present specification and each drawing, the same symbols (or symbols denoted by A, B, a, b, etc. after numerals) are given to the same elements as those described previously with reference to the preceding drawings, and a detailed description thereof may be omitted as appropriate. The words "first" and "second" attached to each element are convenient labels used to distinguish each element and have no further meaning unless otherwise stated.

In a sensing device, it is known that the accuracy of hover sensing differs depending on the position of a sensing electrode in the sensing device. In recent years, as the accuracy of hover sensing is different, a decrease in the sensing accuracy of hover sensing has become a problem.

One object of an embodiment of the present invention is to provide a sensing device in which the accuracy of hover sensing is improved in view of the above problem.

In some embodiments described below, a sensing device capable of improving the accuracy of hover sensing and a driving method of the sensing device will be exemplified.

1. First Embodiment

<1-1. Hardware Configuration of Sensing Device 10>

Figure 1:
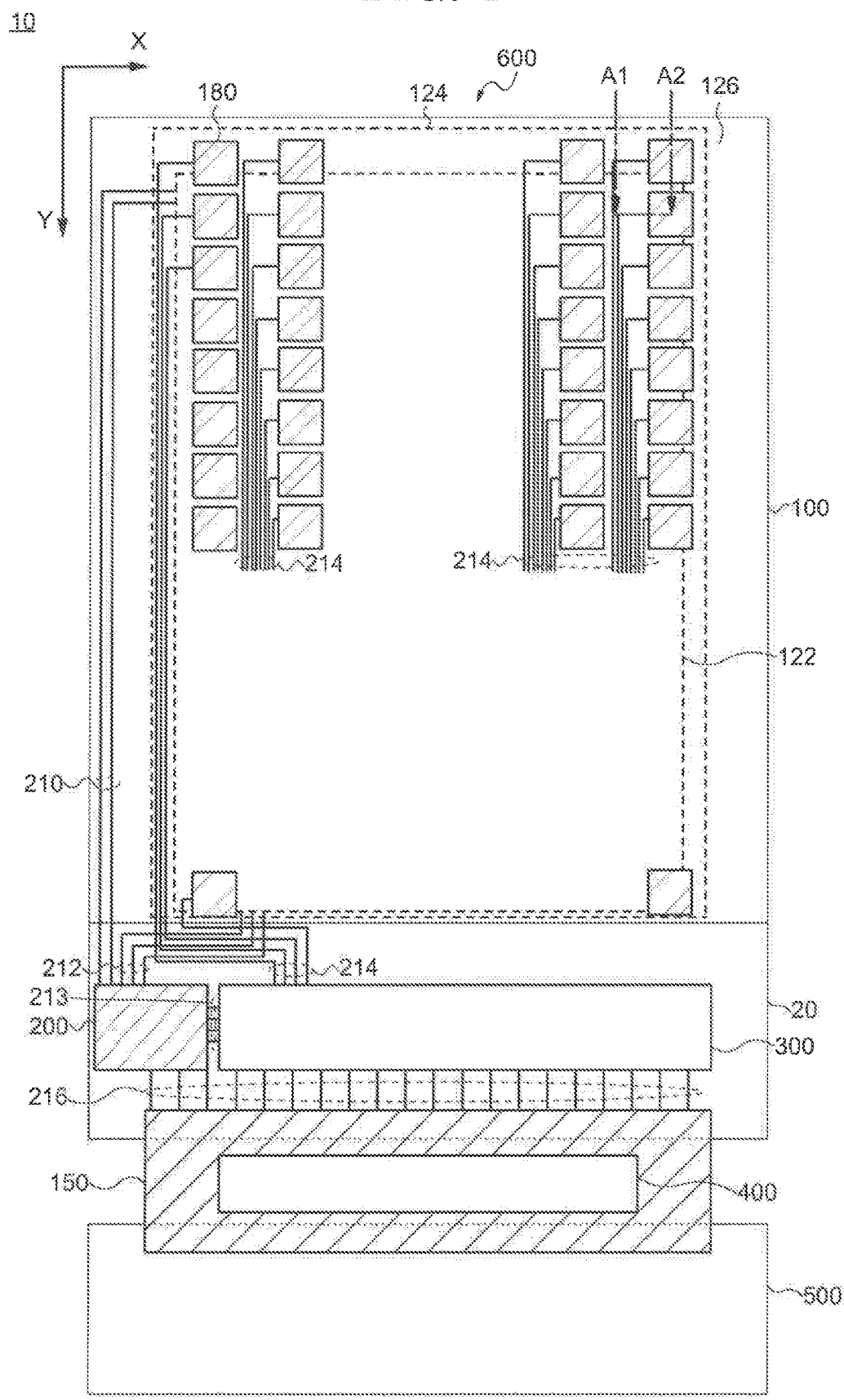
FIG. 1 is a schematic plan view showing a configuration of a sensing device according to an embodiment of the present invention.
Figure 2:
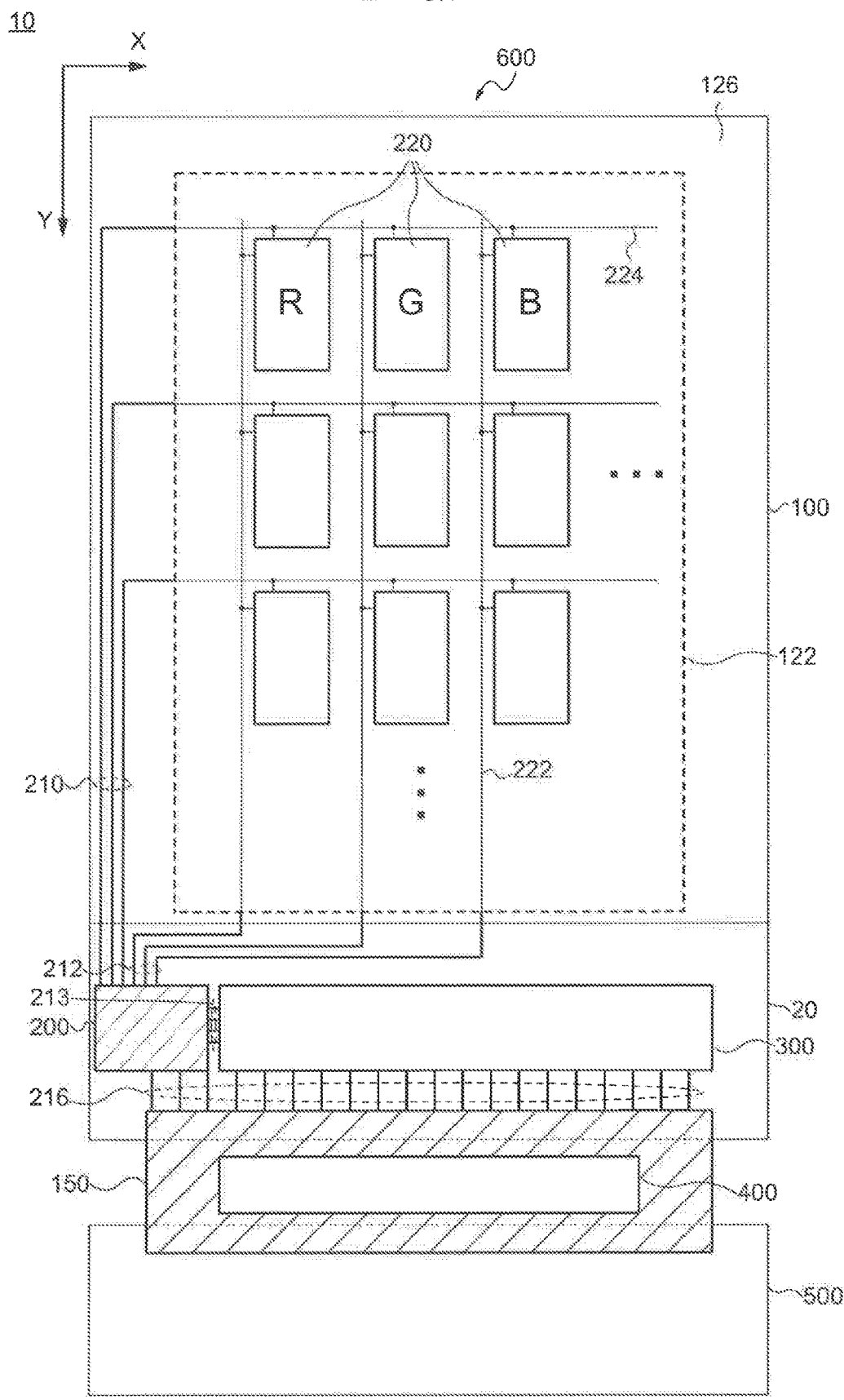
FIG. 2 is a schematic plan view showing a configuration of a sensing device according to an embodiment of the present invention.
Figure 4:
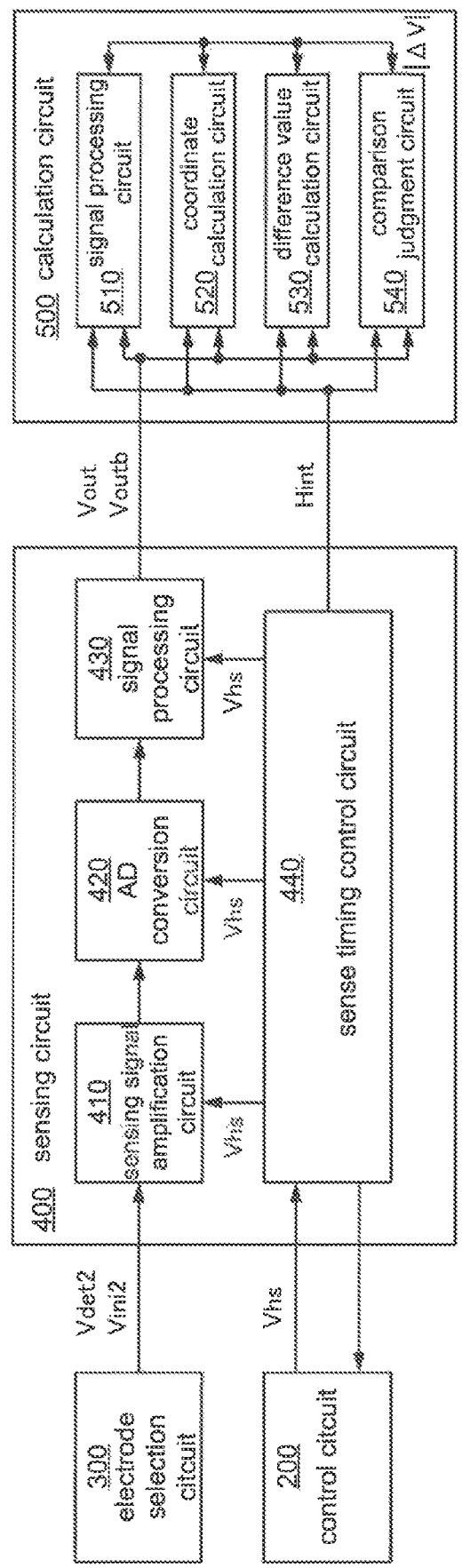
FIG. 4 is a plan view showing a functional configuration of a sensing device according to an embodiment of the present invention.

FIG. 1 is a schematic plan view showing an example of a sensing device 10 according to an embodiment of the present invention. FIG. 2 is a schematic plan view showing an example of a display panel 600 according to an embodiment of the present invention. The hardware configuration of the sensing device 10 shown in FIG. 1 and FIG. 4 is an example, and the hardware configuration of the sensing device 10 is not limited to the configuration shown in FIG. 1 and FIG. 2.

As shown in FIG. 1 or FIG. 2, the sensing device 10 includes a flexible printed substrate 150, an electrode selection circuit 300, a sensing circuit 400, a calculation circuit 500, and a display panel 600.

The display panel 600 and the calculation circuit 500 are electrically connected using the flexible printed substrate 150. The sensing circuit 400 is provided on the flexible printed substrate 150.

The display panel 600 includes a substrate 20, a counter substrate 100, a display 122, a proximity sensor unit 124, a periphery portion 126, a control circuit 200, a wiring 210, a wiring 212, a wiring 213, a wiring 214, a wiring 216, and the electrode selection circuit 300.

The substrate 20 and the counter substrate 100 are bonded by a sealing portion provided between the substrate 20 and the counter substrate 100 (not shown). The sealing portion is provided on the periphery portion 126. The display 122, the proximity sensor unit 124, and the periphery portion 126 are provided on the substrate 20. The wiring 210, the wiring 212, the wiring 213, the wiring 214, and the wiring 216 are arranged on the substrate 20.

The display 122 and the proximity sensor unit 124 are surrounded by the counter substrate 100 and the periphery portion 126. A plurality of pixels 220 is arranged in a matrix in the lateral direction (row direction, X-direction) and the vertical direction (column direction, Y-direction) in the display 122. Each of the plurality of pixels 220 is electrically connected to the control circuit 200 and the electrode selection circuit 300 using the wiring 210 and the wiring 212. A plurality of sensing electrodes 180 is arranged in a matrix in the lateral direction (row direction, X-direction) and the vertical direction (column direction, Y-direction) in the proximity sensor unit 124. Each of the plurality of sensing electrodes 180 is electrically connected to the electrode selection circuit 300 using the wiring 214.

As will be described in detail later, in the sensing device 10, one proximity sensor HS (FIG. 10) for detecting a sensing object is configured using k (k is a positive integer) electrodes among the plurality of sensing electrodes 180. The sensing device 10 detects the sensing object using a plurality of proximity sensors HS configured using k electrodes. For example, the coefficient k in the sensing device 10 is 4. The sensing object in the sensing device 10 is referred to as a "proximity object". The proximity sensor HS senses a voltage (voltage change) of the sensing object using a set of sensing electrodes (four sensing electrodes when k=4) adjacent to each other in the row direction and column direction among the plurality of sensing electrodes 180 as a sensing unit.

The control circuit 200 is electrically connected to the wiring 213 and the wiring 216 by, for example, a COG (Chip on Glass) method or a COF (Chip on Film) method. In addition, the control circuit 200 is electrically connected to the electrode selection circuit 300 using the wiring 213. The control circuit 200 and the electrode selection circuit 300 are electrically connected to a plurality of terminals (not shown) using the wiring 216. The plurality of terminals is arranged in a terminal part (not shown). The plurality of terminals is electrically connected to the flexible printed substrate 150. The control circuit 200, the electrode selection circuit 300, and the terminal part are arranged above the substrate 20 exposed from the counter substrate 100 in the Y-direction.

Figure 7:
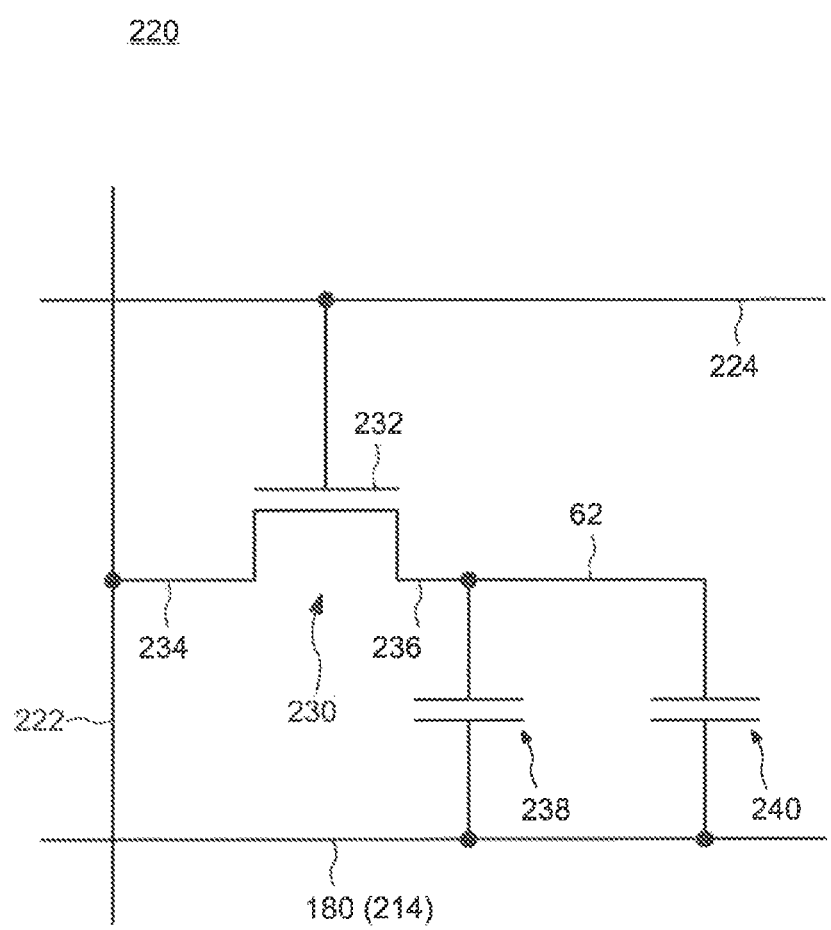
FIG. 7 is an equivalent circuit diagram showing a configuration of a pixel of a display panel according to an embodiment of the present invention.

The arrangement of the plurality of pixels 220 is, for example, a striped arrangement. Each of the plurality of pixels 220 may correspond to, for example, a sub-pixel R, a sub-pixel G, and a sub-pixel B. One pixel may be formed by three sub-pixels. The pixel 220 is the smallest unit that constitutes a part of an image reproduced on the display 122. Each sub-pixel is provided with one display element. The display element is, for example, a liquid crystal element, an organic electroluminescence (EL) element, or the like. In the example of the present embodiment, the display element is a liquid crystal element 240 (FIG. 7). A color corresponding to the sub-pixel is determined by the characteristics of the liquid crystal element 240 or a color filter provided on the sub-pixel (not shown).

The stripe arrangement can be configured so that the sub-pixel R, the sub-pixel G, and the sub-pixel B have different colors. For example, each of the sub-pixel R, the sub-pixel G, and the sub-pixel B can be provided with a color filter layer 90 (FIG. 5) that emits three primary colors of red, green, and blue, respectively. An optional voltage or current is supplied to each of the three sub-pixels, and the display panel 600 can display an image.

For example, a source wiring 222 is connected to the wiring 212, extends in the Y-direction, and is connected to the plurality of pixels 220 arranged in the Y-direction. For example, a gate wiring 224 is connected to the wiring 210, extends in the X-direction, and is connected to the plurality of pixels 220 arranged in the X-direction.

<1-2. Functional Configuration of Sensing Device 10>

Figure 3:
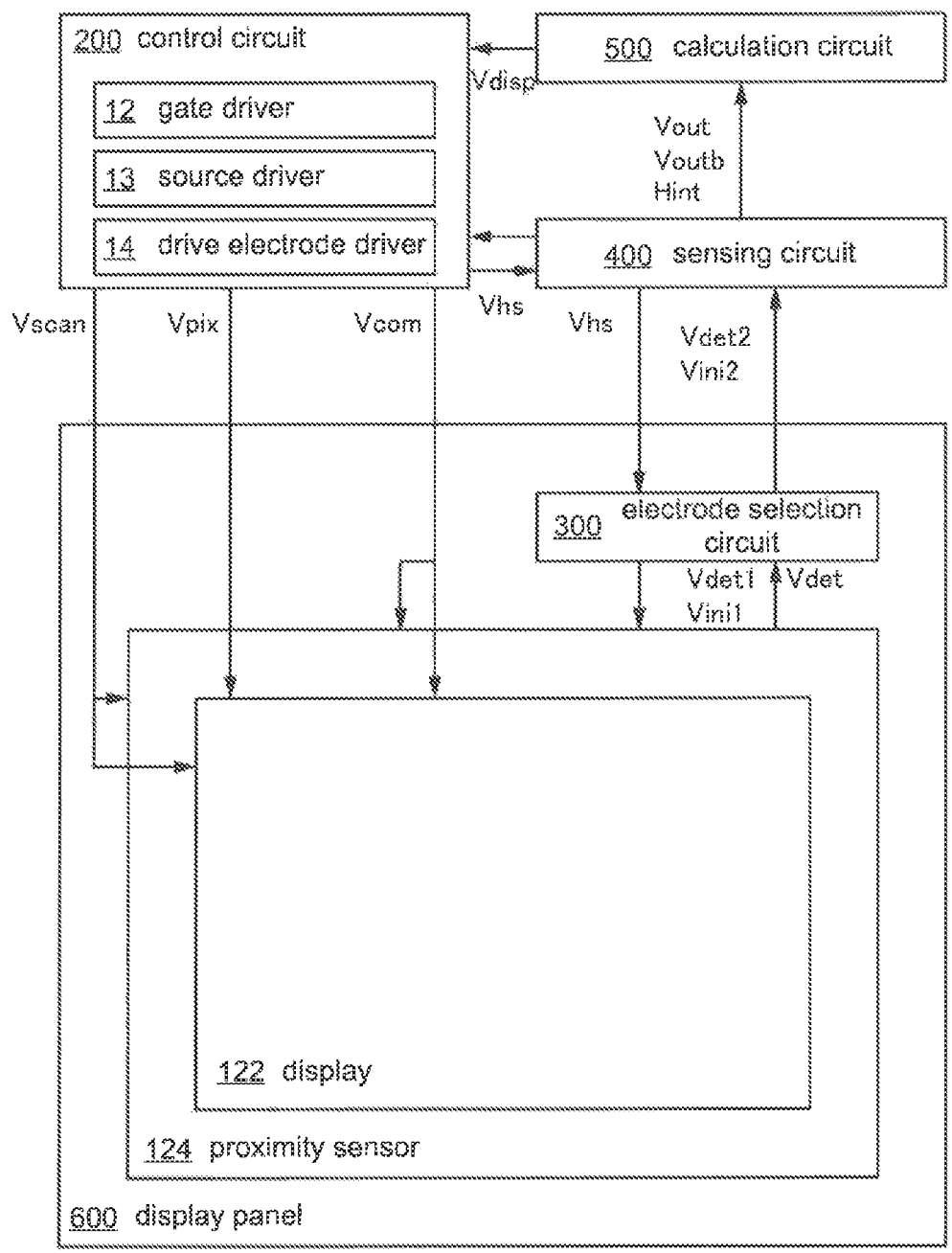
FIG. 3 is a plan view showing a functional configuration of a sensing device according to an embodiment of the present invention.

FIG. 3 and FIG. 4 are plan views showing a functional configuration of the sensing device 10. The functional configuration of the sensing device 10 shown in FIG. 3 and FIG. 4 is an example, and the functional configuration of the sensing device 10 is not limited to the configuration shown in FIG. 3 and FIG. 4. The same or similar components as those in FIG. 1 and FIG. 2 will not be described here.

The sensing device 10 can execute a display operation and proximity sensing operation. In this case, the control circuit 200 can execute the display operation for displaying an image using the display 122, and the proximity sensing operation for detecting a position of a sensing object 490 using the proximity sensor unit 124. For example, the sensing device 10 may execute the display operation and the proximity sensing operation in a time-division manner, or it may execute either the display operation or the proximity sensing operation.

Figure 10:
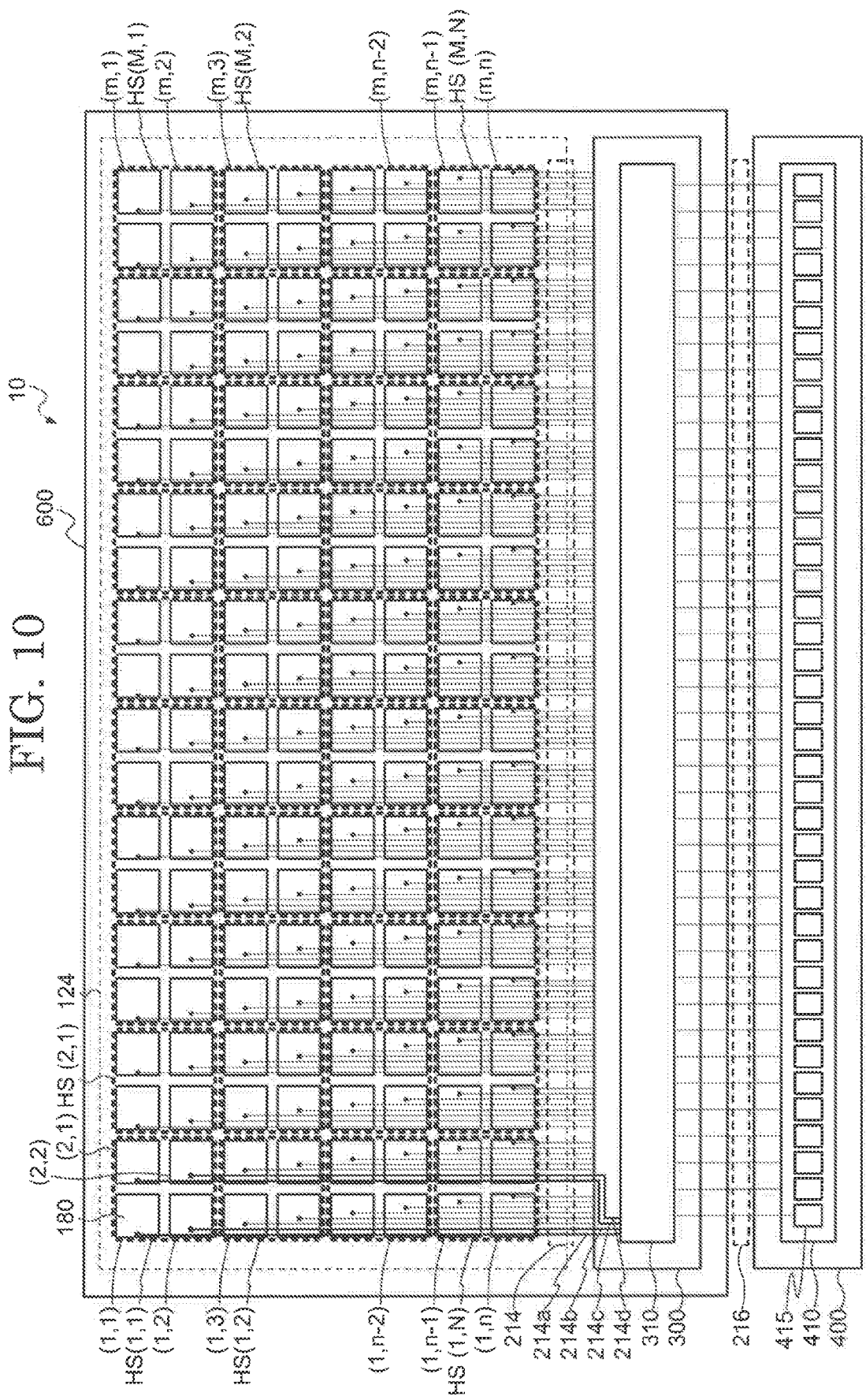
FIG. 10 is a schematic plan view showing a configuration of a sensing electrode, an electrode-connecting circuit, and a sensing circuit according to an embodiment of the present invention.

It is possible for the sensing device 10 to execute a proximity sensing operation in a self-capacitance method by using the plurality of proximity sensors HS included in the proximity sensor part 124 (FIG. 10). In the sensing device 10, the proximity sensing operation may be a hover sensing operation (non-contact sensing) in which the sensing object 490 and a sensing surface 102 are detected apart from each other or may be a touch sensing operation (contact sensing) in which the sensing object and the sensing surface 102 are detected in contact with each other. Specifically, in the sensing device 10, the touch sensing represents detecting a position of the sensing object 490 in a state where the sensing object 490 is in contact with the sensing surface 102 or in a state (contact state) in close proximity in the same manner as the contact state. In addition, the hover sensing represents detecting the position or operation of the sensing object 490 in the state where the sensing object 490 is not in contact with the sensing surface 102 or not in proximity in the same manner as the contact (non-contact state). Also, the sensing device 10 according to an embodiment of the present invention has the sensing surface 102 on the same surface as the display surface.

The sensing device 10 executes, as proximity sensing operations, a baseline scan for detecting an initial signal Vini1 including a voltage of an initial state of each of the plurality of sensing electrodes 180 (FIG. 2), and a bundle scan for detecting a sensing signal Vdet1 including each voltage of the plurality of sensing electrodes 180 (FIG. 2) when the sensing object 490 is in proximity by bundling the plurality of sensing electrodes 180. Although the details of the bundle scan will be described later, for example, the sensing device 10 executes the baseline scan and the bundle scan four times each. The sensing device 10 executes, for example, the baseline scans 0 to 3 and the bundle scans 0 to 3 in a time division manner.

The sensing device 10 executes an overlap scan in the Y-direction and X-direction as the baseline scan and bundle scan of the sensing device 10. Comparing before and after the scans of the plurality of bundle scans with the proximity sensor HS including the plurality of sensing electrodes 180, it is understood that the sensing device 10 executes the overlap scan in which a part of the plurality of sensing electrodes 180 is scanned in an overlapping. As a result, it is possible to suppress the sensing of the sensing object 490 over the plurality of proximity sensors HS and improve the sensing accuracy of the sensing position coordinates of the sensing object 490.

<1-2-1. Functional Configuration of Control Circuit 200>

As shown in FIG. 3, the control circuit 200 includes a gate driver 12, a source driver 13, and a drive electrode driver 14. For example, the control circuit 200 is supplied with a video control signal Vdisp from the calculation circuit 500. The control circuit 200 is a circuit that supplies a control signal to the gate driver 12, the source driver 13, the drive electrode driver 14, the electrode selection circuit 300, and the sensing circuit 400 using the video control signal Vdisp to control the display operation and proximity sensing operation.

The gate driver 12 is a circuit that supplies a scan signal Vscan to the gate wiring connected to the plurality of pixels 220 (FIG. 2) included in the display 122 using a control signal supplied from the control circuit 200. For example, the gate driver 12 sequentially or simultaneously selects the gate wiring objected for the display operation.

The source driver 13 is a circuit for supplying an image signal Vpix corresponding to each of the plurality of pixels 220 to the source wiring connected to the plurality of pixels 220 (FIG. 2) included in the display 122. Also, some of the functions of the source driver 13 may be mounted on the display panel 600. In this case, the control circuit 200 generates the image signal Vpix, and the generated image signal Vpix may be supplied to the source driver 13.

For example, the drive electrode driver 14 is a circuit for supplying a control signal Vcom to the sensing electrode 180, which is a common electrode of the display panel 600, via the electrode selection circuit 300 in the display operation. In addition, for example, the drive electrode driver 14 is a circuit for supplying a control signal Vhs to the sensing electrode 180 of the display panel 600 via the electrode selection circuit 300 in the proximity sensing operation.

<1-2-2. Function Configuration of Electrode Selection Circuit 300>

As shown in FIG. 1 to FIG. 3, the electrode selection circuit 300 is arranged between the proximity sensor unit 124 and the sensing circuit 400. The electrode selection circuit 300 is a circuit for switching connection and disconnection between the sensing electrode 180 (FIG. 2) objected for the proximity sensing operation and the sensing circuit 400 using the control signal Vhs supplied from the control circuit 200 (the drive electrode driver 14) via the sensing circuit 400. For example, in the case where one proximity sensor HS is configured using four sensing electrodes 180 (coefficient k is 4), the electrode selection circuit 300 switches the connection and disconnection of the four sensing electrodes 180 adjacent to each other in the X-direction and Y-direction among the plurality of sensing electrodes 180 included in the proximity sensor unit 124, and the electrode selection circuit 300 switches the connection and disconnection of the corresponding four sensing electrodes 180 for each of the plurality of proximity sensors HS. For example, the sensing device 10 executes each of the bundle scan 0 to bundle scan 3 in time division and it is possible to switch the connection and disconnection between the four sensing electrodes 180 and a sensing signal amplification circuit 410 included in the sensing circuit 400 so as to scan each of a first sensing electrode, a second sensing electrode, a third sensing electrode, and a fourth sensing electrode corresponding to one proximity sensor HS in each bundle scan in time division. For example, the sensing device 10 executes each of the bundle scan 0 to bundle scan 3 in time division and it is possible to switch the connection and disconnection between the four sensing electrodes 180 and the sensing signal amplification circuit 410 included in the sensing circuit 400 so as to simultaneously drive all four sensing electrodes 180 corresponding to one proximity sensor HS in each bundle scan.

Each of the sensing electrodes 180 detects contact or proximity of the sensing object 490 (FIG. 6) and supplies the sensing signal Vdet to the electrode selection circuit 300. The electrode selection circuit 300 generates a sensing signal Vdet2 for each of the plurality of proximity sensors HS using each sensing signal Vdet1 of the corresponding sensing electrode 180. The electrode selection circuit 300 supplies a plurality of sensing signals Vdet2 generated for each of the plurality of proximity sensors HS to the sensing circuit 400.

The sensing signal detected by each of the sensing electrodes 180 in the baseline scan in the sensing device 10 is referred to as an initial signal Vini1, and the sensing signal generated for each of the plurality of proximity sensors HS is referred to as an initial signal Vini2.

<1-2-3. Functional Configuration of Sensing Circuit 400>

In the proximity sensing operation, as shown in FIG. 3, the sensing circuit 400 is supplied with the control signal Vhs from the drive electrode driver 14 and is supplied with the sensing signal Vdet2 and the initial signal Vini2 from the display panel 600 (the electrode selection circuit 300). The sensing circuit 400 is a circuit for detecting the sensing object 490 in proximity to the sensing surface 102 using the control signal Vhs, and the sensing signal Vdet2 or the initial signal Vini2.

As shown in FIG. 4, the sensing circuit 400 includes the sensing signal amplification circuit 410, an AD conversion circuit 420, a signal processing circuit 430, and a sense timing control circuit 440. The sense timing control circuit 440 controls the sensing signal amplification circuit 410, the AD conversion circuit 420, and the signal processing circuit 430 to be synchronized and operated using the control signal Vhs supplied from the control circuit 200 (the drive electrode driver 14).

The sensing circuit 400 (the sensing signal amplification circuit 410) is serially supplied with the plurality of sensing signals Vdet2 and the initial signal Vini2 generated for each of the plurality of proximity sensors HS via the electrode selection circuit 300. The sensing signal amplification circuit 410 is supplied with the control signal Vhs via the control circuit 200 and the sense timing control circuit 440. The sensing signal amplification 410 amplifies the plurality of sensing signals Vdet2 and a plurality of initial signals Vini2 by synchronization with the control signal Vhs using the plurality of sensing signals Vdet2, the initial signal Vini2, and the control signal Vhs. The sensing signal amplification circuit 410 may be configured to amplify the plurality of sensing signals Vdet2 and the plurality of initial signals Vini2, for example, to suppress the noise of the plurality of sensing signals Vdet2 and the plurality of initial signals Vini2.

The AD conversion circuit 420 samples each of a plurality of analog signals serially supplied from the sensing signal amplification circuit 410 and converts them into digital signals at a timing synchronized with the control signal Vhs. The AD conversion circuit 420 serially supplies a generated plurality of digital signals to the signal processing circuit 430. A read circuit for reading the plurality of sensing signals Vdet2 and the plurality of initial signals Vini2 may be provided in the sensing device 10, and the read circuit may include the AD conversion circuit 420.

The signal processing circuit 430 includes, for example, a digital signal processor (DSP), a volatile memory, and a non-volatile memory. The signal processing circuit 430 serially supplies a plurality of output signals Vout and a plurality of initial output signals Voutb to the calculation circuit 500 by calculating the data included in the plurality of digital signals supplied from the AD conversion circuit 420 in synchronization with the control signal Vhs. The signal processing circuit 430 may use a multiplier and adder included in the digital signal processor to speed up the calculation processing of the data contained in the plurality of digital signals. For example, the signal processing circuit 430 may remove the noise included in the plurality of digital signals and shape waveforms of the plurality of digital signals. In the sensing device 10, the output signal Vout is referred to as RawData.

The sensing circuit 400 may be provided on the same integrated circuit (IC) as the control circuit 200, and the integrated circuit may be electrically connected on the flexible printed substrate 150. In this case, the control circuit 200 is arranged on the flexible printed substrate 150 rather than on the substrate 20.

<1-2-4. Functional Configuration of Calculation Circuit 500>

As shown in FIG. 4, the calculation circuit 500 includes a signal processing circuit 510, a coordinate calculation circuit 520, a difference value calculation circuit 530, and a comparison judgment circuit 540. Although the details will be described later, the calculation circuit 500 executes operations, for example, to calculate the position of the sensing object, to judge the presence or absence of the sensing object, and to judge whether to terminate the bundle scan using the plurality of output signals Vout and the plurality of initial output signals Voutb supplied from the signal processing circuit 430 in synchronization with a control signal Hint supplied from the sensing circuit 400.

The signal processing circuit 510 has the same configuration and function as the signal processing circuit 430. The signal processing circuit 510 calculates the data included in the plurality of output signals Vout and the plurality of initial output signals Voutb in synchronization with the control signal Hint. Similar to the signal processing circuit 430, the signal processing circuit 510 may use a multiplier and adder to speed up the calculation processing of the data contained in the plurality of output signals Vout and the plurality of initial output signals Voutb. For example, the signal processing circuit 510 may remove the noise included in the plurality of output signals Vout and the plurality of initial output signals Voutb to form the waveform of the plurality of output signals Vout and the plurality of initial output signals Voutb.

The coordinate calculation circuit 520 is a circuit that calculates the coordinates of the sensing object 490 using the plurality of output signals Vout and the plurality of initial output signals Voutb in synchronization with the control signal Hint. The calculated coordinates are, for example, supplied to the difference value calculation circuit 530 and the comparison judgment circuit 540.

The difference value calculation circuit 530 generates a difference signal of the output signal Vout and the initial output signal Voutb (absolute value $|\Delta V|$) using each of the plurality of output signals Vout and the plurality of initial output signals Voutb in synchronization with the control signal Hint. The difference value calculation circuit 530 supplies a generated plurality of absolute values $|\Delta V|$ to the comparison judgment circuit 540.

The comparison judgment circuit 540 judges the presence or absence of the sensing object 490 (existence state or non-existence state) using the plurality of absolute values $|\Delta V|$ in synchronization with the control signal Hint. For example, when the comparison judgment circuit 540 compares the absolute value $|\Delta V|$ with a predetermined threshold voltage (Vth) and the absolute value $|\Delta V|$ is less than the threshold voltage (Vth), the comparison judgment circuit 540 judges that there is no sensing object (non-existence state). When the comparison judgment circuit 540 compares the absolute value $|\Delta V|$ with a predetermined threshold voltage (Vth) and the absolute value $|\Delta V|$ is the threshold voltage (Vth) or more, the comparison judgment circuit 540 judges that there is a sensing object (existence state). When the comparison judgment circuit 540 judges that there is a sensing object (existence state), the comparison judgment circuit 540 judges whether to terminate the bundle scan.

The comparison judgment circuit 540 calculates the sum of a plurality of absolute values $|\Delta V|$ (Sum (a plurality of absolute values $|\Delta V|$)) in synchronization with the control signal Hint, when the comparison judgment circuit 540 compares the Sum (the plurality of absolute values $|\Delta V|$) with a predetermined threshold voltage (Vth) and the Sum (the plurality of absolute values $|\Delta V|$) is less than the threshold voltage (Vth), the comparison judgment circuit 540 judges that there is no sensing object (non-existence state), and when the comparison judgment circuit 540 compares the Sum (the plurality of absolute values $|\Delta V|$) with a predetermined threshold voltage (Vth) and the Sum (the plurality of absolute values $|\Delta V|$) is equal to or greater than the threshold voltage (Vth), the comparison judgment circuit 540 judges that there is a sensing object (existence state). When the comparison judgment circuit 540 judges that there is a sensing object (existence state), the comparison judgment circuit 540 judges whether to terminate the bundle scan.

As described above, the sensing device 10 can detect the contact state and the non-contact state between the sensing object 490 and the sensing surface 102, calculate the coordinates of the sensing object 490, and accurately calculate the position of the sensing object 490.

<1-3. Example of Sensing of Voltage Change in Self-Capacitance Method>

Figure 5:
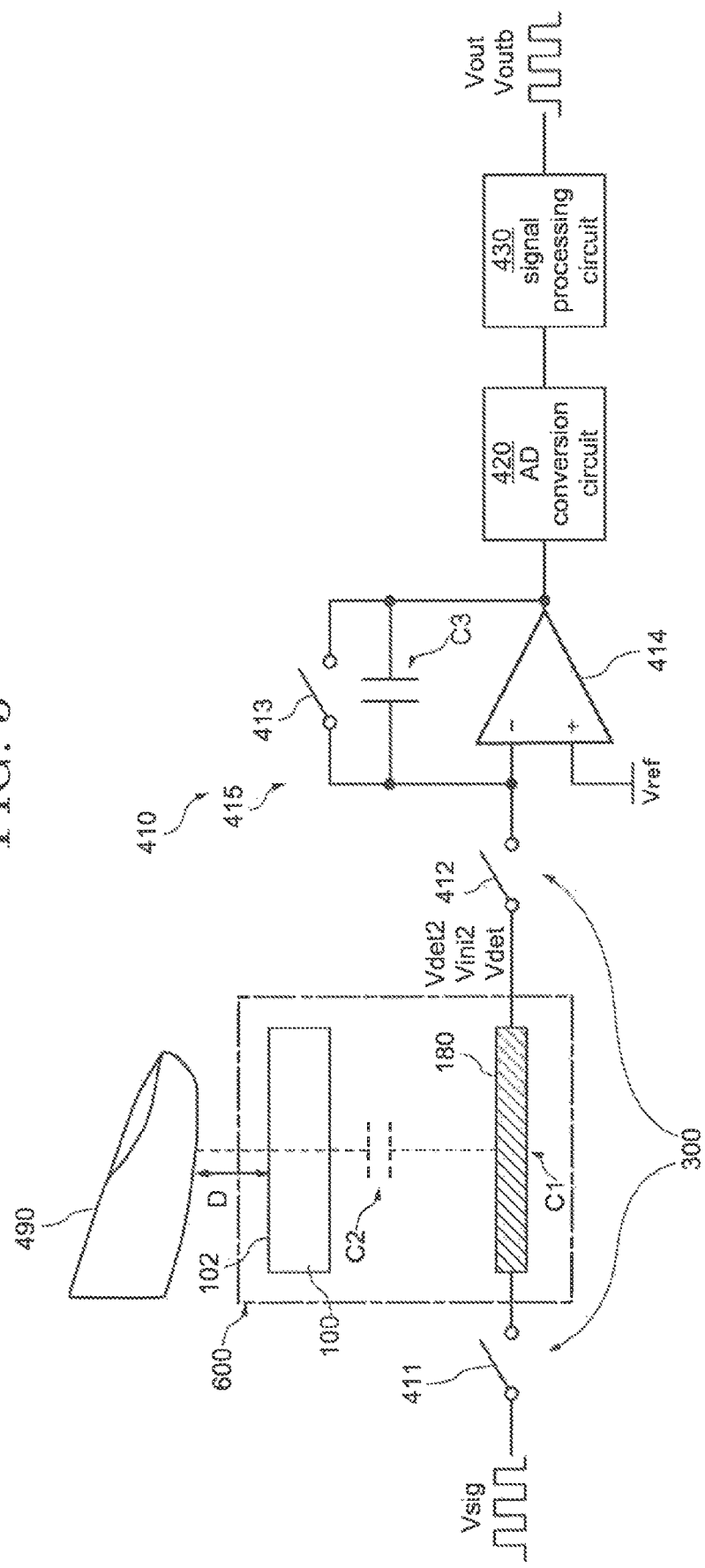
FIG. 5 is a diagram for explaining an example of sensing a change in voltage in a self-capacitance method.

FIG. 5 is a diagram for explaining an example of sensing of a change in voltage in the self-capacitance method according to an embodiment of the present invention. The configuration of the sensing device 10 shown in FIG. 5 is merely an example, and the configuration of the sensing device 10 is not limited to the configuration shown in FIG. 5. The same or similar components as those of FIG. 1 to FIG. 4 will not be described here.

As shown in FIG. 5, for example, the electrode selection circuit 300 includes a switch 411 and a switch 412. The display panel 600 includes the counter substrate 100 having the sensing surface 102 and the sensing electrode 180 having a capacitance C1. An amplification circuit 415 included in the sensing signal amplification circuit 410 includes an analog amplifier 414, a capacitance C3, and a switch 413. The switch 411 is electrically connected to the sensing electrode 180 and the switch 412 is electrically connected between the sensing electrode 180 and the analogue amplifier 414. The switch 413 and the capacitance C3 are electrically connected between one input terminal and output terminal of the analog amplifier 414. The other input terminal of the analog amplifier 414 is supplied with a reference voltage Vref.

For example, in the non-existence state of the sensing object 490, the switch 411, the switch 412, and the switch 413 are turned on, the reference voltage Vref is supplied to an AC square wave Vsig and the amplification circuit 415 included in the sensing signal amplification circuit 410, and the amplification circuit 415 is reset.

Subsequently, for example, in the non-existence state where the sensing object 490 does not exist, when the switch 411 and the switch 412 are turned on and the AC square wave Vsig with a predetermined frequency is supplied to the sensing electrode 180 having the capacitance C1, a current corresponding to the capacitance C1 flows to the sensing electrode 180. A voltage fluctuation according to the AC square wave Vsig is the sensing signal Vdet, and the sensing signal Vdet is input to the amplification circuit 415. The sensing signal Vdet output in the non-existence state where the sensing object 490 does not exist corresponds to the initial signal Vini1 or the initial signal Vini2 sensed in the baseline scan. The initial signal Vini1 or the initial signal Vini2 is amplified by amplifier circuit 415, converted to a digital signal by AD converter circuit 420, signal-processed by signal processing circuit 430, and then output as initial output signal Voutb. A predetermined frequency is, for example, a frequency of several kHz or more and several hundred kHz or less.

Next, in the existence state where the sensing object 490 exists, a capacitance C2 between the sensing object 490 and the sensing electrode 180 is applied to the capacitance C1 of the sensing electrode 180. The capacitance C2 varies according to a distance D between the sensing object 490 and the sensing electrode 180. In the existence state where the sensing object 490 exists, when the switch 411 and the switch 412 are turned on and the AC square wave Vsig is supplied to the sensing electrode 180, a current corresponding to the capacitance C1 and the capacitance C2 flows to the sensing electrode 180. The voltage fluctuation according to the AC square wave Vsig is the sensing signal Vdet, and the sensing signal Vdet is input to the amplification circuit 415. The sensing signal Vdet output in the existence state where the sensing object 490 exists corresponds to the sensing signal Vdet1 or the sensing signal Vdet2 sensed in the bundle scan. The sensing signal Vdet1 or the sensing signal Vdet2 is output as the output signal Vout after being signal processed in the signal processing circuit 430 by being amplified in the amplification circuit 415 and converted into a digital signal in the AD conversion circuit 420.

The sensing device 10 can calculate the coordinates (position) of the sensing object 490 using the absolute value |ΔV| of the difference between the output signal Vout in the existence state and the initial output signal Voutb in the non-existence state.

<1-4. Configuration of Display Panel 600>

Figure 6:
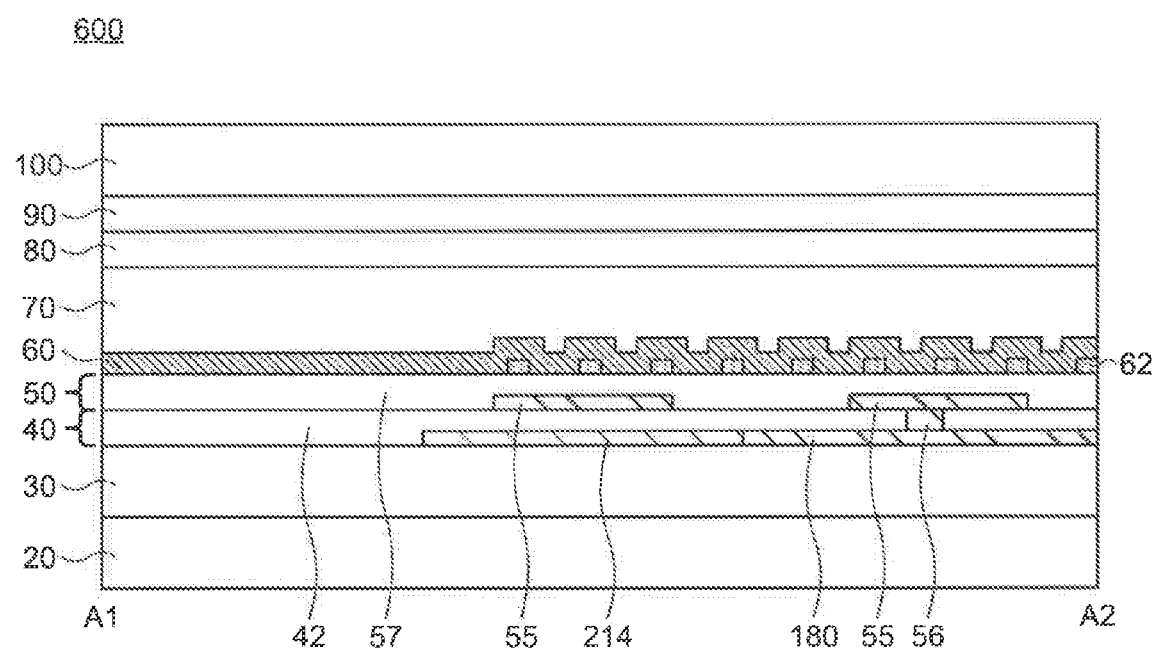
FIG. 6 is a schematic end portion cross-sectional view of a display panel according to an embodiment of the present invention.
Figure 8:
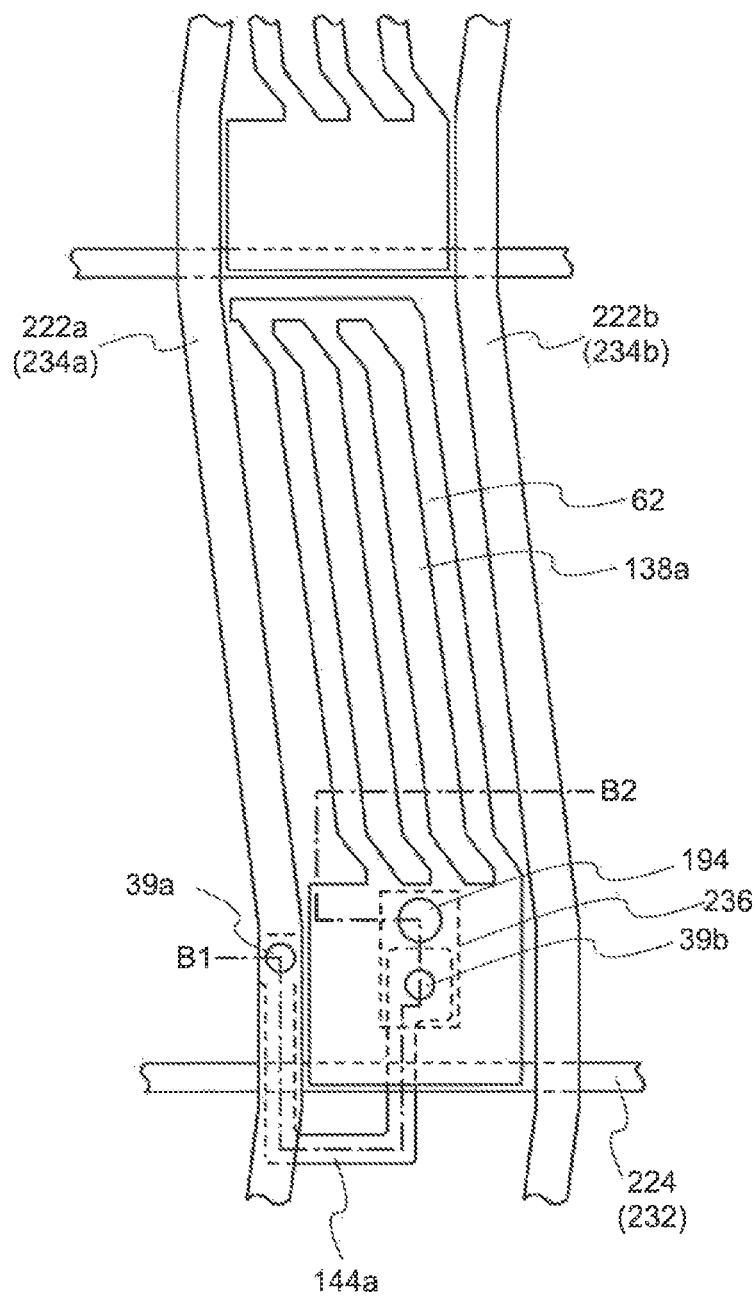
FIG. 8 is a diagram showing an example of a layout of a pixel according to an embodiment of the present invention.
Figure 9:
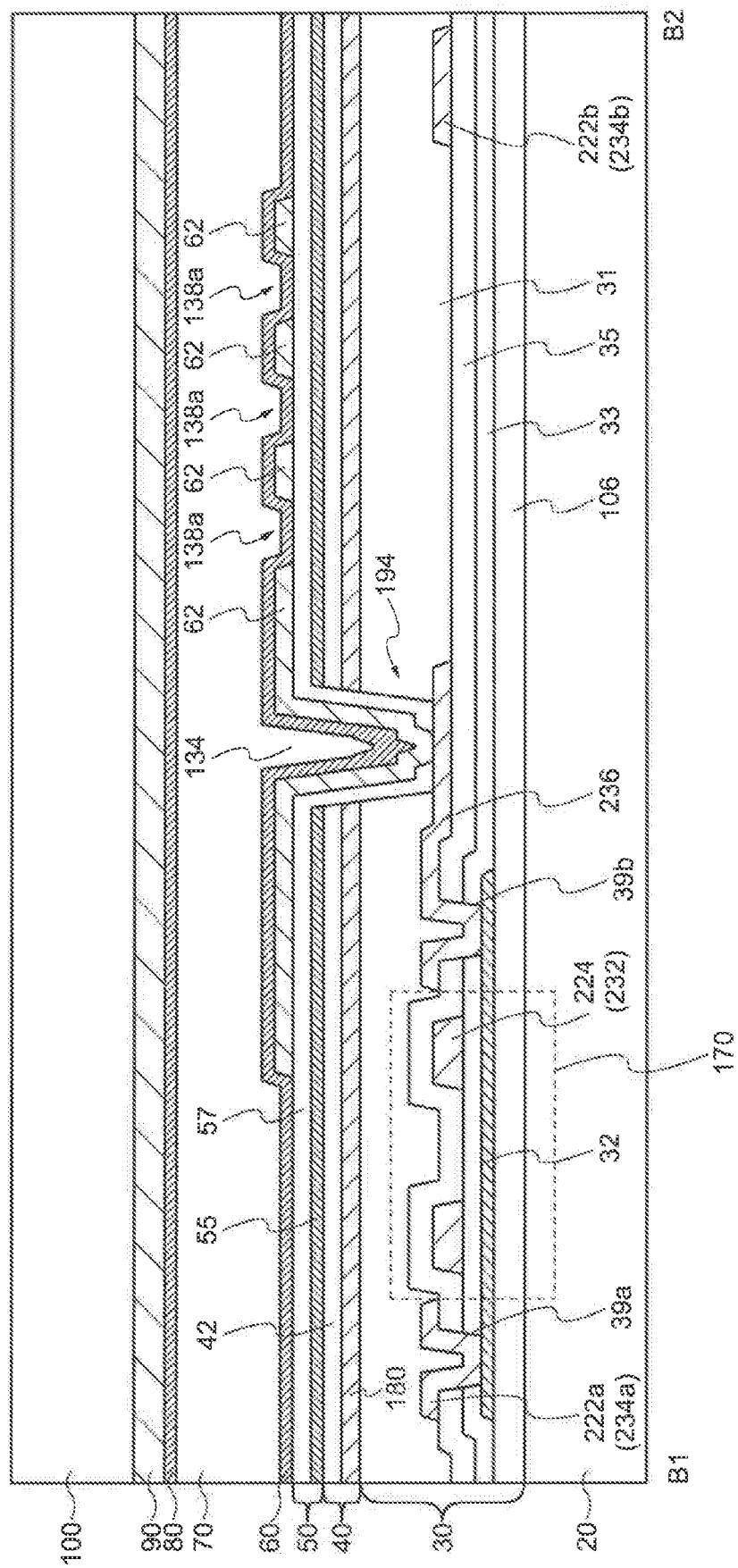
FIG. 9 is a schematic end portion cross-sectional view of a pixel according to an embodiment of the present invention.

FIG. 6 is a schematic cross-sectional view of the end portion of the display panel 600 and is a cross-sectional view of an area indicated by A1 and A2 shown in FIG. 1. FIG. 7 is an equivalent circuit diagram showing a configuration of the pixel 220 included in the display panel 600. FIG. 8 is a diagram showing an example of a layout of the pixel 220. FIG. 9 is a schematic cross-sectional view of the pixel 220 and is a cross-sectional view of an area indicated by B1 and B2 in the layout of the pixel 220 shown in FIG. 8. The configuration of the display panel 600 shown in FIG. 6 to FIG. 9 is an example, and the configuration of the display panel 600 is not limited to the configuration shown in FIG. 6 to FIG. 9. The same or similar components as those of FIG. 1 to FIG. 5 will not be described here.

The display panel 600 includes the substrate 20, a TFT array layer 30, a sensing electrode layer 40, a connection wiring layer 50, a first alignment film 60, a liquid crystal layer 70, a second alignment film 80, a color filter layer 90, and the counter substrate 100.

The TFT array layer 30 includes a plurality of transistors 170, a capacity element, a resistance element, and a wiring. The TFT array layer 30 is arranged above the substrate 20. The sensing electrode layer 40 includes an organic film 42, the sensing electrode 180, and the wiring 214. The sensing electrode layer 40 is arranged above the TFT array layer 30. The sensing electrode 180 and the wiring 214 are arranged in the same layer, and the sensing electrode 180 is connected to the wiring 214. The organic film 42 has a third opening 56 and covers the sensing electrode 180 and the wiring 214.

The connection wiring layer 50 includes an organic film 57 and a first connection wiring 55. The first connection wiring 55 is electrically connected to the sensing electrode 180 via the third opening 56. The organic film 57 covers the first connection wiring 55. A pixel electrode 62 of the pixel 220 is arranged between the sensing electrode layer 40 and the connection wiring layer 50 and is arranged above the organic film 57. The first alignment film 60 covers the pixel electrode 62 and is arranged above the organic film 57.

The color filter layer 90 is arranged above the counter substrate 100 facing the substrate 20. The second alignment film 80 is arranged on the opposite side of the surface where the color filter layer 90 faces the counter substrate 100. The liquid crystal layer 70 is sandwiched between the first alignment film 60 and the second alignment film 80.

As shown in FIG. 7, the pixel 220 includes elements such as, for example, a transistor 230, a capacity element 238, and the liquid crystal element 240. The transistor 230 includes a gate electrode 232, a source electrode 234, and a drain electrode 236. The gate electrode 232 is connected to the gate wiring 224. The source electrode 234 is connected to the source wiring 222. The drain electrode 236 is connected to the capacity element 238 and the liquid crystal element 240. The drain electrode 236 and the source electrode 234 may be switched with each other, and the function as a source and a drain of each electrode may be interchanged.

The pixel 220 shown in FIG. 8 has a configuration applicable to an FFS (Fringe Field Switching) mode or an IPS (In Plane Switching) mode. In the display panel 600 having the pixel 220, a transverse electric field (e.g., an electric field parallel or substantially parallel to a main surface (top surface) of the substrate 20 among a fringe electric field) is formed between the sensing electrode 180 and the pixel electrode 62. The alignment of the liquid crystal molecules included in the liquid crystal layer 70 is controlled by mainly applying the lateral electric field in the display panel 600.

The pixel 220 includes the transistor 170, the source wiring 222 (the source electrode 234), the gate wiring 224 (the gate electrode 232), the drain electrode 236, and the pixel electrode 62. The transistor 170 includes a semiconductor film 32, the gate electrode 232, the source electrode 234, the drain electrode 236, a first opening 39a, and a first opening 39b. The source electrode 234 is electrically connected to the semiconductor film 32 via the first opening 39a. The drain electrode 236 is electrically connected to the semiconductor film 32 via the first opening 39b. The pixel electrode 62 is electrically connected to the drain electrode 236 via a second opening 194. The capacity element is formed using the drain electrode 236, the sensing electrode 180, and a flattening film 31 (FIG. 9). The capacity element is formed using the sensing electrode 180, the first connection wiring 55 (FIG. 9), the pixel electrode 62, the organic film 57 (FIG. 9), and the organic film 42 (FIG. 9). The source electrode 234 is electrically connected to a source wiring 222a (a source electrode 234a). A source wiring 222b (a source electrode 234b) is a source wiring of an adjacent pixel. The gate electrode 232 is electrically connected to the gate wiring 224.

The pixel electrode 62 is provided with a plurality of slits 138a. When a voltage is applied to each of the pixel electrode 62 and the sensing electrode 180, a transverse electric field (e.g., an electric field parallel or substantially parallel to a main surface (top surface) of the substrate 20 among the fringe electric field) is formed between the pixel electrode 62 and the sensing electrode 180 via the plurality of slits 138a. The alignment of the liquid crystal element included in the liquid crystal layer 70 is controlled by the transverse electric field. As a result, the display panel 600 can display an image.

In the pixel layout shown in FIG. 8, as an example, the semiconductor film 32 with a U-shape intersects the gate electrode 232. Also, the shape of the semiconductor film 32 is not limited to the shape shown in FIG. 8. The shape of the semiconductor film 32 forming the transistor 170 may be L-shaped or I-shaped. In addition, the structure of the transistor 170 is not limited to a double gate structure. The structure of the transistor 170 may be a single gate structure and may be a multi-gate structure provided with gate electrodes so that two or more channels are arranged in series or in parallel between the source electrode and drain electrode. In addition, in the transistor 170, a material for forming the semiconductor film 32 includes, for example, polysilicon, amorphous silicon, or an oxide semiconductor.

The sensing electrode 180 included in the sensing device 10 is one of the electrodes constituting the proximity sensor HS (FIG. 10) in the case of the proximity sensing operation.

A method of manufacturing the display panel 600 will be described with reference to FIG. 9. The method of manufacturing the display panel 600 can apply a photolithography technique used in the manufacture of a display panel. The method of manufacturing the display panel 600 is not limited to the photolithography technique, and the manufacturing method commonly used in the technical field of the present invention may be applied.

The TFT array layer 30 is formed above the substrate 20. The TFT array layer 30 includes an underlayer 106, the semiconductor film 32, a gate insulating film 33, the gate wiring 224 (the gate electrode 232), an interlayer film 35, the source wiring 222 (the source electrode 234), the drain electrode 236, the first opening 39a, the first opening 39b, and the flattening film 31. The transistor 170 and the capacity element are formed in the TFT array layer 30.

The methods and members commonly used in the technical field of the present invention may be adopted for a method of forming the TFT array layer 30, the structures of the transistor 170 and the capacity element, the films, layers, and members. For example, a polyimide-based or acrylic-based resin can be used as the material for forming the flattening film 31. Using a polyimide-based or acrylic-based resin, light can be sufficiently transmitted.

The sensing electrode layer 40 is formed above the flattening film 31. The sensing electrode layer 40 is composed of the wiring 214 (FIG. 1), the sensing electrode 180, and the organic film 42. After the wiring 214 and the sensing electrode 180 are formed, the organic film 42 is applied to cover the wiring 214 and the sensing electrode 180. The wiring 214 is formed in the same layer as the sensing electrode 180. The organic film 42 is applied to cover each electrode, thereby preventing the electrodes from contacting each other and conducting. The organic film 42 relieves an unevenness when forming a film, a wiring, or a transistor of a lower layer than the organic film 42. As a result, a film or pattern formed above the organic film 42 is formed above a flat surface.

Next, the third opening 56 (FIG. 5) that opens the organic film 42 is formed. The wiring 214, the sensing electrode 180, and the first connection wiring 55 are electrically connected via the third opening 56. The connection wiring layer 50 is formed above the organic film 42. The connection wiring layer 50 is composed of the first connection wiring 55 and the organic film 42. After forming the first connection wiring 55 above the organic film 42, an opening through the first connection wiring 55, the organic film 57, the wiring 214 and the sensing electrode 180 is formed. An organic insulating film 47 is applied to cover the first connection wiring 55 and the opening.

Materials for forming the wiring 214, the sensing electrode 180, and the first connection wiring 55 are preferred to have light transmittance and conductivity. For example, ITO (Indium Tin Oxide) and IZO (Indium Zinc Oxide) can be used as the material for forming the wiring 214, the sensing electrode 180, and the first connection wiring 55. The material for forming the wiring 214, the sensing electrode 180, and the first connection wiring 55 may be a thin film of a conductive metal material represented by Al, Ti, or W. In addition, material for forming the organic film 42 and the organic film 57 may be the same material as the material for forming the flattening film 31.

Next, the second opening 194 is formed. The second opening 194 opens the organic film 57. Subsequently, the pixel electrode 62 is formed. The pixel electrode 62 is electrically connected to the drain electrode 236 via the second opening 194. After forming the pixel electrode 62, the first alignment film 60 is applied to cover the pixel electrode 62. For example, a material similar to the material for forming the sensing electrode 180 can be used as a material for forming the pixel electrode 62. For example, a polyimide-based resin can be used as a material for forming the first alignment film 60.

A so-called TFT array substrate can be prepared by the manufacturing method described above. The electrode selection circuit 300, the wiring 213, and the wiring 216 are formed using the transistor, capacitance, resistance, and the like which is provided in the TFT array layer 30 and the connection wiring layer 50, and sensing electrode layer 40 of the TFT array-side substrate.

Subsequently, a method of manufacturing a so-called counter substrate will be described. The counter substrate includes the counter substrate 100, the color filter layer 90, and the second alignment film 80. After forming the color filter layer 90 above the counter substrate 100, the second orientation layer 80 is applied. For example, the color filter layer 90 is formed by a photolithography technique after the entire surface is applied by coating. The color filter layer 90 includes, for example, a red color filter layer, a green color filter layer, and a blue color filter layer. A material for forming the second alignment film 80 may be, for example, a material similar to the material for forming the first alignment film 60.

An insulating film may be formed between the counter substrate 100 and the color filter layer 90. It is possible to flatten the surface of the counter substrate 100 by forming the insulating film. Therefore, the color filter layer 90 formed above the insulating film can be flattened, and it is possible to suppress color mixing between adjacent pixels.

In addition, a light-shielding film may be formed above the counter substrate 100 or between the color filter layer 90 and the second orientation layer 80. The layer on which the light-shielding film is formed has a function of blocking visible light and can suppress color mixing between adjacent pixels.

The counter-side substrate can be manufactured by the manufacturing method described above.

Finally, the liquid crystal layer 70 is sandwiched between the TFT array-side substrate and the counter-side substrate. For example, the liquid crystal layer 70 is sandwiched between the TFT array-side substrate and the counter-side substrate and the TFT array-side substrate is bonded to the counter-side substrate using a seal material. Furthermore, a polarizer may be bonded to one or both of the substrate 20 and the counter substrate 100. The display panel 600 can be manufactured as described above.

<1-5. Driving Method of Sensing Device 10>

Figure 11:
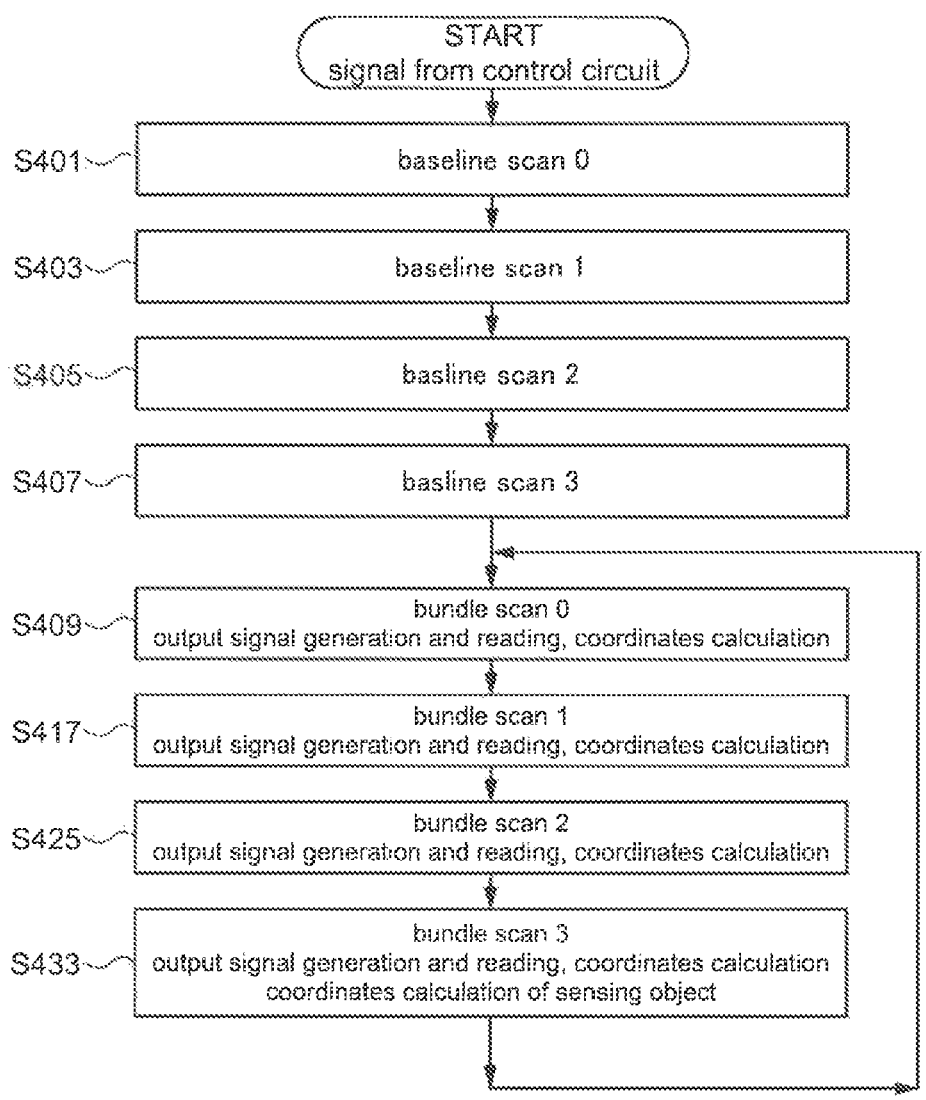
FIG. 11 is a flowchart for explaining a driving method of the sensing device according to an embodiment of the present invention.

FIG. 10 is a schematic plan view showing a configuration of the proximity sensor unit 124, the electrode selection circuit 300, and the sensing circuit 400 of the sensing device 10. FIG. 11 is shown a flowchart for explaining a driving method of the sensing device 10. FIG. 12 to FIG. 15 are diagrams for explaining a configuration unit 0 to unit 3 of the sensing device 10 in the driving method of the sensing device 10. FIG. 16 is a flowchart for explaining a driving method of the sensing device 10. FIG. 17 to FIG. 20 are diagrams for explaining an example of a positional relationship between the sensing object and the sensing device in each scan of the bundle scan 0 (BundleScan0) to the bundle scan 3 (BundleScan3) according to an embodiment of the present invention. The driving method of the sensing device 10 shown in FIG. 10 to FIG. 20 is an example, and the driving method of the sensing device 10 is not limited to the configuration shown in FIG. 10 to FIG. 20. The same or similar components as those of FIG. 1 to FIG. 9 will not be described here.

In this specification and the drawings, in the case where the coordinates of the sensing electrode 180 or the proximity sensor HS are described, for convenience of explanation, the description of coordinates of the sensing electrode 180 or the proximity sensor HS is kept to a minimum in view of the ease of view of the drawings and the like.

The sensing device 10 may execute the proximity sensing operation using the driving method of the sensing device 10 shown in FIG. 10 to FIG. 20.

FIG. 10 is a plan view of the sensing device 10 shown in FIG. 1 in which the proximity sensor unit 124, the electrode selection circuit 300, and the sensing circuit 400 are mainly excerpted. Compared with the sensing device 10 shown in FIG. 1, the proximity sensor unit 124, the electrode selection circuit 300, and the sensing circuit 400 are mainly shown in detail.

The plurality of sensing electrodes 180 is arranged in the proximity sensor unit 124. The electrode selection circuit 300 includes a multiplexer 310. The sensing circuit 400 includes the sensing signal amplification circuit 410. The sensing signal amplification circuit 410 includes a plurality of amplification circuits 415. The plurality of sensing electrodes 180 is electrically connected to the multiplexer 310 using the wiring 214. The multiplexer 310 is electrically connected to the plurality of amplification circuits 415 using the wiring 216. Although the sensing electrode 180 is arranged in the same layer as the wiring 214, for convenience of explanation, the wiring 214 is described as passing above the sensing electrode 180.

In the example shown in FIG. 10, the plurality of sensing electrodes 180 is arranged m×n in m column and n row. The coefficients m and n are positive integers. In addition, in the example shown in FIG. 10, although the coordinates of each of the plurality of sensing electrodes 180 are represented by (m, n), for convenience of explanation, the description of the coordinates is limited to a minimum. For example, the coordinates of the sensing electrode 180 in 1 column and 1 row located in the upper left of FIG. 10 are indicated by the coordinates (1, 1), the coordinates of the sensing electrode 180 in 1 column and 2 rows are indicated by the coordinates (1, 2), the coordinates of the sensing electrode 180 in 1 column and 3 rows are indicated by the coordinates (1, 3), the coordinates of the sensing electrode 180 in 1 column and n−2 rows are indicated by the coordinates (1, n−2), the coordinates of the sensing electrode 180 in 1 column and n−1 rows are indicated by the coordinates (1, n−1), and the coordinates of the sensing electrode 180 in 1 column and n rows are indicated by the coordinates (1, n). Similarly, the coordinates of the sensing electrode 180 in the m-column 1 row located in the upper right of FIG. 10 are indicated by the coordinates (m, 1), and the coordinates of the sensing electrode 180 in the m-column n row located in the lower right of FIG. 10 are indicated by coordinates (m, n).

In the example shown in FIG. 10, the proximity sensor HS is composed of four sensing electrodes 180 (coefficient k=4). For example, the plurality of proximity sensors HS is arranged in M×N in M columns and N rows. The coefficient M and the coefficient N are positive integers, for example, the product of the coefficient M and the coefficient N is ¼ of the product of the coefficient m and the coefficient n. In addition, in the example shown in FIG. 10, although each of the coordinates of the plurality of proximity sensors HS is represented by HS (M, N), the description of the coordinates is limited to the minimum for convenience of description. For example, the coordinates of the proximity sensor HS in 1 column 1 row located in the upper left of FIG. 10 are indicated by the coordinates HS (1, 1), the coordinates of the proximity sensor HS in 1 column 2 rows are indicated by the coordinates HS (1, 2), the coordinates of the proximity sensor HS in 1 column N row are indicated by the coordinates HS (1, N), the coordinates of the proximity sensor HS in M column 1 row located in the upper right of FIG. 10 are indicated by the coordinates HS (M, 1), and the coordinates of the proximity sensor HS in M column N row located in the lower right of FIG. 10 are indicated by the coordinates HS (M, N).

The multiplexer 310 switches the connection and disconnection of the corresponding four sensing electrodes 180 for each of the plurality of proximity sensors HS. The multiplexer 310 generates, for each of the plurality of proximity sensors HS, the sensing signal Vdet2 (FIG. 3) using each sensing signal Vdet1 of the corresponding sensing electrode 180 (FIG. 3). The multiplexer 310 supplies the plurality of sensing signals Vdet2 generated for each of the plurality of proximity sensors HS to the amplification circuit 415 corresponding to each of the plurality of proximity sensors HS.

<1-5-1. Proximity Sensing Operation>

As shown in FIG. 11, the driving method of the sensing device 10 starts the proximity sensing operation when the control signal Vhs is supplied from the control circuit 200 (FIG. 2) to the sensing circuit 400 (the sense timing control circuit 440) (FIG. 2). When the sensing device 10 executes each scan, the control signal Vhs may be supplied from the control circuit 200 (FIG. 2) to the sensing circuit 400 (the sense timing control circuit 440) (FIG. 2) between scans. For example, the sensing device 10 may execute the bundle scan 0 when the control signal Vhs is supplied from the control circuit 200 to the sensing circuit 400 after the sensing device 10 executes the baseline scan 3, and the sensing device 10 may execute the bundle scan 1 when the control signal Vhs is supplied from the control circuit 200 to the sensing circuit 400 after the sensing device 10 executes the bundle scan 0. The order of execution of each scan in the driving method of the sensing device 10 shown in FIG. 11 is an example. For example, the order of execution of the baseline scans 0 to 3 may be interchanged, and the order of execution of the bundle scans 0 to 3 may be interchanged.

In the driving method of the sensing device 10, an example in which the coefficient m is 20, the coefficient n is 8, the coefficient M is 10, and the coefficient N is 4 is shown. That is, the sensing device 10 has 40 proximity sensors HS composed of 160 sensing electrodes 180.

<1-5-1-1. First Initial Voltage Sensing Period>

When the proximity sensing operation is started, the sensing device 10 executes the baseline scan 0 in step 401 (S401). In the baseline scan 0, in the non-existence state where the sensing object 490 does not exist, the initial signal Vini1 and the initial signal Vini2 are generated for each proximity sensor HS using the configuration of unit 0 shown in FIG. 1. Signal processing of the initial signal Vini1 and the initial signal Vini2 is as described in <1-3. Example of Sensing of Voltage Change in Self-capacitance Method>. In the driving method of the sensing device 10, a period for executing the baseline scan 0 is referred to as a first initial voltage sensing period, and the initial output signal Voutb generated in the first initial voltage sensing period is referred to as a first initial voltage.

Figure 12:
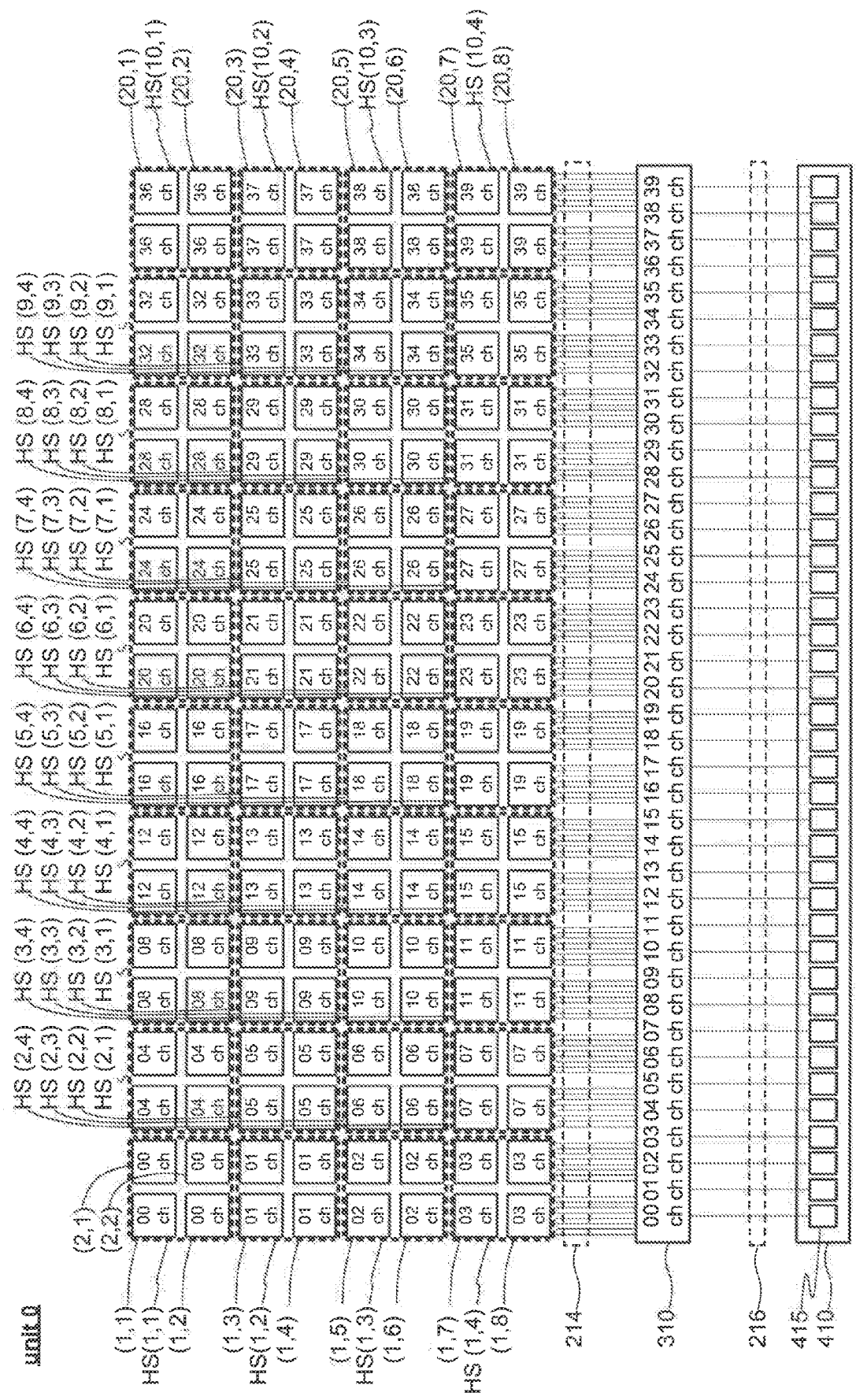
FIG. 12 is a diagram for explaining a configuration of a sensing device (unit 0) according to an embodiment of the present invention.

As shown in FIG. 12, in unit 0, the proximity sensor HS (1, 1) is composed of four sensing electrodes 180 at the coordinates (1, 2), (1, 3), (2, 2), and (2, 3), and the proximity sensor HS (1, 2) is composed of four sensing electrodes 180 at the coordinates (1, 3), (1, 4), (2, 3), and (2, 4). Similar to the proximity sensor HS (1, 1) and the proximity sensor HS (1, 2), each of the proximity sensors HS (1, 3) to HS (10, 4) is composed of four corresponding sensing electrodes 180.

The proximity sensor HS (1, 1) is electrically connected to 00 channel (00ch) in the multiplexer 310, and the proximity sensor HS (1, 2) is electrically connected to 01 channel (01ch) in the multiplexer 310. Similar to the proximity sensor HS (1, 1) and the proximity sensor HS (1, 2), each of the proximity sensors HS (1, 3) to (10, 4) is electrically connected to the channels in the corresponding multiplexer 310.

<1-5-1-2. Second Initial Voltage Sensing Period>

The sensing device 10 executes the baseline scan 1 in step 403 (S403) following step 401 (S401). In the baseline scan 1, in the non-existence state where the sensing object 490 does not exist, the initial signal Vini1 and the initial signal Vini2 are generated for each proximity sensor HS using the configuration of unit1 (unit1) shown in FIG. 13. The coordinates of each proximity sensor HS of unit 1 are shifted by one row of the sensing electrode 180 with respect to unit 0. For example, the proximity sensor HS (1, 1) is composed of four sensing electrodes 180 at the coordinates (1, 2), (1, 3), (2, 2), and (2, 3), and the proximity sensor HS (1, 4) is composed of two sensing electrodes 180 at the coordinates (1, 8) and (2, 8). Signal processing of the initial signal Vini1 and the initial signal Vini2 is as described in <1-3. Example of Sensing of Voltage Change in Self-capacitance Method>. In the driving method of the sensing device 10, a period for executing the baseline scan 1 is referred to as a second initial voltage sensing period, and the initial output signal Voutb generated in the second initial voltage sensing period is referred to as a second initial voltage.

Figure 13:
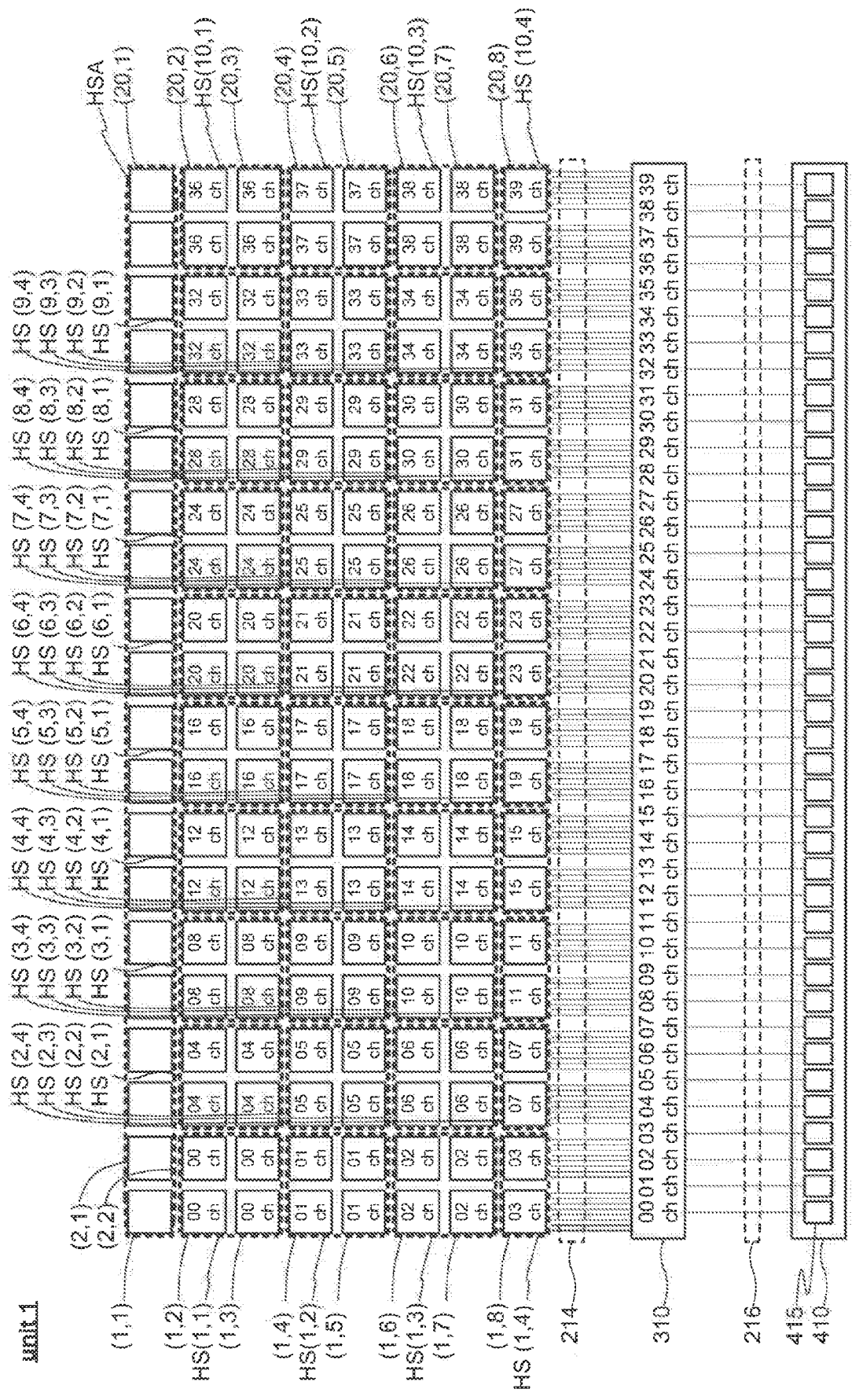
FIG. 13 is a diagram for explaining a configuration of a sensing device (unit 1) according to an embodiment of the present invention.

As shown in FIG. 13, in unit 1, a proximity sensor HSA is composed of the sensing electrodes 180 at the coordinates (1, 1) to (20, 1). In the second initial voltage sensing period, the proximity sensor HSA is supplied with the AC square wave Vsig but not connected to the channel in the multiplexer 310. Current fluctuation according to the AC square wave Vsig for the proximity sensor HSA is not converted into the voltage fluctuation, and the initial signal Vini1 or the initial signal Vini2 corresponding to the proximity sensor HSA is not generated.

As shown in FIG. 13, in unit 1, the proximity sensors HS (M, 1) to (M, 3) are composed of four sensing electrodes 180, and the proximity sensor HS (M, 4) is composed of two sensing electrodes 180. The numerical value M is an integer of 1 to 10. For example, the proximity sensor HS (1, 1) is composed of the sensing electrodes 180 at the coordinates (1, 2), (1, 3), (2, 2), and (2, 3), and the proximity sensor HS (1, 4) is composed of the sensing electrodes 180 at the coordinates (1, 8) and (2, 8). Similar to the proximity sensors HS (1, 1) to (1, 4), each of the proximity sensors HS (2, 1) to (10, 4) is composed of four sensing electrodes 180 or two corresponding sensing electrodes 180.

Similar to unit 0, in unit 1, the proximity sensors HS (1, 1) to (10, 4) are electrically connected to 00 channel (00ch) to 39 channel (39ch) in the multiplexer 310, respectively.

<1-5-1-3. Third Initial Voltage Sensing Period>

The sensing device 10 executes the baseline scan 2 in step 405 (S405) following step 403 (S403). In the baseline scan 2, in the non-existence state where the sensing object 490 does not exist, the initial signal Vini1 and the initial signal Vini2 are generated for each proximity sensor HS using the configuration of unit 2 shown in FIG. 14. The coordinates of each proximity sensor HS of unit 2 are shifted by 1 column of the sensing electrode 180 with respect to unit 0. For example, the proximity sensor HS (1, 1) is composed of four sensing electrodes 180 at the coordinates (2, 1), (2, 2), (3, 1), and (3, 2), and the proximity sensor HS (10, 1) is composed of two sensing electrodes 180 at the coordinates (20, 1) and (20, 2). Signal processing of the initial signal Vini1 and the initial signal Vini2 is as described in <1-3. Example of Sensing of Voltage Change in Self-capacitance Method>. In the driving method of the sensing device 10, a period for executing the baseline scan 2 is referred to as a third initial voltage sensing period, and the initial output signal Voutb generated in the third initial voltage sensing period is referred to as a third initial voltage.

Figure 14:
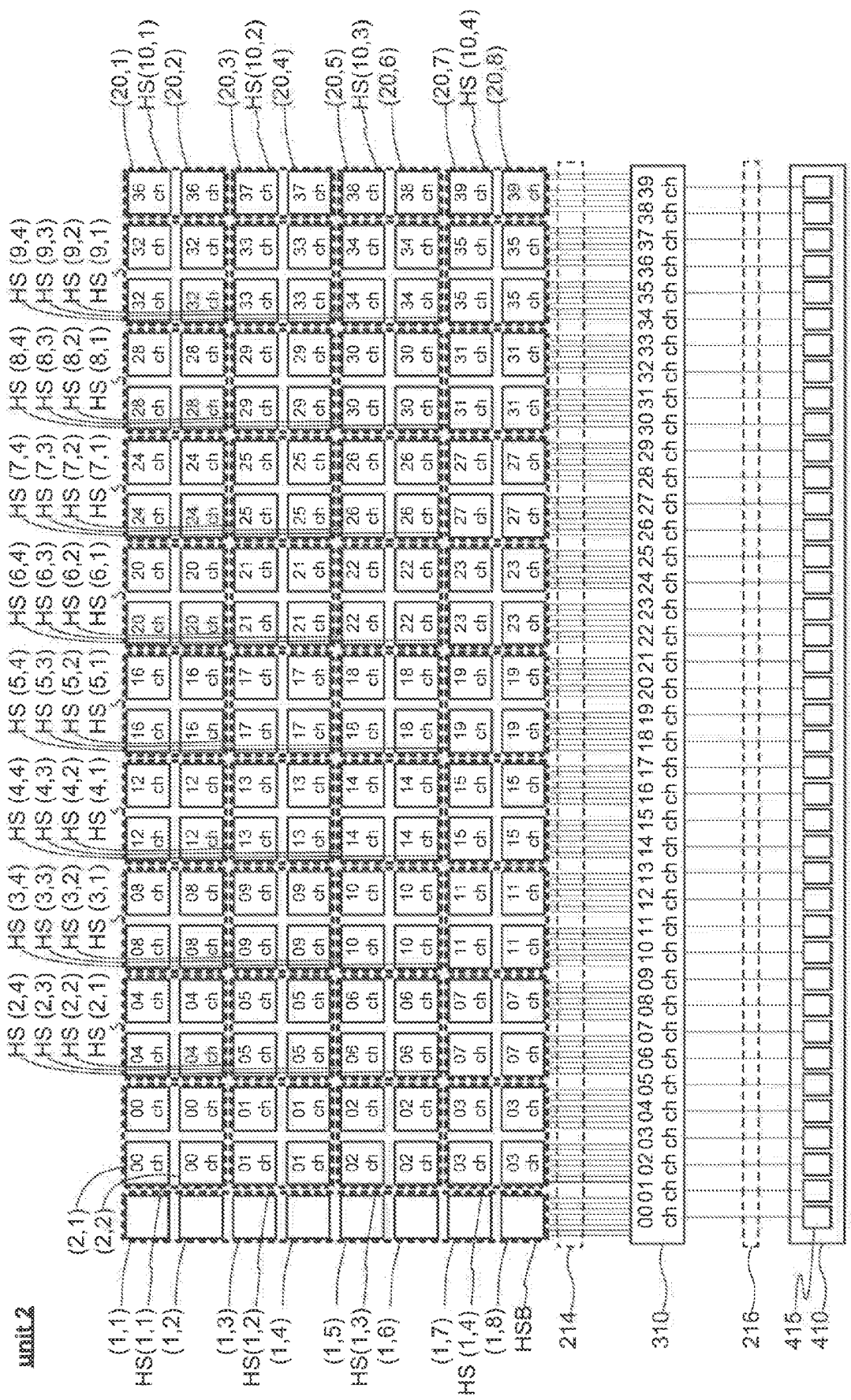
FIG. 14 is a diagram for explaining a configuration of a sensing device (unit 2) according to an embodiment of the present invention.

As shown in FIG. 14, in unit 2, a proximity sensor HSB is composed of the sensing electrodes 180 at the coordinates (1, 1) to (1, 8). In the third initial voltage sensing period, the proximity sensor HSB is supplied with the AC square wave Vsig but not connected to the channel in the multiplexer 310. Current fluctuation according to the AC square wave Vsig for the proximity sensor HSB is not converted into the voltage fluctuation, and the initial signal Vini1 or the initial signal Vini2 corresponding to the proximity sensor HSB is not generated.

As shown in FIG. 14, in unit 2, the proximity sensors HS (1, N) to (9, N) are composed of four sensing electrodes 180, and the proximity sensor HS (10, N) is composed of two sensing electrodes 180. The numerical value N is an integer of 1 to 4. For example, the proximity sensor HS (1, 1) is composed of the sensing electrodes 180 at the coordinates (2, 1), (2, 2), (3, 1), and (3, 2), the proximity sensor HS (1, 2) is composed of the sensing electrodes 180 at the coordinates (2, 3), (2, 4), (3, 3), and (3, 4), and the proximity sensor HS (10, 4) is composed of the sensing electrodes 180 at the coordinates (20, 7), and (20, 8). Similar to the proximity sensors HS (1, 1), (1, 2), and (10, 4), each of the proximity sensors HS (1, 3) to (10, 3) is composed of four corresponding sensing electrodes 180 or two corresponding sensing electrodes 180.

Similar to unit 0, in unit 2, the proximity sensors HS (1, 1) to (10, 4) are electrically connected to 00 channel (00ch) to 39 channel (39ch) in the multiplexer 310, respectively.

<1-5-1-4. Fourth Initial Voltage Sensing Period>

The sensing device 10 executes the baseline scan 3 in step 407 (S407) following step 405 (S405). In the baseline scan 3, in the non-existence state where the sensing object 490 does not exist, the initial signal Vini1 and the initial signal Vini2 are generated for each proximity sensor HS using the configuration of unit 3 shown in FIG. 15. The coordinates of each proximity sensor HS of unit 3 are shifted by 1 column 1 row of the sensing electrode 180 with respect to unit 0. For example, the proximity sensor HS (1, 1) is composed of four sensing electrodes 180 at the coordinates (2, 2), (2, 3), (3, 2), and (3, 3), and the proximity sensor HS (10, 1) is composed of one sensing electrode 180 at the coordinate (20, 8).

Signal processing of the initial signal Vini1 and the initial signal Vini2 is as described in <1-3. Example of Sensing of Voltage Change in Self-capacitance Method>. In the driving method of the sensing device 10, a period for executing the baseline scan 3 is referred to as a fourth initial voltage sensing period, and the initial output signal Voutb generated in the fourth initial voltage sensing period is referred to as a fourth initial voltage.

Figure 15:
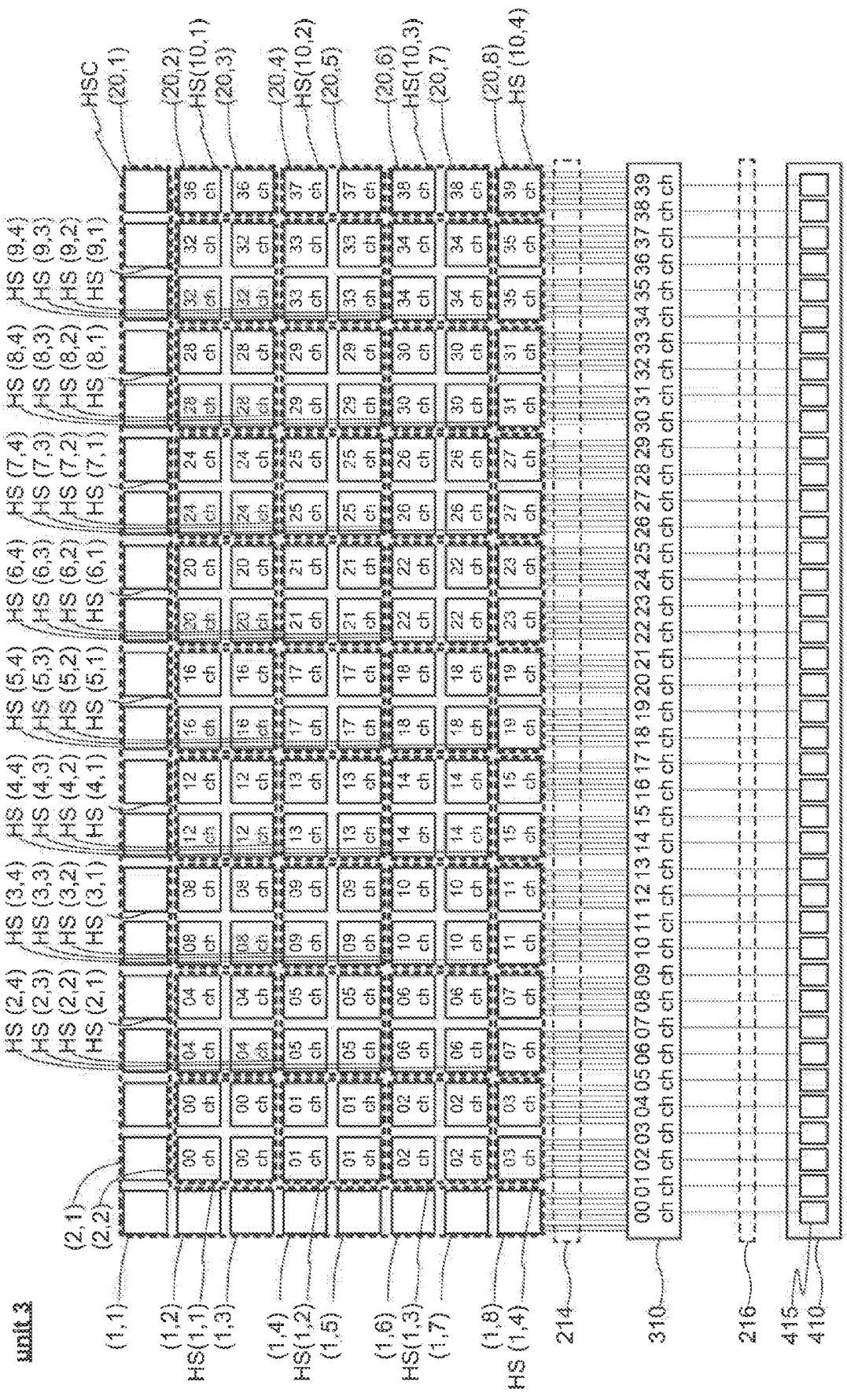
FIG. 15 is a diagram for explaining a configuration of a sensing device (unit 3) according to an embodiment of the present invention.
Figure 16:
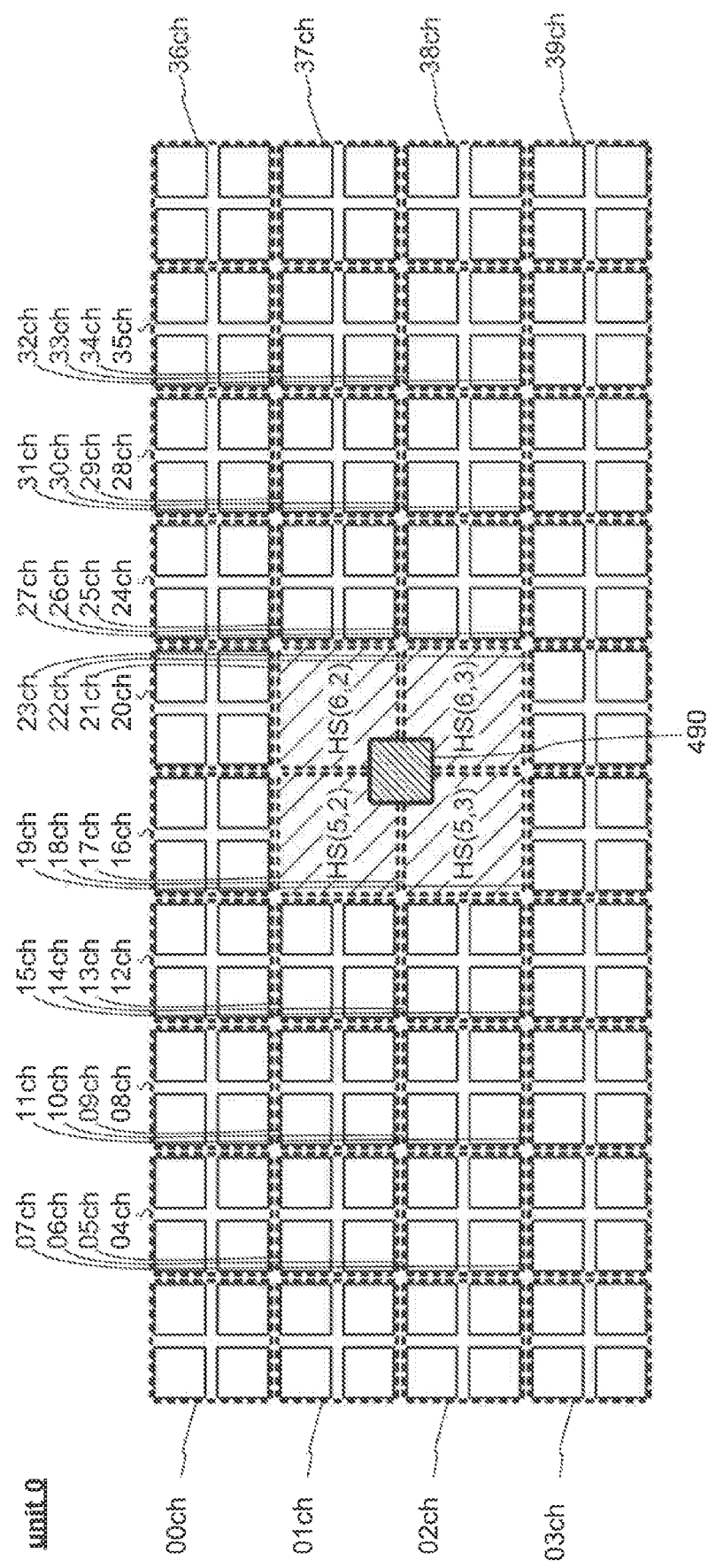
FIG. 16 is a diagram for explaining an example of a positional relationship between a sensing object and a sensing device in a bundle scan 0 according to an embodiment of the present invention.

As shown in FIG. 15, in unit 3, a proximity sensor HSC is composed of the sensing electrodes 180 at the coordinates (1, 1) to (1, 8), and (2, 1) to (20, 1). In the fourth initial voltage sensing period, the proximity sensor HSC is supplied with the AC square wave Vsig but not connected to the channel in the multiplexer 310. Current fluctuation according to the AC square wave Vsig for the proximity sensor HSC is not converted into the voltage fluctuation, and the initial signal Vini1 or the initial signal Vini2 corresponding to the proximity sensor HSC is not generated.

As shown in FIG. 15, in unit 3, the proximity sensors HS (M, 1) to (M, 3) are composed of four sensing electrodes 180, and the numerical value M is an integer of 1 to 9. The proximity sensor HS (M, 4) is composed of two sensing electrodes 180, and the number M is an integer of 1 to 9. The proximity sensor HS (1, N) is composed of two sensing electrodes 180, and the numerical value N is an integer of 1 to 3. The proximity sensor HS (10, 4) is composed of one sensing electrode 180. For example, the proximity sensor HS (1, 1) is composed of the sensing electrodes 180 at the coordinates (2, 2), (2, 3), (3, 2), and (3, 3), the proximity sensor HS (1, 4) is composed of the sensing electrodes 180 at the coordinates (2, 8) and (3, 8), the proximity sensor HS (10, 1) is composed of the sensing electrodes 180 at the coordinates (20, 2) and (20, 3), and the proximity sensor HS (10, 4) is composed of the sensing electrode 180 at the coordinates (20, 8). Similar to the proximity sensors HS (1, 1), (1, 4), and (10, 1), each of the proximity sensors HS other than the proximity sensors HS (1, 1), (1, 4), (10, 1), and (10, 4) is composed of four corresponding sensing electrodes 180 or two corresponding sensing electrodes 180.

Similar to unit 0, the proximity sensors HS (1, 1) to (10, 4) are electrically connected to 00 channel (00ch) to 39 channel (39ch) in the multiplexer 310, respectively.

<1-5-1-5. First Sensing Voltage Sensing Period>

As shown in FIG. 11, The sensing device 10 executes the bundle scan 0 in step 409 (S409) following step 407 (S407). In the bundle scan 0, in the existence state where the sensing object 490 exists, the sensing signal Vdet1 and the sensing signal Vdet2 are generated for each proximity sensor HS using the configuration of unit 0 shown in FIG. 12 (unit 0).

Signal processing of the sensing signal Vdet1 or the sensing signal Vdet2 is as described in <1-3. Example of Sensing of Voltage Change in Self-capacitance Method>. In the driving method of the sensing device 10, a period for executing the bundle scan 0 is referred to as a first sensing voltage sensing period, the output signal Vout generated in the first sensing voltage sensing period is referred to as a first sensing voltage, and a plurality of first sensing voltages generated for each proximity sensor HS is collectively referred to as first sensing data RD0.

The calculation circuit 500 calculates the coordinates (y0, x0) of the sensing object 490 in the bundle scan 0 using the output signal Vout generated for each proximity sensor HS. For example, as shown in FIG. 16, the sensing object 490 exists across the proximity sensor HS (5, 2), the proximity sensor HS (5, 3), the proximity sensor HS (6, 2), and the proximity sensor HS (6, 3) in unit 0. In this case, the calculation circuit 500 calculates the coordinates (y0, x0) of the sensing object 490 in the bundle scan 0 using the output signal Vout generated for the proximity sensor HS (5, 2), the output signal Vout generated for the proximity sensor HS (5, 3), the output signal Vout generated for the proximity sensor HS (6, 2), and the output signal Vout generated for the proximity sensor HS (6, 3).

<1-5-1-6. Second Sensing Voltage Sensing Period>

The sensing device 10 executes the bundle scan 1 in step 417 (S417) following step 409 (S409). In the bundle scan 1, in the existence state where the sensing object 490 exists, the sensing signal Vdet1 and the sensing signal Vdet2 are generated for each proximity sensor HS using the configuration of unit1 shown in FIG. 13 (unit 1).

Signal processing of the sensing signal Vdet1 or the sensing signal Vdet2 is as described in <1-3. Example of Sensing of Voltage Change in Self-capacitance Method>. In the driving method of the sensing device 10, a period for executing the bundle scan 1 is referred to as a second sensing voltage sensing period, the output signal Vout generated in the second sensing voltage sensing period is referred to as a second sensing voltage, and a plurality of second sensing voltages generated for each proximity sensor HS is collectively referred to as second sensing data RD1.

Figure 17:
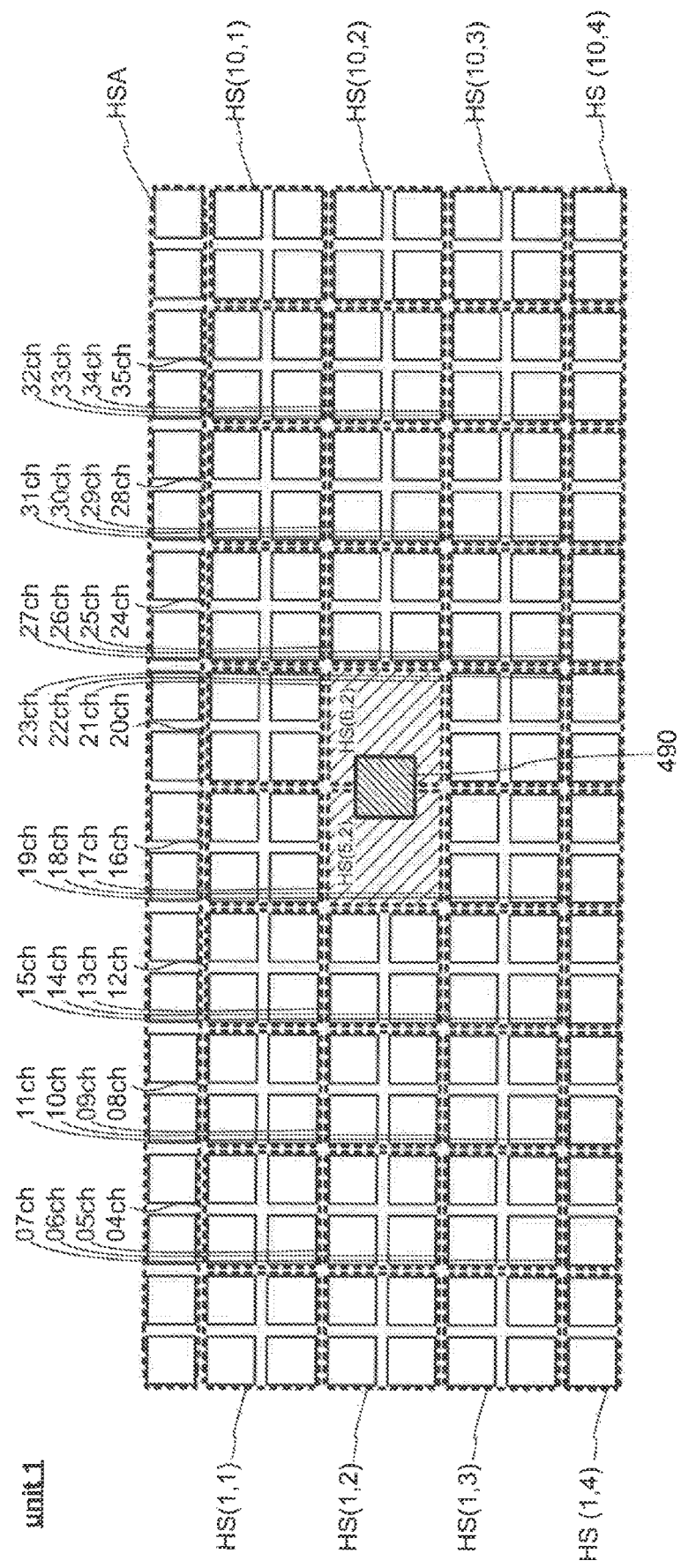
FIG. 17 is a diagram for explaining an example of a positional relationship between a sensing object and a sensing device in a bundle scan 1 according to an embodiment of the present invention.

The calculation circuit 500 calculates the coordinates (y1, x1) of the sensing object 490 in the bundle scan 1 using the output signal Vout generated for each proximity sensor HS. For example, as shown in FIG. 17, the sensing object 490 exists across the proximity sensor HS (5, 2) and the proximity sensor HS (6, 2) in unit 1. In this case, the calculation circuit 500 calculates the coordinates (y1, x1) of the sensing object 490 in the bundle scan 1 using the output signal Vout generated for the proximity sensor HS (5, 2) and the output signal Vout generated for the proximity sensor HS (6, 2).

<1-5-1-7. Third Sensing Voltage Sensing Period>

The sensing device 10 executes the bundle scan 2 in step 425 (S425) following step 417 (S417). In the bundle scan 2, in the existence state where the sensing object 490 exists, the sensing signal Vdet1 and the sensing signal Vdet2 are generated for each proximity sensor HS using the configuration of unit2 shown in FIG. 14 (unit2).

Signal processing of the sensing signal Vdet1 or the sensing signal Vdet2 is as described in <1-3. Example of Sensing of Voltage Change in Self-capacitance Method>. In the driving method of the sensing device 10, a period for executing the bundle scan 2 is referred to as a third sensing voltage sensing period, the output signal Vout generated in the third sensing voltage sensing period is referred to as a third sensing voltage, and a plurality of third sensing voltages generated for each proximity sensor HS is collectively referred to as a third sensing data RD2.

Figure 18:
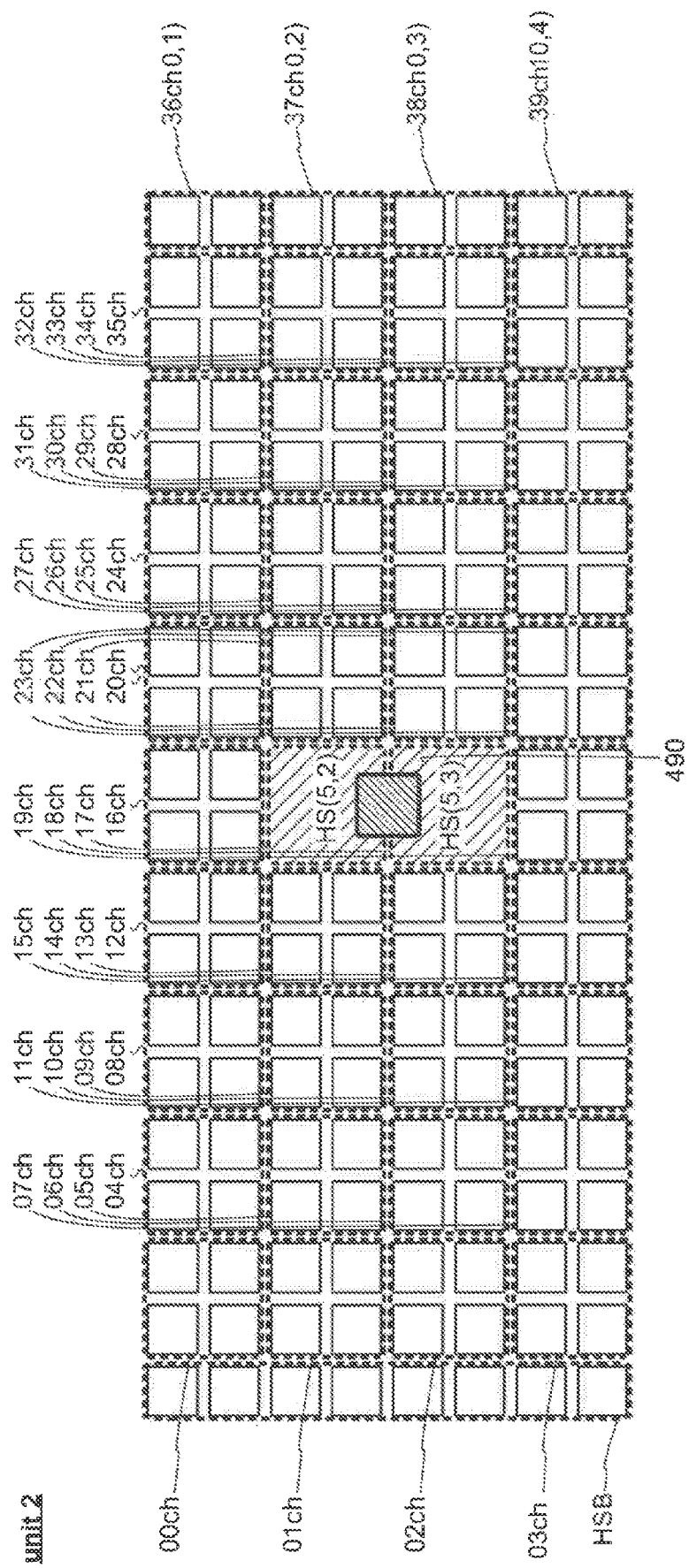
FIG. 18 is a diagram for explaining an example of a positional relationship between a sensing object and a sensing device in a bundle scan 2 according to an embodiment of the present invention.

The calculation circuit 500 calculates the coordinates (y2, x2) of the sensing object 490 in the bundle scan 2 using the output signal Vout generated for each proximity sensor HS. For example, as shown in FIG. 18, the sensing object 490 exists across the proximity sensor HS (5, 2) and the proximity sensor HS (5, 3) in unit 2. In this case, the calculation circuit 500 calculates the coordinates (y2, x2) of the sensing object 490 in the bundle scan 2 using the output signal Vout generated for the proximity sensor HS (5, 2) and the output signal Vout generated for the proximity sensor HS (5, 3).

<1-5-1-8. Fourth Sensing Voltage Sensing Period>

The sensing device 10 executes the bundle scan 3 in step 433 (S433) following step 425 (S425). In bundle scan 3, in the existence state where the sensing object 490 exists, the sensing signal Vdet1 and the sensing signal Vdet2 are generated for each proximity sensor HS using the configuration of unit3 shown in FIG. 15 (unit3).

Signal processing of the sensing signal Vdet1 or the sensing signal Vdet2 is as described in <1-3. Example of Sensing of Voltage Change in Self-capacitance Method>. In the driving method of the sensing device 10, a period for executing the bundle scan 3 is referred to as a fourth sensing voltage sensing period, the output signal Vout generated in the fourth sensing voltage sensing period is referred to as a fourth sensing voltage, and a plurality of fourth sensing voltage generated for each proximity sensor HS is collectively referred to as a fourth sensing data RD3.

Figure 19:
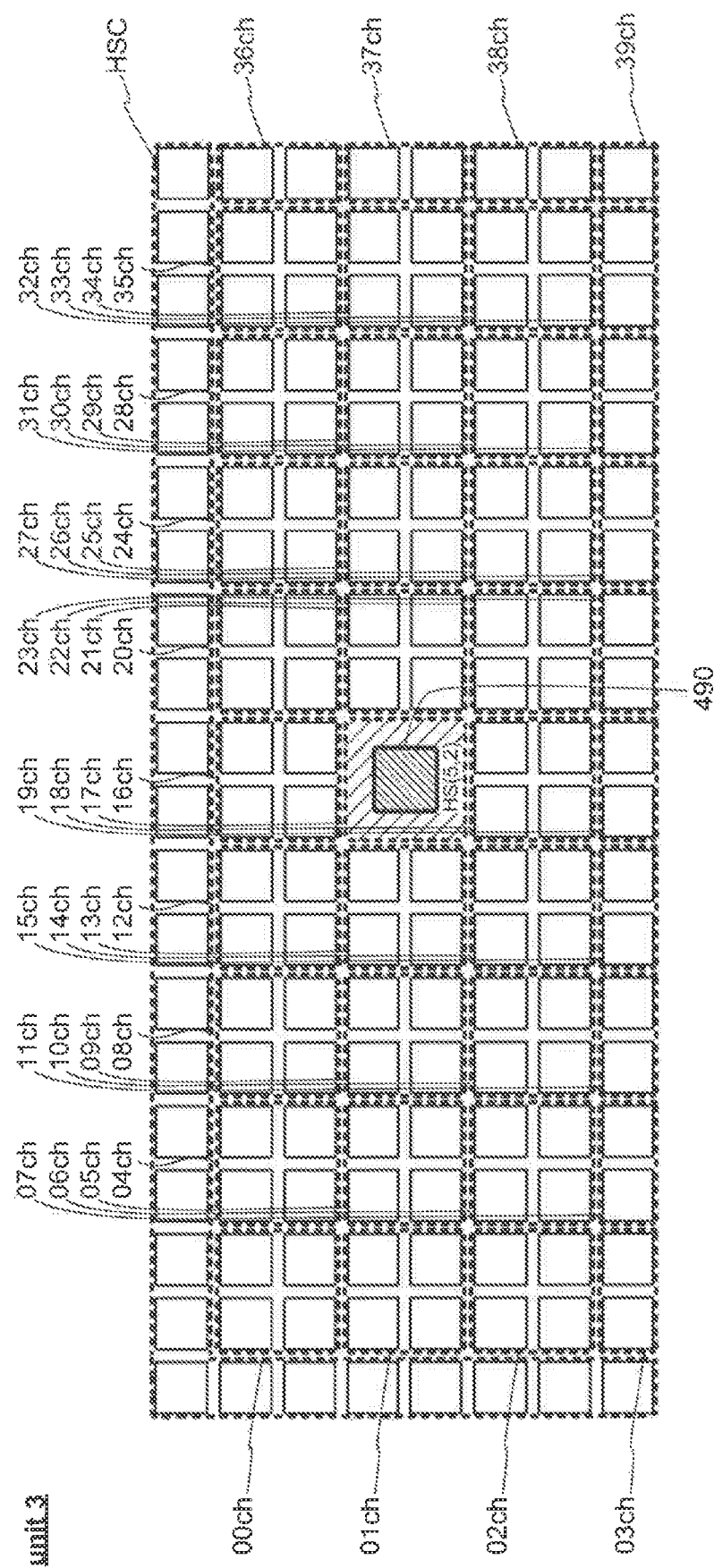
FIG. 19 is a diagram for explaining an example of a positional relationship between a sensing object and a sensing device in a bundle scan 3 according to an embodiment of the present invention.

The calculation circuit 500 calculates the coordinates (y3, x3) of the sensing object 490 in the bundle scan 3 using the output signal Vout generated for each proximity sensor HS. For example, as shown in FIG. 19, the sensing object 490 exists in the proximity sensor HS (5, 2) in unit 2. In this case, the calculation circuit 500 calculates the coordinates (y3, x3) of the sensing object 490 in the bundle scan 3 using the output signal Vout generated for the proximity sensor HS (5, 2).

The calculation circuit 500 calculates the position coordinates (Y, X) of the sensing object 490 using the coordinates (y0, x0) of the sensing object 490 in the bundle scan 0, the coordinates (y1, x1) of the sensing object 490 in the bundle scan 1, the coordinates (y2, x2) of the sensing object 490 in the bundle scan 2, and the coordinates (y3, x3) of the sensing object 490 in the bundle scan 3. For example, the position coordinate (Y, X) of the sensing object 490 may be calculated using an average value of the output signal Vout in each bundle scan or may be calculated using a calculation method using a known average value or the center of gravity.

When step 433 (S433) ends, the calculation circuit 500 repeatedly executes step 409 (S409) to step 433 (S433). The calculation circuit 500 sends the output signal Vout detected in each of the repeatedly executed steps 409 (S409) to 433 (S433).

Similar to the second initial voltage sensing period, current fluctuation according to the AC square wave Vsig for the proximity sensor HSA is not converted into the voltage fluctuation, and the sensing signal Vdet corresponding to the proximity sensor HSA is not generated in the second sensing voltage sensing period. Similar to the third initial voltage sensing period, current fluctuation according to the AC square wave Vsig for the proximity sensor HSB is not converted into the voltage fluctuation, and the sensing signal Vdet corresponding to the proximity sensor HSB is not generated in the third sensing voltage sensing period. Similar to the fourth initial voltage sensing period, current fluctuation according to the AC square wave Vsig for the proximity sensor HSC is not converted into the voltage fluctuation, and the sensing signal Vdet corresponding to the proximity sensor HSC is not generated in the fourth sensing voltage sensing period.

As described above, the sensing device 10 is configured to include the first initial voltage sensing period, the second initial voltage sensing period, the third initial voltage sensing period, the fourth initial voltage sensing period, the first sensing voltage sensing period, the second sensing voltage sensing period, the third sensing voltage sensing period and the fourth sensing voltage sensing period appear continuously. That is, a plurality of sensing periods appear continuously, and the sensing device 10 controls the proximity sensors, the control circuit 200, the electrode selection circuit 300, the sensing circuit 400, the calculation circuit 500, and the like, so that the sensing electrode included in the sensing unit differs by 1 row in the row direction or by 1 column in the column direction for each sensing period in a succession of the plurality of sensing periods.

The sensing device 10 executes the overlap scan by a plurality of bundle scans using the proximity sensor HS including the plurality of sensing electrodes 180. As a result, it is possible to detect the sensing position coordinates of the sensing object 490 using the plurality of proximity sensors HS in the plurality of bundle scans for the existence state where the sensing object 490 exists. As a result, it is possible to suppress the sensing object 490 from being sensed over the plurality of proximity sensors HS, and it is possible to improve the sensing accuracy of the sensing position coordinates of the sensing object 490.

2. Second Embodiment

Figure 20:
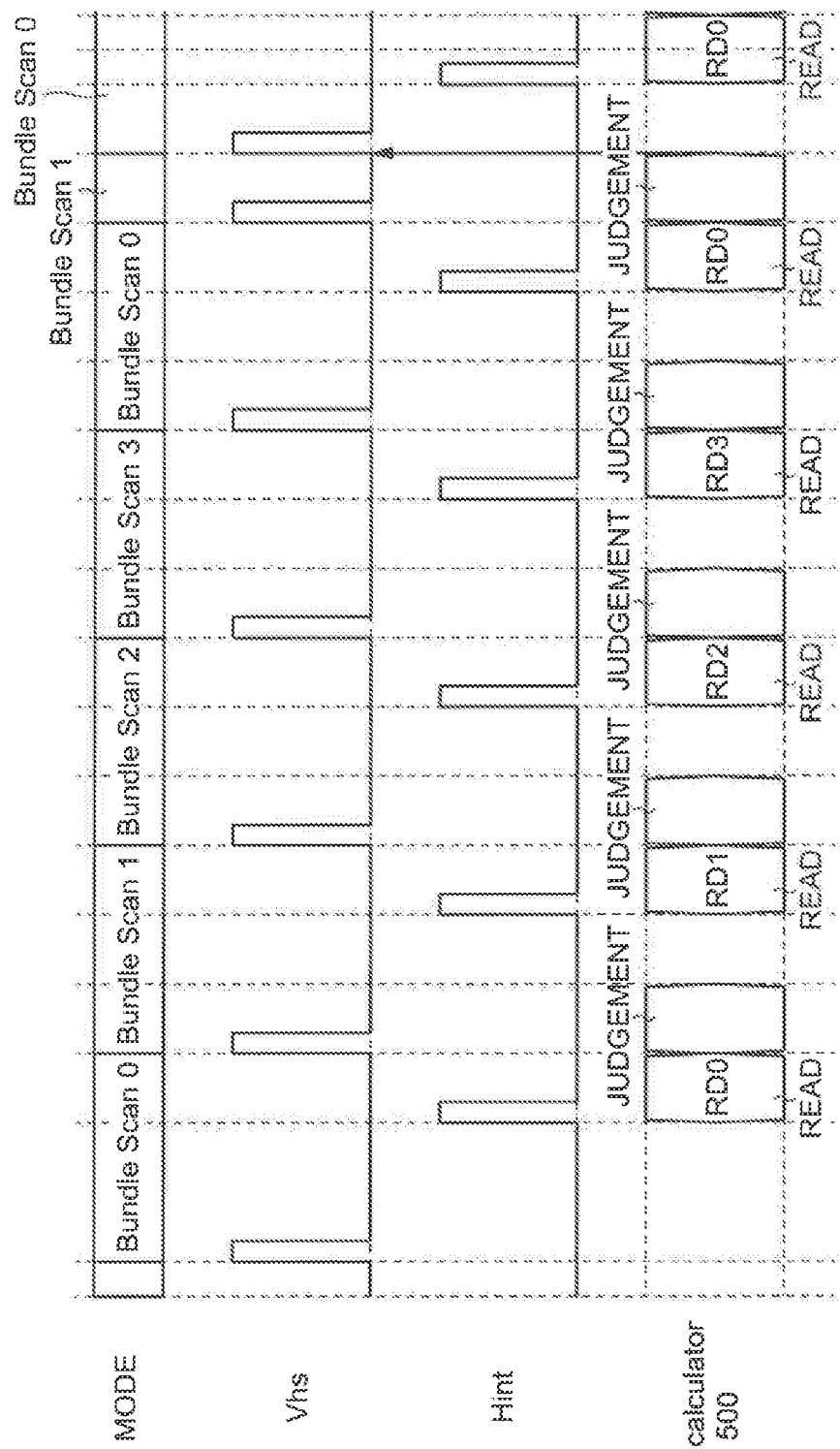
FIG. 20 is a timing chart for explaining a driving method of a sensing device according to the second embodiment of the present invention.
Figure 21:
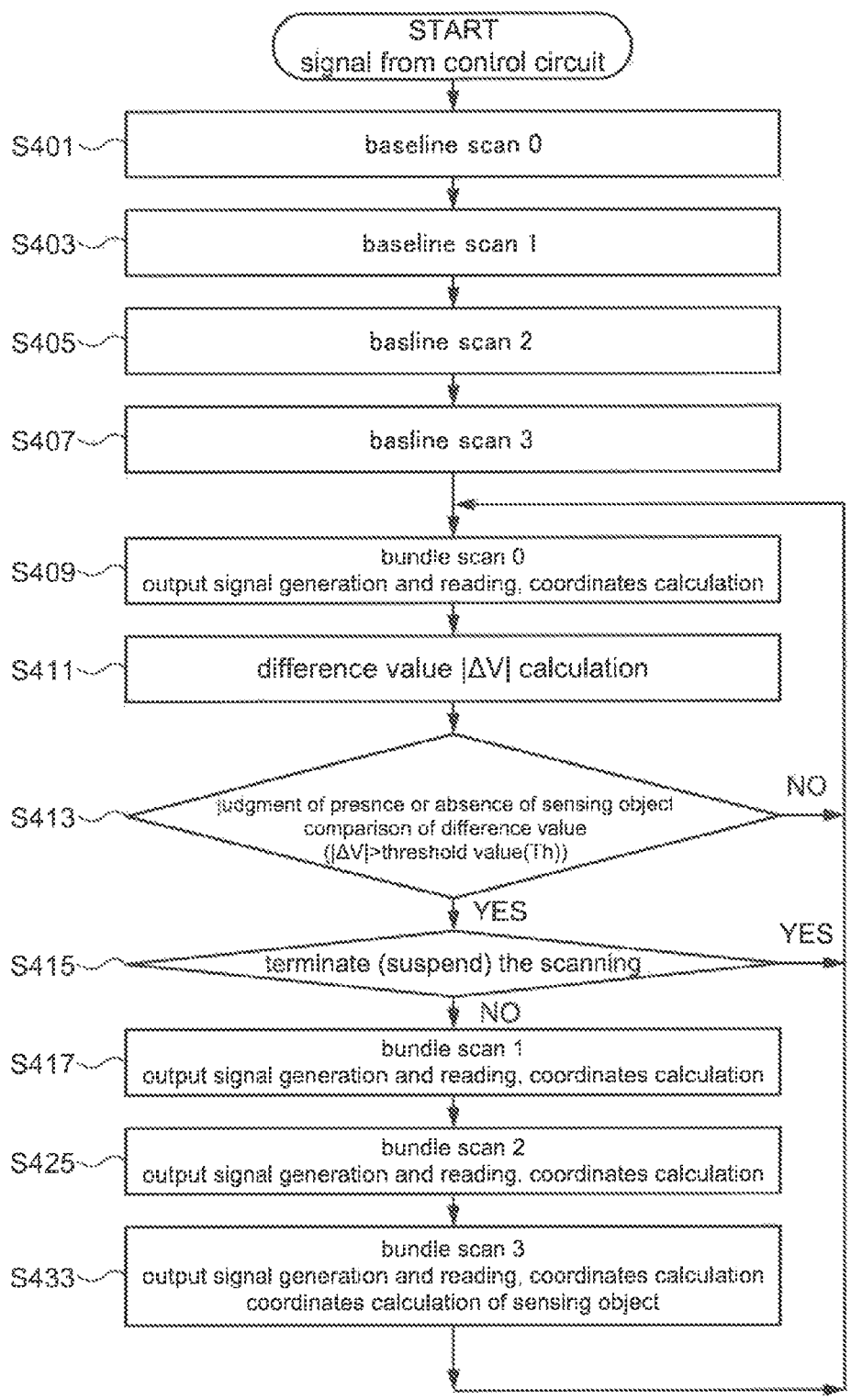
FIG. 21 is a flowchart for explaining a driving method of a sensing device according to the second embodiment of the present invention.
Figure 22:
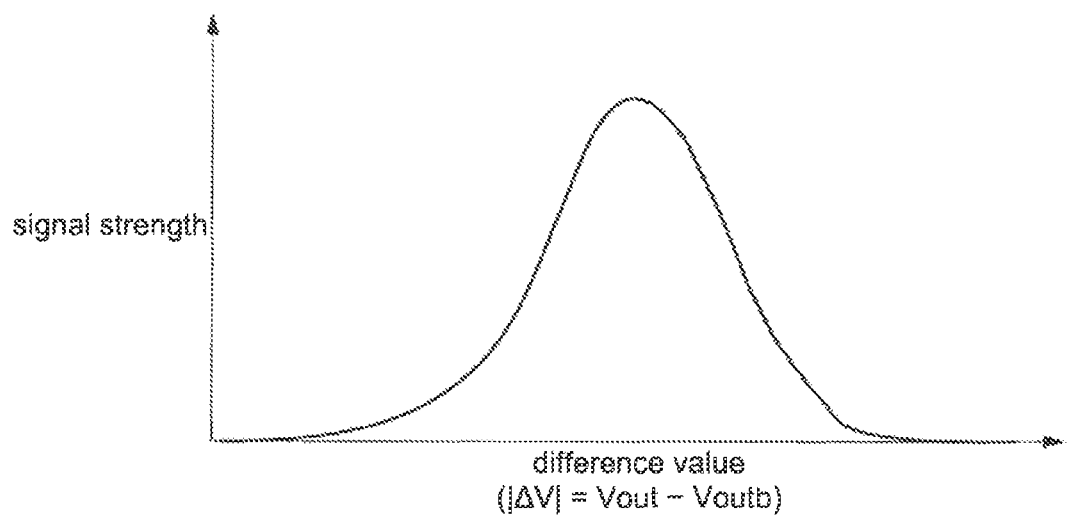
FIG. 22 is a diagram for explaining a step 413 (S413) of a driving method of a sensing device according to the second embodiment.
Figure 23:
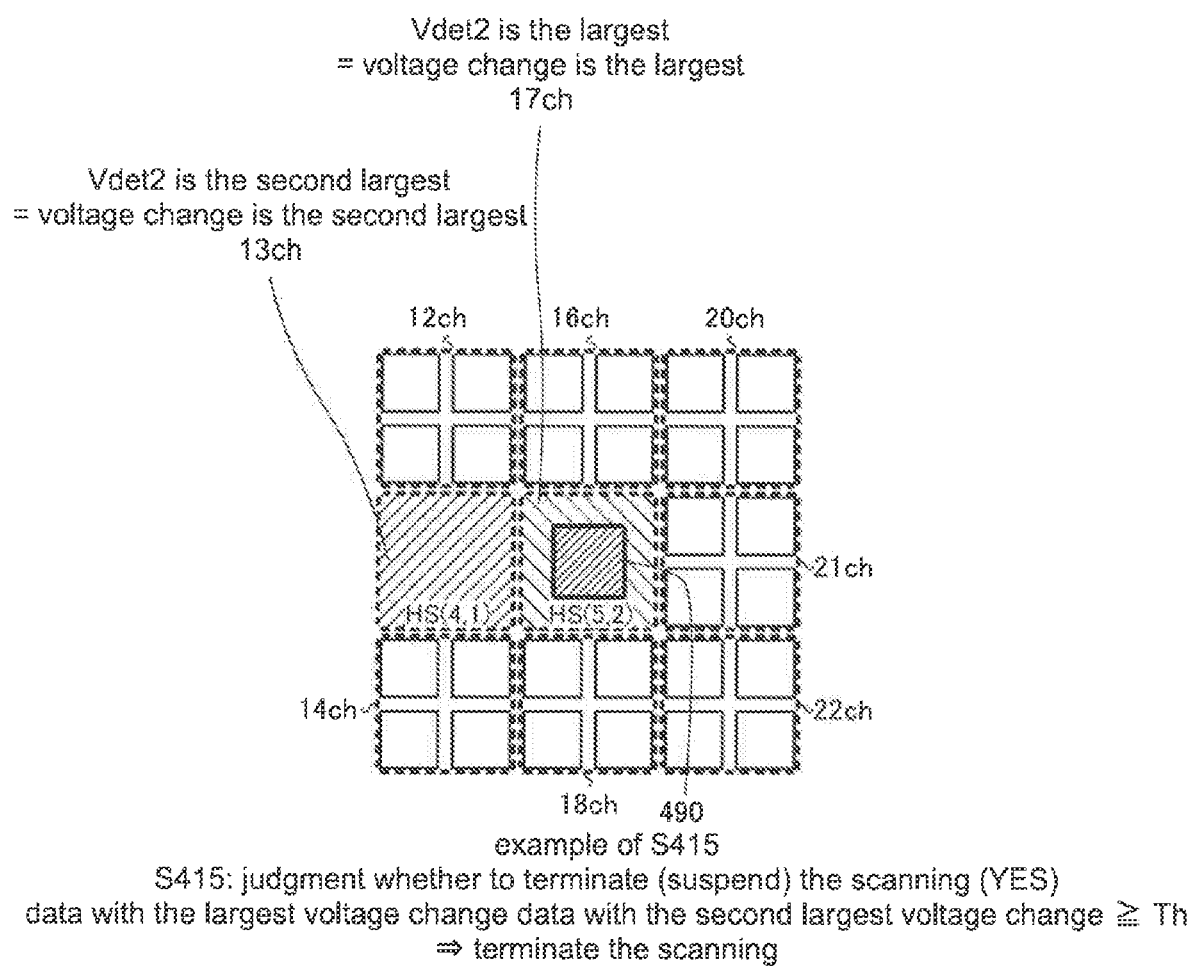
FIG. 23 is a diagram for explaining a step 415 (S415) of a driving method of a sensing device according to the second embodiment.
Figure 24:
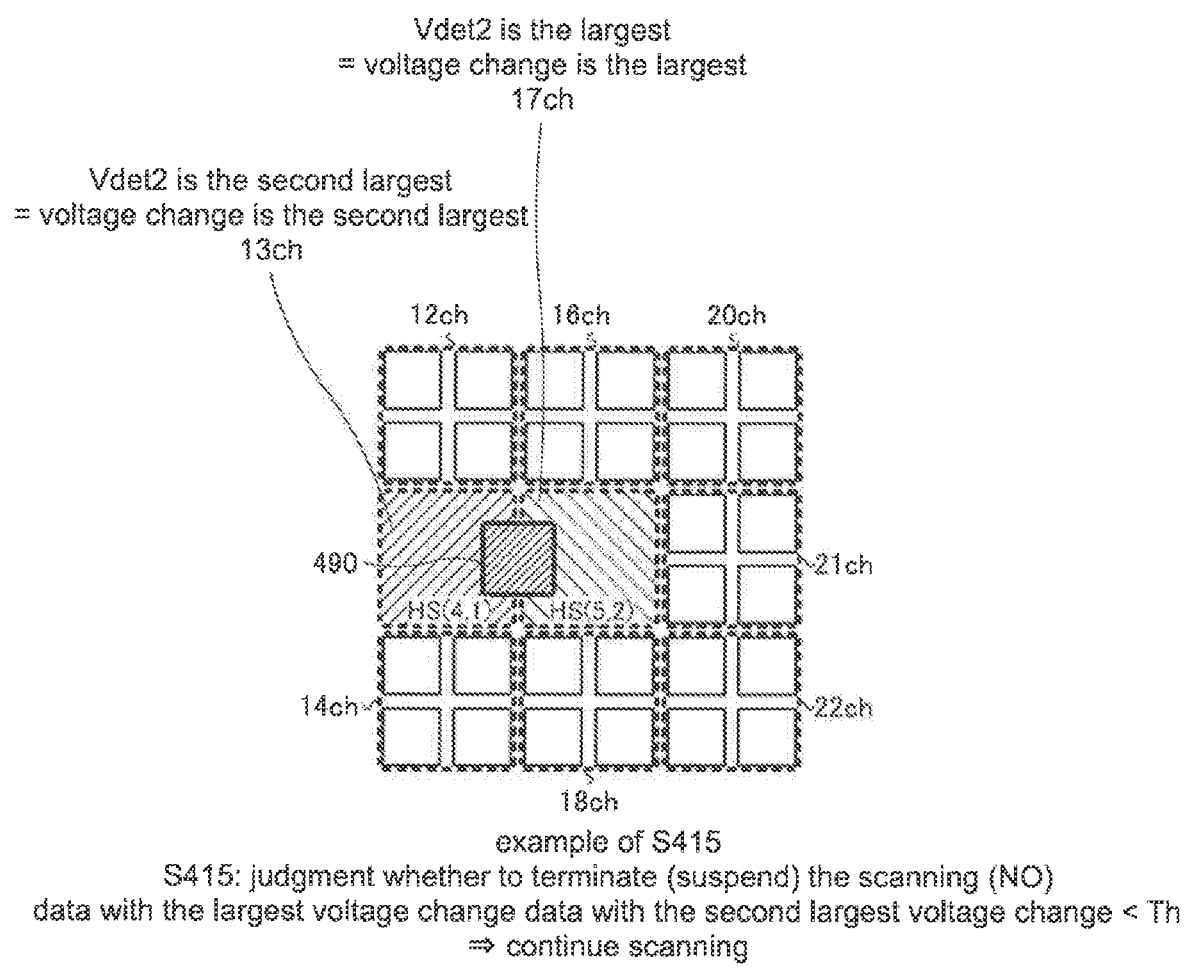
FIG. 24 is a diagram for explaining a step 415 (S415) of a driving method of a sensing device according to the second embodiment.
Figure 25:
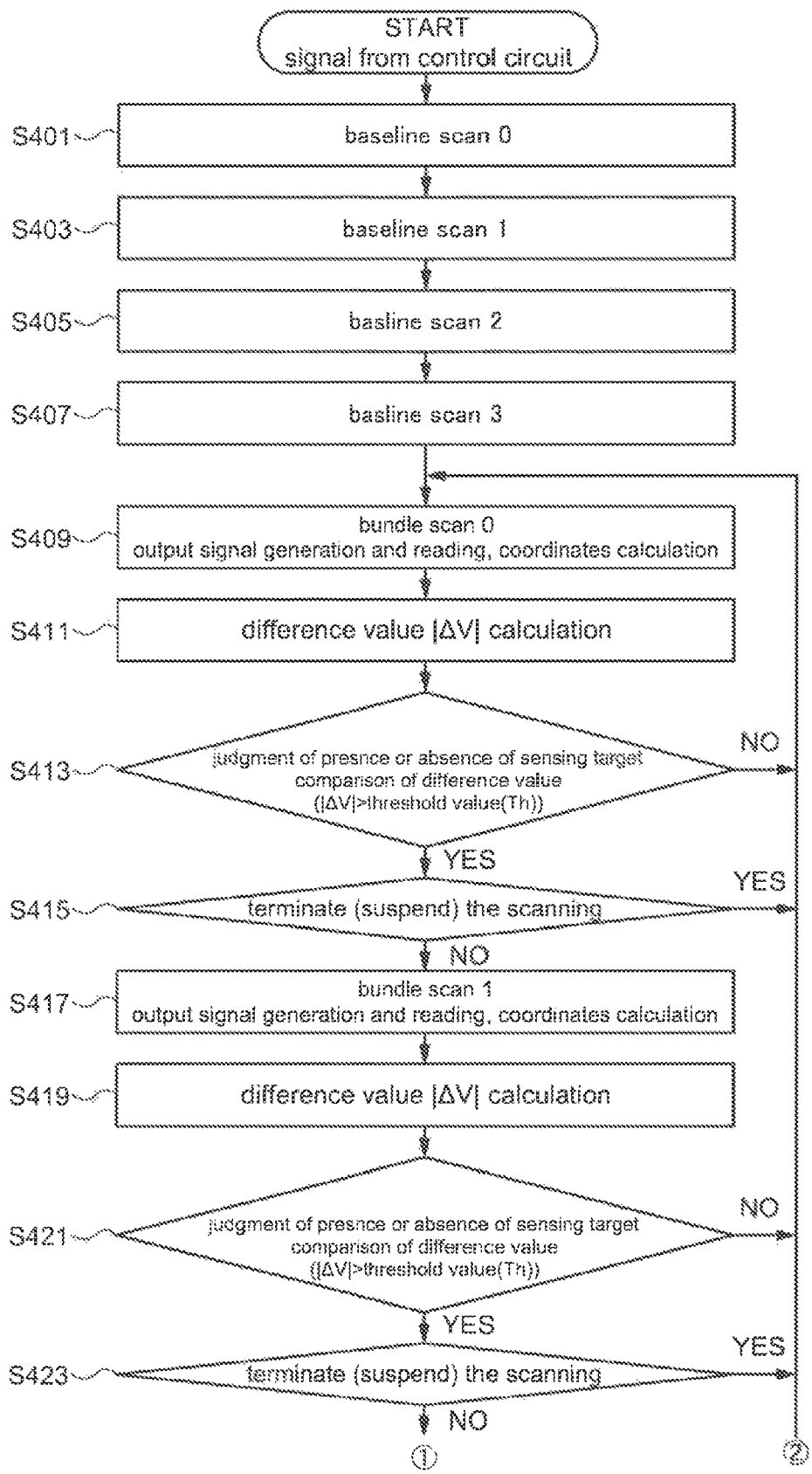
FIG. 25 is a flowchart for explaining a driving method of a sensing device according to the second embodiment of the present invention.
Figure 26:
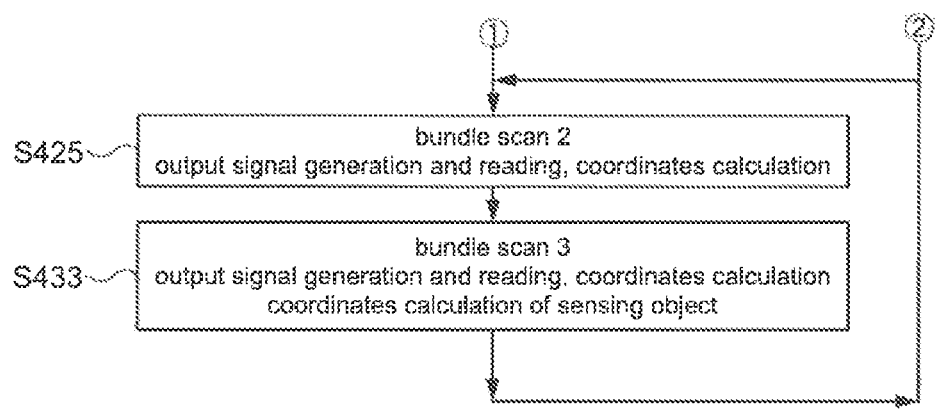
FIG. 26 is a flowchart for explaining a driving method of a sensing device according to the second embodiment of the present invention.

In the driving method of the sensing device 10 according to the second embodiment, a proximity sensing operation capable of terminating the bundle scan between the bundle scan 0 and the bundle scan 1 will be described. FIG. 20 is a timing chart for explaining a driving method of the sensing device 10 according to the second embodiment of the present invention. FIG. 21 is a flowchart for explaining a driving method of the sensing device 10 according to the second embodiment of the present invention. FIG. 22 is a diagram for explaining step 413 (S413) of the driving method of the sensing device 10 according to the second embodiment of the present invention. FIG. 23 is a diagram for explaining step 415 (S415) of the driving method of the sensing device 10 according to the second embodiment of the present invention. FIG. 24 is a diagram for explaining step 415 (S415) of the driving method of the sensing device 10 according to the second embodiment of the present invention. FIG. 25 is a flowchart for explaining a first modification of the driving method of the sensing device 10 according to the second embodiment of the present invention. FIG. 26 is a flowchart for explaining a first modification of the driving method of the sensing device 10 according to the second embodiment of the present invention. The driving method of the sensing device 10 according to the second embodiment shown in FIG. 20 to FIG. 27 is an example, and the driving method of the sensing device 10 is not limited to the configuration shown in FIG. 20 to FIG. 27. The same or similar components as those of FIG. 1 to FIG. 19 will not be described here.

Similar to the driving method of the sensing device 10 according to the first embodiment, the driving method of the sensing device 10 according to the second embodiment starts the proximity sensing operation when the control signal Vhs is supplied to the sensing circuit 400 (the sense timing control circuit 440) (FIG. 2) from the control circuit 200 (FIG. 2).

Similar to the driving method of the sensing device 10 according to the first embodiment, in the driving method of the sensing device 10 according to the second embodiment, an example in which the coefficient m is 20, the coefficient n is 8, the coefficient M is 10, and the coefficient N is 4 is shown. That is, the sensing device 10 has 40 proximity sensors HS composed of 160 sensing electrodes 180.

In the timing chart shown in FIG. 20, bundled scan0, bundled scan1, bundled scan2, and bundled scan3 of the driving method of the sensing device 10 according to the second embodiment are shown as modes (MODE). In addition, the control signal Vhs supplied from the control circuit 200 (FIG. 2) to the sensing circuit 400 (the sense timing control circuit 440) (FIG. 2) is shown between scans. Furthermore, the control signal Hint supplied from the sensing circuit 400 to the calculation circuit 500 is shown between supplying the control signal Vhs from the control circuit 200 (FIG. 2) to the sensing circuit 400 (the sense timing control circuit 440) (FIG. 2) and supplying the next control signal Vhs from the control circuit 200 (FIG. 2) to the sensing circuit 400 (the sense timing control circuit 440) (FIG. 2). In addition, the state of the calculation circuit 500 is shown.

The sensing device 10 executes each scan, for example, in synchronization with the control signal Vhs. For example, when the control signal Hint is supplied from the sensing circuit 400, the calculation circuit 500 is in a read state (READ state), and reads the output signal Vout (e.g., the first sensing data RD0) generated for each proximity sensor HS which has been temporarily stored in the memory device included in the signal processing circuit 430 in synchronization with the control signal Hint supplied from the sensing circuit 400. In addition, when a control signal Vht is supplied from the control circuit 200 to the sensing circuit 400, the calculation circuit 500 is in a judgement state (JUDGEMENT state), and judges whether to continue or terminate the scan using a difference value |ΔV| and a comparison result of the difference value |ΔV| and a threshold value (Th).

In the driving method of the sensing device 10 according to the second embodiment shown in FIG. 21, since the driving method, configuration, and function of the sensing device 10 in step 401 (S401), step 403 (S403), step 405 (S405), step 407 (S407), step 409 (S409), step 417 (S417), step 425 (S425), and step 433 (S433) are the same as those of the driving method of the sensing device 10 according to the first embodiment, descriptions thereof are omitted. In the description of the driving method of the sensing device 10 according to the second embodiment, a driving method different from the driving method of the sensing device 10 according to the first embodiment will be described.

<2-1. Calculation of Difference Value |ΔV|>

The sensing device 10 executes the baseline scan 0 in step 409 (S409). The sensing device 10 calculates the difference value |ΔV| in step 411 (S411) following step 409 (S409).

Specifically, the difference value calculation circuit 530 included in the calculation circuit 500 reads the first sensing data RD0 (a plurality of first sensing voltage values Vout) generated for each proximity sensor HS which has been temporarily stored in the memory device included in the signal processing circuit 430 in synchronization with the control signal Hint. In addition, the difference value calculation circuit 530 reads the plurality of first initial voltage values Voutb generated for each proximity sensor HS which has been temporarily stored in the memory device included in the signal processing circuit 510.

The difference value calculation circuit 530 generates a difference signal of the first detected voltage value Vout and the plurality of first initial voltage values Voutb (absolute value |ΔV|=Vout−Voutb) using the plurality of first corresponding detected voltage values Vout and the plurality of first corresponding initial voltage values Voutb. The difference value calculation circuit 530 supplies the generated plurality of absolute values |ΔV| to the comparison judgment circuit 540. In the second embodiment, the absolute value |ΔV| is referred to as the difference value |ΔV|.

<2-2. Comparison and Judgment of Difference Value |ΔV| and Threshold Value (Th)>

The sensing device 10 compares the difference value |ΔV| with the threshold value (Th) in step 413 (S413) following step 411 (S411). Specifically, the comparison judgment circuit 540 included in the calculation circuit 500 compares the absolute value |ΔV| with the predetermined threshold voltage (Th) in synchronization with the control signal Hint. When the difference value |ΔV| is plotted against the signal strength, for example, a plot diagram as shown in FIG. 22 is obtained.

If the absolute value |ΔV| is less than the threshold voltage (Vth), the comparison judgment circuit 540 judges that there is no sensing object (non-existence state, NO in the flowchart shown in FIG. 21). When the comparison judgment circuit 540 judges NO, the sensing device 10 returns to step 409 (S409) and executes the bundle scan 0.

If the absolute value |ΔV| is equal to or higher than the threshold voltage (Th), the comparison judgment circuit 540 judges that there is a sensing object (existence state, YES in the flowchart shown in FIG. 21). When the comparison judgment circuit 540 judges YES, the comparison judgment circuit 540 executes step 415 (S415).

The comparison judgment circuit 540 may calculate a sum of the plurality of absolute values |ΔV| (Sum (a plurality of absolute values |ΔV|)) in synchronization with the control signal Hint. The comparison judgment circuit 540 may compare the Sum (a plurality of absolute values |ΔV|) with a predetermined threshold voltage (Th). If the Sum (a plurality of absolute values |ΔV|) is less than the threshold voltage (Vth), the comparison judgment circuit 540 may judge that there is no sensing object (non-existence state, NO in the flowchart shown in FIG. 21). When the comparison judgment circuit 540 judges NO, the sensing device 10 returns to step 409 (S409) and executes the bundle scan 0. The Sum (a plurality of absolute values |ΔV|) may be compared with a predetermined threshold voltage (Vth), and if the Sum (a plurality of absolute values |ΔV|) is equal to or greater than the threshold voltage (Vth), it may be judged that there is the sensing object (existence state, YES in the flowchart shown in FIG. 21). When the comparison judgment circuit 540 judges YES, the comparison judgment circuit 540 executes step 415 (S415).

The sensing device 10 judges whether to terminate (suspend) the bundle scan in step 415 (S415) following step 413 (S413).

For example, as shown in FIG. 23, it is assumed that the sensing object 490 exists on the proximity sensor HS (5, 2). The proximity sensor HS (5, 2) is electrically connected to a 17 channel (17ch) in the multiplexer 310 and the voltage change of the sensing signal Vdet2 output from 17ch is the largest, i.e., the first detected voltage value Vout corresponding to 17ch is assumed to be the largest. A proximity sensor HS (4, 1) is electrically connected to a 13 channel (13ch) in the multiplexer 310 and the voltage change of the sensing signal Vdet2 output from 13ch is the second largest, i.e., the first detected voltage value Vout corresponding to 13ch is assumed to be the second largest.

The comparison judgment circuit 540 judges to terminate the bundle scan (suspend, YES in the flowchart shown in FIG. 21) when the difference value of the data with the largest-voltage change and the data with the second largest-voltage change is the threshold voltage (Th) or more (data with the largest-voltage change−data with the second largest-voltage change>Th). In the state shown in FIG. 23, the difference value of the data with the largest-voltage change and the data with the second largest-voltage change is the threshold voltage (Th) or more. Therefore, the comparison judgment circuit 540 judges YES. When the comparison judgment circuit 540 judges YES, the sensing device 10 returns to step 409 (S409) and executes the bundle scan 0.

For example, as shown in FIG. 24, it is assumed that the sensing object 490 exists across the proximity sensor HS (4, 1) and the proximity sensor HS (5, 2). Similar to the proximity sensor shown in FIG. 23, the voltage change of the sensing signal Vdet2 output from 17ch to which the proximity sensor HS (5, 2) is connected is assumed to be the largest, and the voltage change of the sensing signal Vdet2 output from 13ch to which the proximity sensor HS (4, 1) is connected is assumed to be the second largest.

In the state shown in FIG. 24, the difference value of the data with the largest-voltage change and the data with the second largest-voltage change is smaller than the threshold voltage (Th). Therefore, the comparison judgment circuit 540 judges not to terminate the bundle scan (does not suspend, NO in the flowchart shown in FIG. 21). When the comparison judgment circuit 540 judges NO, the sensing device 10 executes the bundle scan 1 in step 417 (S417).

In the sensing device 10 according to the second embodiment, when the sensing object 490 is sensed using one proximity sensor HS, the subsequent bundle scan can be terminated, and the time for the proximity sensing operation can be shortened.

<2-3. Modification 1>

A modification 1 of the driving method of the sensing device 10 according to the second embodiment of the present invention will be described with reference to FIG. 25 and FIG. 26. In the modification 1 of the driving method of the sensing device 10, compared with the flowchart shown in FIG. 21, the sensing device 10 judges whether to continue or terminate the scan using the difference value |ΔV| and the comparison result of the difference value |ΔV| and the threshold value (Th) even after the bundle scan 1 in step 417 (S417). Since the other driving methods are the same as those in the flowchart shown in FIG. 21, descriptions thereof are omitted.

As shown in FIG. 25, the sensing device 10 calculates the difference value |ΔV| using the signal sensed in the baseline scan 1 and bundle scan 1 in step 419 (S419) following step 417 (S417). The signal sensed in the baseline scan 1 is a plurality of second initial sensing voltage values Vout, and the signal sensed in the bundle scan 1 is the second sensing data RD1 (a plurality of second sensing voltage values Vout). Since the driving method in step 419 (S419) is the same as the driving method in step 411 (S411) except for the points described above, the description thereof is omitted.

The sensing device 10 compares the difference value |ΔV| and the threshold value (Th) using the signal sensed in the baseline scan 1 and bundle scan 1 in step 421 (S421) following step 419 (S419). Since the driving method in step 421 (S421) is the same as the driving method in step 413 (S413) except for the points described above, the description thereof is omitted.

The sensing device 10 judges whether to terminate (suspend) the bundle scan 1 in step 423 (S423) following step 421 (S421).

If the absolute value |ΔV| is less than the threshold voltage (Vth), the comparison judgment circuit 540 judges that there is no sensing object (non-existence state, NO in the flowchart shown in FIG. 25). When the comparison judgment circuit 540 judges NO, the sensing device 10 returns to step 409 (S409) and executes the bundle scan 0. If the absolute value |ΔV| is equal to or higher than the threshold voltage (Th), the comparison judgment circuit 540 judges that there is the sensing object (existence state, YES in the flowchart shown in FIG. 25). When the comparison judgment circuit 540 judges YES, the comparison judgment circuit 540 executes step 425 (S425) shown in FIG. 26. Since the driving method in step 423 (S423) is the same as the driving method in step 415 (S415) except for the points described above, the description thereof is omitted.

In the modification 1 of the driving method of the sensing device 10 according to the second embodiment, the subsequent bundle scan can be terminated in either the bundle scan 0 or the bundle scan 1, and the time for the proximity sensing operation can be shortened.

<2-4. Modification 2>

A modification 2 of the driving method of the sensing device 10 according to the second embodiment of the present invention will be described with reference to FIG. 25 and FIG. 27. In the modification 2 of the driving method of the sensing device 10, compared with the flowchart shown in FIG. 25 and FIG. 26, the sensing device 10 judges whether to continue or terminate the scan using the difference value |ΔV| and the comparison result of the difference value |ΔV| and the threshold value (Th) even after the bundle scan 3 in step 425 (S425). Since the other driving methods are the same as those in the flowcharts shown in FIG. 25 and FIG. 26, descriptions thereof are omitted.

Figure 27:
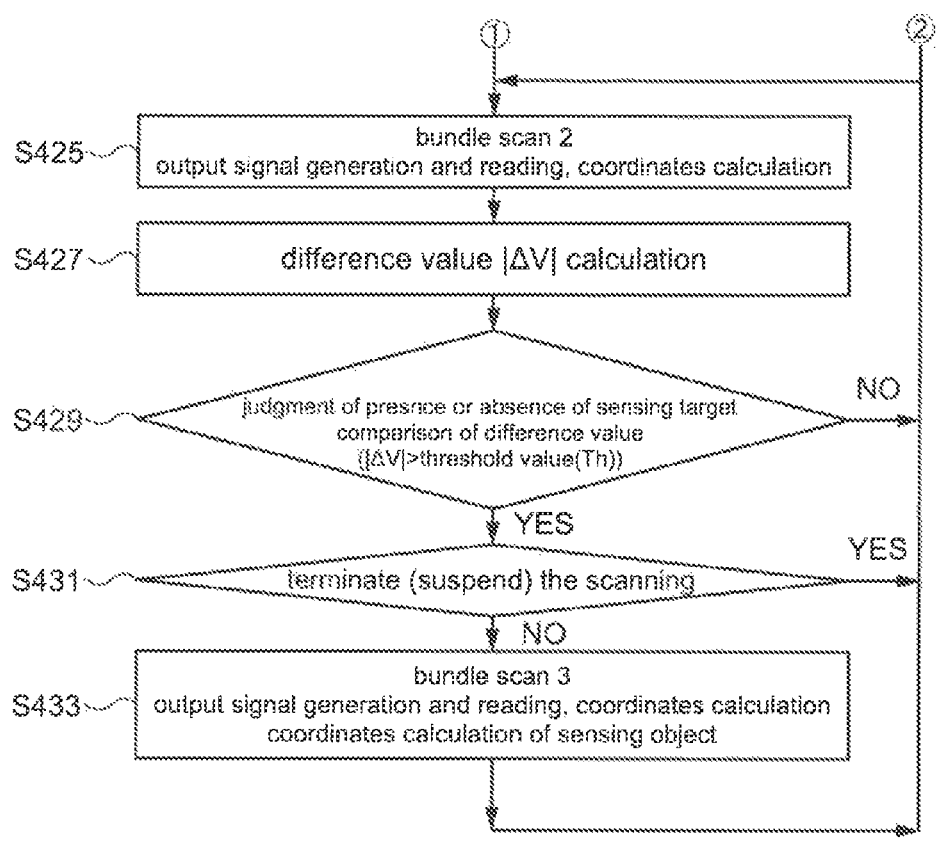
FIG. 27 is a flowchart for explaining a driving method of a sensing device according to the second embodiment of the present invention.

As shown in FIG. 27, the sensing device 10 calculates the difference value |ΔV| using the signal sensed in the baseline scan 2 and bundle scan 2 in step 427 (S427) following step 425 (S425). The signal sensed in the baseline scan 2 is a plurality of third initial sensing voltage values Vout, and the signal sensed in the bundle scan 2 is the third sensing data RD2 (a plurality of third sensing voltage values Vout). Since the driving method in step 427 (S427) is the same as the driving method in step 419 (S419) except for the points described above, the description thereof is omitted.

The sensing device 10 compares the difference value |ΔV| with the threshold value (Th) using the signal sensed in the baseline scan 2 and bundle scan 2 in step 429 (S429) following step 427 (S427). Since the driving method in step 429 (S429) is the same as the driving method in step 421 (S421) except for the points described above, the description thereof is omitted.

The sensing device 10 judges whether to terminate (suspend) the bundle scan 2 in step 431 (S431) following step 429 (S429).

If the absolute value |ΔV| is less than the threshold voltage (Vth), the comparison judgment circuit 540 judges that there is no sensing object (non-existence state, NO in the flowchart shown in FIG. 27). When the comparison judgment circuit 540 judges NO, the sensing device 10 returns to step 409 (S409) and executes the bundle scan 0. If the absolute value |ΔV| is equal to or higher than the threshold voltage (Th), the comparison judgment circuit 540 judges that there is the sensing object (existence state, YES in the flowchart shown in FIG. 27). When the comparison judgment circuit 540 judges YES, the comparison judgment circuit 540 executes step 433 (S433). Since the driving method in step 431 (S431) is the same as the driving method in step 423 (S423) except for the points described above, the description thereof is omitted.

In the modification 2 of the driving method of the sensing device 10 according to the second embodiment of the present invention, the subsequent bundle can be terminated in any of the bundle scan 0, bundle scan 1, and bundle scan 2, and the time for the proximity sensing operation can be shortened.

3. Third Embodiment

The driving method of the sensing device 10 according to the third embodiment of the present invention is a driving method for improving the sensing accuracy of four corners of the sensing device 10 as compared with the driving method of the sensing device 10 according to the first embodiment shown in FIG. 11. Specifically, the driving method of the sensing device 10 according to the third embodiment is different from the driving method of the sensing device 10 according to the first embodiment in that the number of the baseline scan 4 to the baseline scan 8 and the number of the bundle scan 4 to the bundle scan 8 are increased. In the description of the driving method of the sensing device 10 according to the third embodiment, the driving methods of the baseline scan 4 to the baseline scan 8 and the bundle scan 4 to the bundle scan 8 will be mainly described. Since the other points are the same as those of the driving method of the sensing device 10 according to the first embodiment, the descriptions thereof are omitted.

Figure 28:
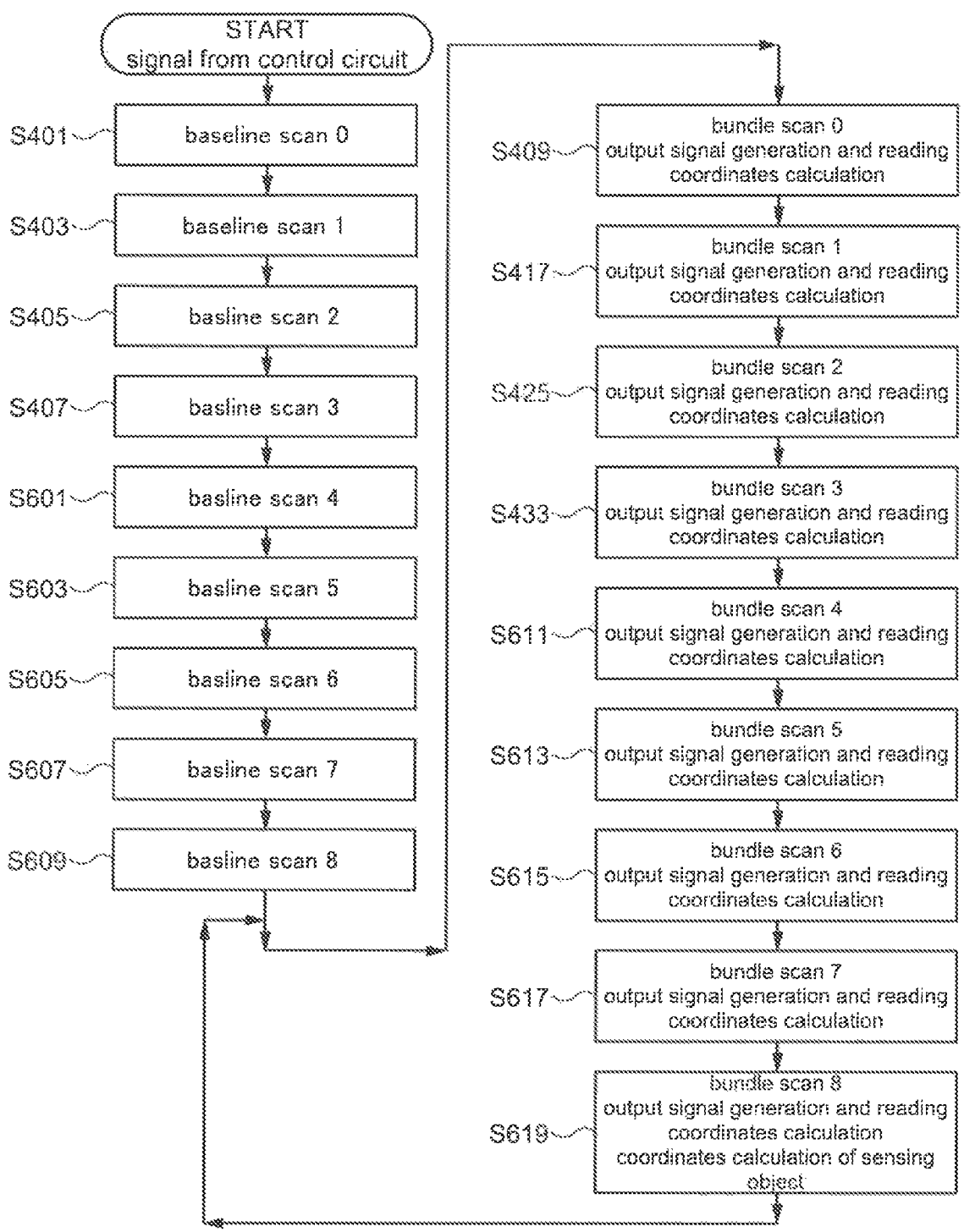
FIG. 28 is a flowchart for explaining a driving method of a sensing device according to the second embodiment of the present invention.
Figure 30:
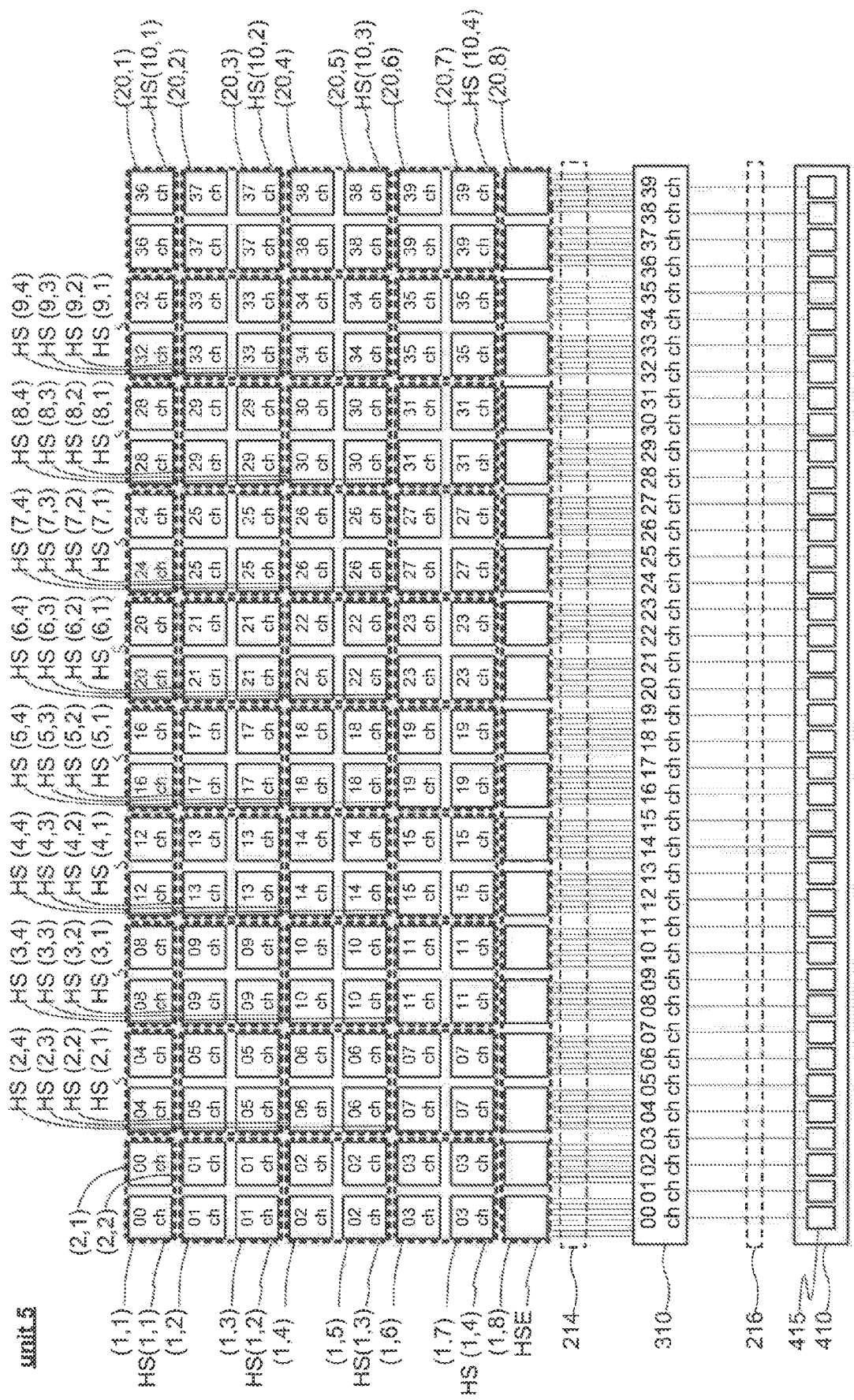
FIG. 30 is a diagram for explaining a bundle scan 5 (bundlescan5) of a driving method of a sensing device according to the third embodiment.
Figure 31:
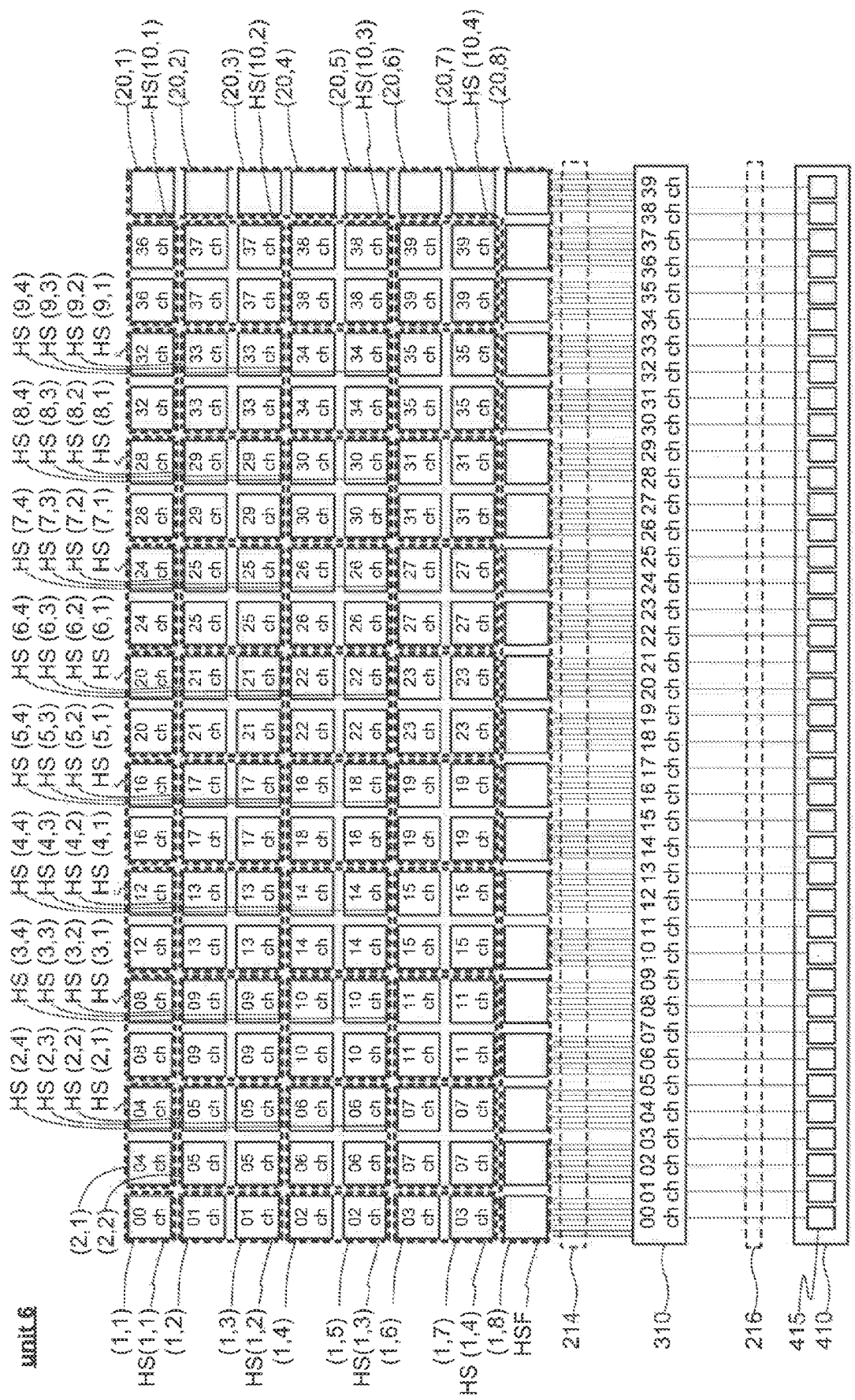
FIG. 31 is a diagram for explaining a bundle scan 6 (bundlescan6) of a driving method of a sensing device according to the third embodiment.
Figure 32:
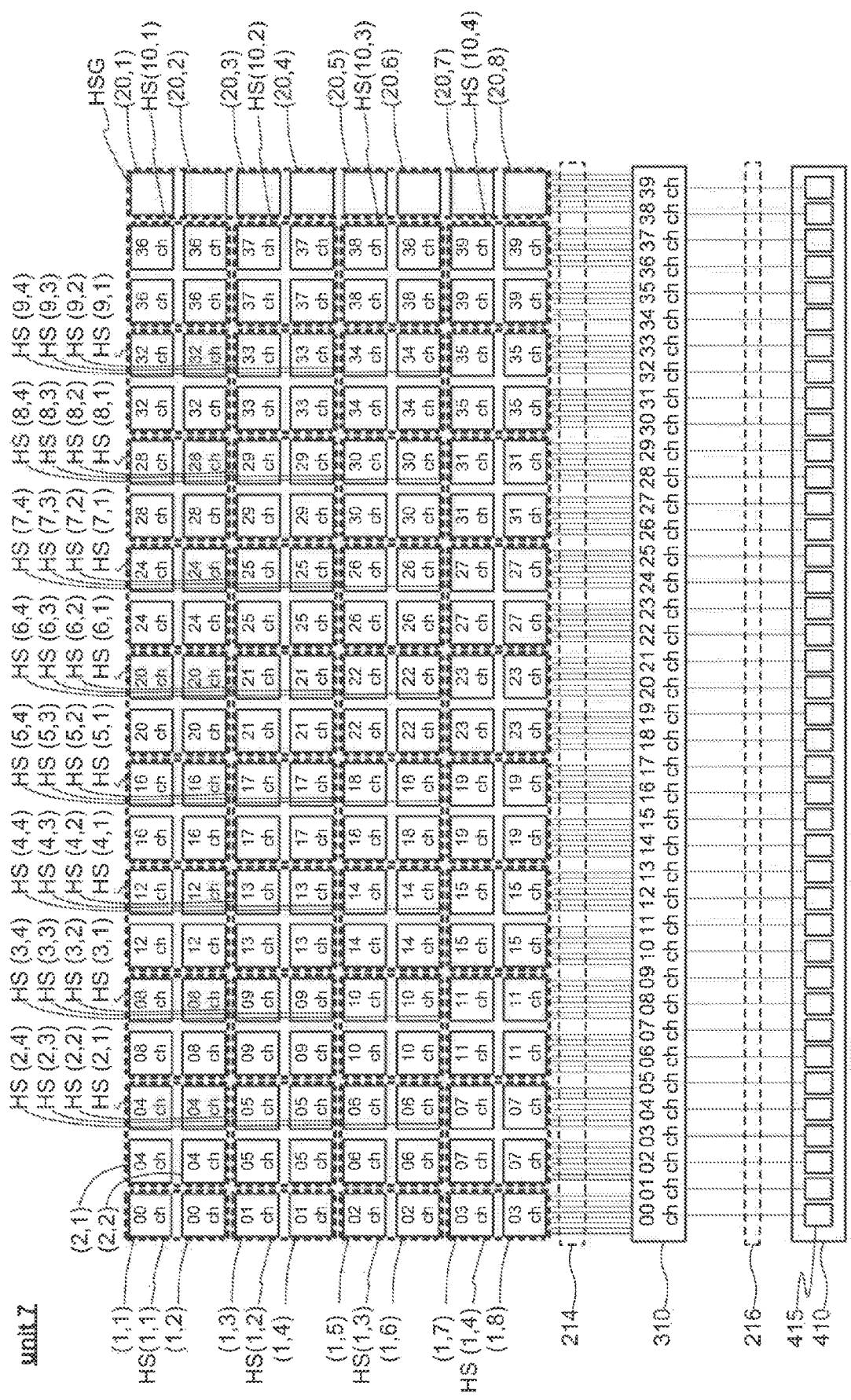
FIG. 32 is a diagram for explaining a bundle scan 7 (bundlescan7) of a driving method of a sensing device according to the third embodiment.
Figure 33:
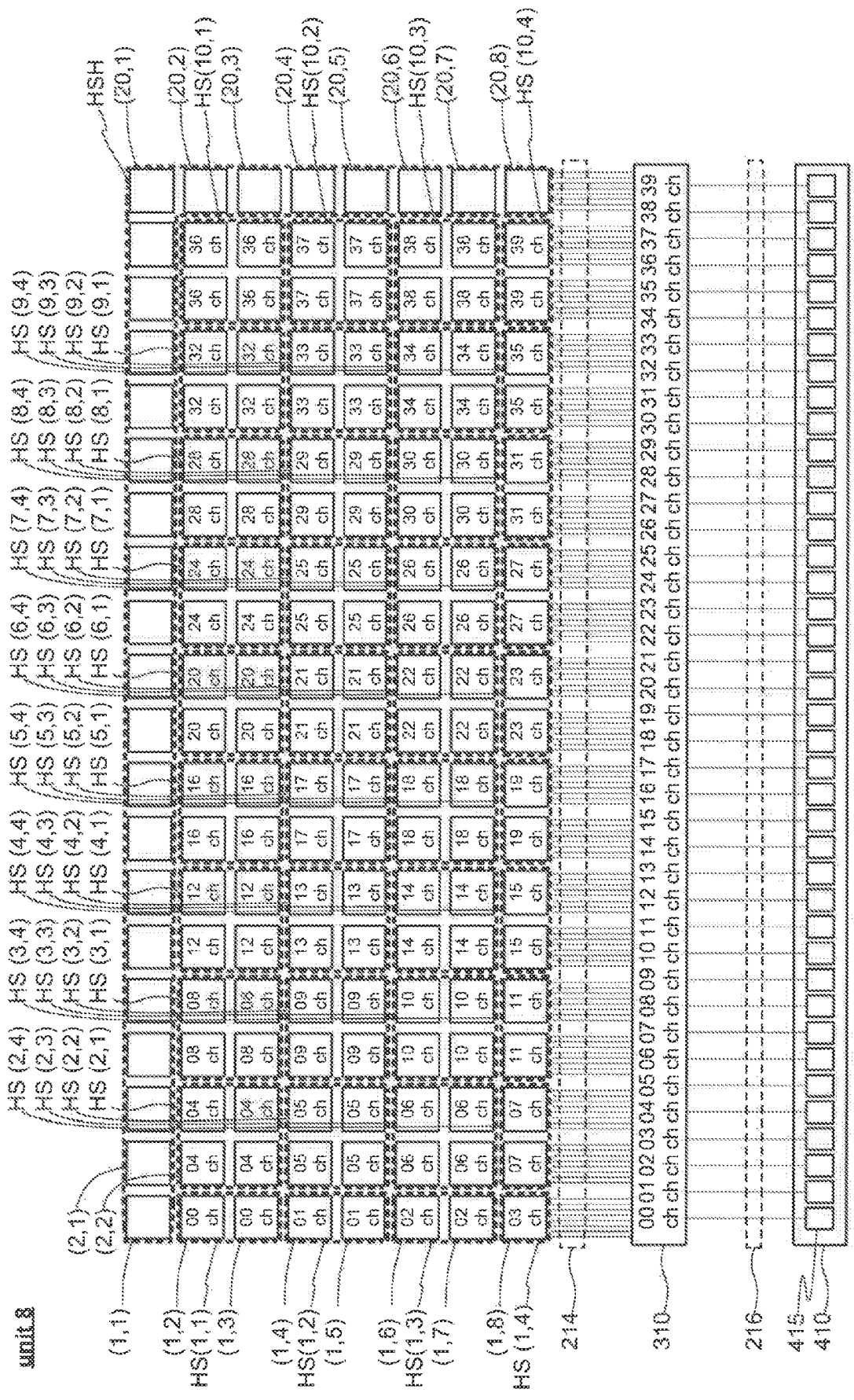
FIG. 33 is a diagram for explaining a bundle scan 8 (bundlescan8) of a driving method of a sensing device according to the third embodiment.

FIG. 28 is a flowchart for explaining a driving method of the sensing device 10 according to the third embodiment of the present invention. FIG. 29 is a diagram for explaining the bundle scan 4 (bundlescan4) of the driving method of the sensing device 10 according to the third embodiment. FIG. 30 is a diagram for explaining the bundle scan 5 (bundlescan5) of the driving method of the sensing device 10 according to the third embodiment. FIG. 31 is a diagram for explaining the bundle scan 6 (bundlescan6) of the driving method of the sensing device 10 according to the third embodiment. FIG. 32 is a diagram for explaining the bundle scan 7 (bundlescan7) of the driving method of the sensing device 10 according to the third embodiment. FIG. 33 is a diagram for explaining the bundle scan 8 (bundlescan8) of the driving method of the sensing device according to the third embodiment. FIG. 34 is a diagram showing an example of size ratios of sensing electrodes in each bundle scan of the driving method of the sensing device 10 according to the third embodiment. The driving method of the sensing device 10 shown in FIG. 28 to FIG. 34 is an example, and the driving method of the sensing device 10 is not limited to the configuration shown in FIG. 28 to FIG. 34. The same or similar components as those of FIG. 1 to FIG. 27 will not be described here.

<3-1. Fifth Initial Voltage Sensing Period>

As shown in FIG. 28, when the proximity sensing operation is started, the sensing device 10 executes the baseline scan 4 in step 601 (S601). In the baseline scan 4, in the non-existence state where the sensing object 490 does not exist, the initial signal Vini1 and the initial signal Vini2 are generated for each proximity sensor HS using the configuration of unit 4 shown in FIG. 29. The coordinates of each proximity sensor HS of unit4 are shifted to the right by 1 column and upward by 1 row of the sensing electrode 180 with respect to unit 0. For example, the proximity sensor HS (1, 1) is composed of two sensing electrodes 180 at the coordinates (2, 1) and (3, 1), and the proximity sensor HS (10, 1) is composed of one sensing electrode 180 at the coordinates (20, 1).

The initial signal Vini1 or the initial signal Vini2 is as described in <1-3. Example of Sensing of Voltage Change in Self-capacitance Method>. In the driving method of the sensing device 10, a period for executing the baseline scan 4 is referred to as a fifth initial voltage sensing period, and the initial output signal Voutb generated in the fifth initial voltage sensing period is referred to as a fifth initial voltage.

As shown in FIG. 29, in unit 4, the proximity sensor HSD is composed of the sensing electrodes 180 at the coordinates (1, 1) to (1, 8), and (2, 8) to (10, 8). In the fifth initial voltage sensing period, the proximity sensor HSD is supplied with the AC square wave Vsig but not connected to the channel in the multiplexer 310. Current fluctuation according to the AC square wave Vsig for the proximity sensor HSD is not converted into the voltage fluctuation, and the fifth initial voltage corresponding to the initial signal Vini1 or the initial signal Vini2 corresponding to the proximity sensor HSD is not generated.

As shown in FIG. 29, in unit 4, the proximity sensor HS (M, 1) is composed of two sensing electrodes 180, and the numerical value M is an integer of 1 to 9. The proximity sensors HS (M,2) to (M,4) are composed of four sensing electrodes 180, and the number M is an integer of 2 to 9. The proximity sensor HS (10, N) is composed of two sensing electrodes 180, and the number N is an integer of 2 to 4. The proximity sensor HS (10, 1) is composed of one sensing electrode 180. For example, the proximity sensor HS (1, 1) is composed of the sensing electrodes 180 at the coordinates (2, 1) and (3, 1), the proximity sensor HS (1, 2) is composed of the sensing electrodes 180 at the coordinates (2, 2), (2, 3), (3, 2), and (3, 3), the proximity sensor HS (10, 1) is composed of the sensing electrode 180 at the coordinates (20, 1), and the proximity sensor HS (10, 2) is composed of the sensing electrodes 180 at the coordinates (20, 2) and (20, 3). Similar to the proximity sensors HS (1, 1), (1, 2), and (10, 2), each of the proximity sensors HS other than the proximity sensors HS (1, 1), (1, 2), (10, 1), and (10, 2) is composed of four corresponding sensing electrodes 180 or two corresponding sensing electrodes 180.

Similar to unit 0, the proximity sensors HS (1, 1) to HS (10, 4) are electrically connected to 00 channel (00ch) to 39 channel (39ch) in the multiplexer 310, respectively.

<3-2. Sixth Initial Voltage Sensing Period>

The sensing device 10 executes the baseline scan 5 in step 603 (S603) following step 601 (S601). In the baseline scan 5, in the non-existence state where the sensing object 490 does not exist, the initial signal Vini1 and the initial signal Vini2 are generated for each proximity sensor HS using the configuration of unit 5 shown in FIG. 30. The coordinates of each proximity sensor HS of unit5 are shifted upward by 1 row of the sensing electrode 180 with respect to unit 0. For example, the proximity sensor HS (1, 1) is composed of two sensing electrodes 180 at the coordinates (2, 1) and (3, 1), and the proximity sensor HS (10, 1) is composed of two sensing electrodes 180 at the coordinates (19, 1) and (20, 1).

Signal processing of the initial signal Vini1 and the initial signal Vini2 is as described in <1-3. Example of Sensing of Voltage Change in Self-capacitance Method>. In the driving method of the sensing device 10, a period for executing the baseline scan 5 is referred to as a sixth initial voltage sensing period, and the initial output signal Voutb generated in the sixth initial voltage sensing period is referred to as a sixth initial voltage.

As shown in FIG. 30, in unit 5, the proximity sensor HSE is composed of coordinates (1, 8) to (20, 8) of the sensing electrode 180. In the sixth initial voltage sensing period, the proximity sensor HSE is supplied with the AC wave Vsig but not connected to the channel in the multiplexer 310. Current fluctuation according to the AC square wave Vsig for the proximity sensor HSE is not converted into the voltage fluctuation, and the sixth initial voltage corresponding to the initial signal Vini1 or the initial signal Vini2 corresponding to the proximity sensor HSE is not generated.

As shown in FIG. 30, in unit 5, the proximity sensors HS (M, 2) to (M, 4) are composed of four sensing electrodes 180, and the proximity sensor HS (M, 1) is composed of two sensing electrodes 180. The number M is an integer of 1 to 10. For example, the proximity sensor HS (1, 1) is composed of the sensing electrodes 180 at the coordinates (1, 1) and (2, 1), and the proximity sensor HS (1, 2) is composed of the sensing electrodes 180 at the coordinates (1, 2), (1, 3), (2, 2) and (2, 3). Similar to the proximity sensors HS (1, 1) and (1, 2), each of the proximity sensors HS (1, 3) to (10, 4) is composed of four corresponding sensing electrodes 180 or two corresponding sensing electrodes 180.

Similar to unit 0, the proximity sensors HS (1, 1) to HS (10, 4) are electrically connected to 00 channel (00ch) to 39 channel (39ch) in the multiplexer 310, respectively.

<3-3. Seventh Initial Voltage Sensing Period>

The sensing device 10 executes the baseline scan 6 in step 605 (S605) following step 603 (S603), t. In the baseline scan 6, in the non-existence state where the sensing object 490 does not exist, the initial signal Vini1 and the initial signal Vini2 are generated for each proximity sensor HS using the configuration of unit 6 shown in FIG. 31. In unit 6, the coordinates of each proximity sensor HS are shifted to left by 1 row of the sensing electrode 180 and upward by 1 row of the sensing electrode 180 with respect to unit 0. For example, the proximity sensor HS (1, 1) is composed of one sensing electrode 180 at the coordinates (1, 1), and the proximity sensor HS (10, 1) is composed of two sensing electrodes 180 at the coordinates (19, 1) and (20, 1).

Signal processing of the initial signal Vini1 and the initial signal Vini2 is as described in <1-3. Example of Sensing of Voltage Change in Self-capacitance Method>. In the driving method of the sensing device 10, a period for executing the baseline scan 6 is referred to as a seventh initial voltage sensing period, and the initial output signal Voutb generated in the seventh initial voltage sensing period is referred to as a seventh initial voltage.

As shown in FIG. 31, in unit 6, the proximity sensor HSF is composed of the sensing electrode 180 at the coordinates (1, 8) to (19, 8), and (20, 1) to (20, 8). In the seventh initial voltage sensing period, the proximity sensor HSB is supplied with the AC square wave Vsig but not connected to the channel in the multiplexer 310. Current fluctuation according to the AC square wave Vsig for the proximity sensor HSF is not converted into the voltage fluctuation, and the initial signal Vini1 or the initial signal Vini2 corresponding to the proximity sensor HSF is not generated.

As shown in FIG. 31, in unit 6, the proximity sensor HS (M, 1) is composed of two sensing electrodes 180, and the numerical value M is an integer of 2 to 10. The proximity sensors HS (M, 2) to (M, 4) are composed of four sensing electrodes 180, and the number M is an integer of 2 to 10. The proximity sensor HS (1, N) is composed of two sensing electrodes 180, and the number N is an integer of 2 to 4. The proximity sensor HS (1, 1) is composed of one sensing electrode 180. The proximity sensor HS (1, 1) is composed of the sensing electrode 180 at the coordinates (1, 1), the proximity sensor HS (1, 2) is composed of the sensing electrode 180 at the coordinates (1, 2) and (1, 3), the proximity sensor HS (2, 1) is composed of the sensing electrode 180 at the coordinates (2, 1) and (3, 1), and the proximity sensor HS (2, 2) is composed of the sensing electrode 180 at the coordinates (2, 2), (2, 3), (3, 2), and (3, 3). Similar to the proximity sensors HS (1, 2), (2, 1), and (2, 2), each of the proximity sensors HS other than the proximity sensors HS (1, 1), (1, 2), (2, 1), and (2, 2) is composed of four corresponding sensing electrodes 180 or two corresponding sensing electrodes 180.

Similar to unit 0, the proximity sensors HS (1, 1) to HS (10, 4) are electrically connected to 00 channel (00ch) to 39 channel (39ch) in the multiplexer 310, respectively.

<3-4. Eighth Initial Voltage Sensing Period>

The sensing device 10 executes the baseline scan 7 in step 607 (S607) following step 605 (S605). In the baseline scan 7, in the non-existence state where the sensing object 490 does not exist, the initial signal Vini1 and the initial signal Vini2 are generated for each proximity sensor HS using the configuration of unit 7 shown in FIG. 32. In unit 7, the coordinates of each proximity sensor HS are shifted to left by 1 column of the sensing electrode 180 with respect to unit 0. For example, the proximity sensor HS (1, 1) is composed of two sensing electrodes 180 at the coordinates (1, 1) and (1, 2), and the proximity sensor HS (10, 1) is composed of four sensing electrodes 180 at the coordinates (18, 1), (18, 2), (19, 1), and (19, 2).

Signal processing of the initial signal Vini1 and the initial signal Vini2 is as described in <1-3. Example of Sensing of Voltage Change in Self-capacitance Method>. In the driving method of the sensing device 10, a period for executing the baseline scan 7 is referred to as an eighth initial voltage sensing period, and the initial output signal Voutb generated in the eighth initial voltage sensing period is referred to as an eighth initial voltage.

As shown in FIG. 32, in unit 7, a proximity sensor HSG is composed of the sensing electrodes 180 at the coordinates (20, 1) to (20, 8). In the eighth initial voltage sensing period, the proximity sensor HSG is supplied with the AC square wave Vsig but not connected to the channel in the multiplexer 310. Current fluctuation according to the AC square wave Vsig for the proximity sensor HSG is not converted into the voltage fluctuation, and the initial signal Vini1 or the initial signal Vini2 corresponding to the proximity sensor HSG is not generated.

As shown in FIG. 32, in unit 7, the proximity sensors HS (2, N) to (10, N) are composed of four sensing electrodes 180, and the proximity sensor HS (1, N) is composed of two sensing electrodes 180. The number N is an integer of 1 to 4. For example, the proximity sensor HS (1, 1) is composed of the sensing electrodes 180 at the coordinates (1, 1) and (2, 1), and the proximity sensor HS (2, 1) is composed of the sensing electrodes 180 at the coordinates (2, 1), (2, 2), (3, 1), and (3, 2). Similar to the proximity sensors HS (1, 1) and HS (2, 1), each of the proximity sensors HS other than the proximity sensors HS (1, 1) and (2, 1) is composed of four corresponding sensing electrodes 180 or two corresponding sensing electrodes 180.

Similar to unit 0, the proximity sensors HS (1, 1) to HS (10, 4) are electrically connected to 00 channel (00ch) to 39 channel (39ch) in the multiplexer 310, respectively.

<3-5. Ninth Initial Voltage Sensing Period>

The sensing device 10 executes the baseline scan 8 in step 609 (S609) following step 607 (S607). In the baseline scan 8, in the non-existence state where the sensing object 490 does not exist, the initial signal Vini1 and the initial signal Vini2 are generated for each proximity sensor HS using the configuration of unit8 (unit8) shown in FIG. 33. In unit 8, the coordinates of each proximity sensor HS are shifted left by 1 row of the sensing electrode 180 and downward by 1 row of the sensing electrode 180 with respect to unit 0. For example, the proximity sensor HS (1, 1) is composed of two sensing electrodes 180 at the coordinates (1, 2) and (1, 3), and the proximity sensor HS (10, 1) is composed of four sensing electrodes 180 at the coordinates (18, 2), (18, 3), (19, 2), and (19, 3).

Signal processing of the initial signal Vini1 and the initial signal Vini2 is as described in <1-3. Example of Sensing of Voltage Change in Self-capacitance Method>. In the driving method of the sensing device 10, a period for executing the baseline scan 8 is referred to as a ninth initial voltage sensing period, and the initial output signal Voutb generated in the ninth initial voltage sensing period is referred to as a ninth initial voltage.

As shown in FIG. 33, in unit 8, a proximity sensor HSH is composed of the sensing electrodes 180 at the coordinates (1, 1) to (20, 1), and (20, 2) to (20, 8). In the ninth initial voltage sensing period, the proximity sensor HSH is supplied with the AC square wave Vsig but not connected to the channel in the multiplexer 310. Current fluctuation according to the AC square wave Vsig for the proximity sensor HSH is not converted into the voltage fluctuation, and the initial signal Vini1 or the initial signal Vini2 corresponding to the proximity sensor HSH is not generated.

As shown in FIG. 33, in unit 8, the proximity sensor HS (M, 4) is composed of two sensing electrodes 180, and the numerical value M is an integer of 2 to 10. The proximity sensors HS (M, 1) to (M, 3) are composed of four sensing electrodes 180, and the number M is an integer of 2 to 10. The proximity sensor HS (1, N) is composed of two sensing electrodes 180, and the number N is an integer of 1 to 3. The proximity sensor HS (1, 4) is composed of one sensing electrode 180. The proximity sensor HS (1, 1) is composed of the sensing electrodes 180 at the coordinates (1, 2) and (1, 3), the proximity sensor HS (1, 4) is composed of the sensing electrode 180 at the coordinates (1, 8), the proximity sensor HS (2, 1) is composed of the sensing electrodes 180 at the coordinates (2, 2), (2, 3), (3, 2), and (3, 3), and the proximity sensor HS (2, 4) is composed of the sensing electrodes 180 at the coordinates (2, 8) and (3, 8). Similar to the proximity sensors HS (1, 1), (2, 1), and (2, 4), each of the proximity sensors HS other than the proximity sensors HS (1, 1), (1, 4), (2, 1), and (2, 4) is composed of four corresponding sensing electrodes 180 or two corresponding sensing electrodes 180.

Similar to unit 0, the proximity sensors HS (1, 1) to HS (10, 4) are electrically connected to 00 channel (00ch) to 39 channel (39ch) in the multiplexer 310, respectively.

<3-6. First Sensing Voltage Sensing Period to Fourth Sensing Voltage Sensing Period>

As shown in FIG. 28, the sensing device 10 executes the bundle scan 0 in step 409 (S409) following step 609 (S609). The bundle scan 0 is executed in the first sensing voltage sensing period. In step 417 (S417) to step 433 (S433) following step 409 (S409), the sensing device 10 executes the bundle scan 1 to the bundle scan 3. The bundle scan 1 to the bundle scan 3 are executed in the second sensing voltage sensing period to the fourth sensing voltage sensing period. Since the configurations and functions of the driving method in step 417 (S417) to step 433 (S433) are the same as those of the first embodiment, the descriptions thereof are omitted.

<3-7. Fifth Sensing Voltage Sensing Period>

The sensing device 10 executes the bundle scan 4 in step 611 (S611) following step 433 (S433). In the bundle scan 4, in the existence state where the sensing object 490 exists, the sensing signal Vdet1 and the sensing signal Vdet2 are generated for each proximity sensor HS using the configuration of unit 4 shown in FIG. 29.

The sensing signal Vdet1 or the sensing signal Vdet2 is as described in <1-3. Example of Sensing of Voltage Change in Self-capacitance Method>. In the driving method of the sensing device 10, a period for executing the bundle scan 4 is referred to as a fifth sensing voltage sensing period, the output signal Vout generated in the fifth sensing voltage sensing period is referred to as a fifth sensing voltage, and a plurality of fifth sensing voltages generated for each proximity sensor HS is collectively referred to as fifth sensing data RD4.

The calculation circuit 500 calculates the coordinates (y4, x4) of the sensing object 490 in the bundle scan 4 using the output signal Vout generated for each proximity sensor HS. For example, the same method as that described with reference to FIG. 16 to FIG. 19 can be used as a method for calculating the coordinates.

<3-8. Sixth Sensing Voltage Sensing Period>

The sensing device 10 executes the bundle scan 5 in step 613 (S613) following step 611 (S611). In the bundle scan 5, in the existence state where the sensing object 490 exists, the sensing signal Vdet1 and the sensing signal Vdet2 are generated for each proximity sensor HS using the configuration of unit 5 shown in FIG. 30.

The sensing signal Vdet1 or the sensing signal Vdet2 is as described in <1-3. Example of Sensing of Voltage Change in Self-capacitance Method>. A period for executing the bundle scan 5 is referred to as a sixth sensing voltage sensing period, the output signal Vout generated in the sixth sensing voltage sensing period is referred to as a sixth sensing voltage, and a plurality of sixth sensing voltages generated for each proximity sensor HS is collectively referred to as sixth sensing data RD5 in the driving method of the sensing device 10.

The calculation circuit 500 calculates the coordinates (y5, x5) of the sensing object 490 in the bundle scan 5 using the output signal Vout generated for each proximity sensor HS. For example, the same method as that described with reference to FIG. 16 to FIG. 19 can be used as the method for calculating the coordinates.

<3-9. Seventh Sensing Voltage Sensing Period>

The sensing device 10 executes the bundle scan 6 in step 615 (S615) following step 613 (S613). In the bundle scan 6, in the existence state where the sensing object 490 exists, the sensing signal Vdet1 and the sensing signal Vdet2 are generated for each proximity sensor HS using the configuration of unit 6 shown in FIG. 31.

The sensing signal Vdet1 or the sensing signal Vdet2 is as described in <1-3. Example of Sensing of Voltage Change in Self-capacitance Method>. A period for executing the bundle scan 6 is referred to as a seventh sensing voltage sensing period, the output signal Vout generated in the seventh sensing voltage sensing period is referred to as a seventh sensing voltage, and a plurality of seventh sensing voltages generated for each proximity sensor HS is collectively referred to as seventh sensing data RD6 in the driving method of the sensing device 10.

The calculation circuit 500 calculates the coordinates (y6, x6) of the sensing object 490 in the bundle scan 6 using the output signal Vout generated for each proximity sensor HS. For example, the same method as that described with reference to FIG. 16 to FIG. 19 can be used as the method for calculating the coordinates.

<3-10. Eighth Sensing Voltage Sensing Period>

The sensing device 10 executes the bundle scan 7 in step 617 (S617) following step 615 (S615). In the bundle scan 7, in the existence state where the sensing object 490 exists, the sensing signal Vdet1 and the sensing signal Vdet2 are generated for each proximity sensor HS using the configuration of unit 7 shown in FIG. 32.

The sensing signal Vdet1 or the sensing signal Vdet2 is as described in <1-3. Example of Sensing of Voltage Change in Self-capacitance Method>. A period for executing the bundle scan 7 is referred to as an eighth sensing voltage sensing period, the output signal Vout generated in the eighth sensing voltage sensing period is referred to as an eighth sensing voltage, and a plurality of eighth sensing voltages generated for each proximity sensor HS is collectively referred to as eighth sensing data RD7 in the driving method of the sensing device 10.

The calculation circuit 500 calculates the coordinates (y7, x7) of the sensing object 490 in the bundle scan 7 using the output signal Vout generated for each proximity sensor HS. For example, the same method as that described with reference to FIG. 16 to FIG. 19 can be used as the method for calculating the coordinates.

<3-11. Ninth Sensing Voltage Sensing Period>

The sensing device 10 executes the bundle scan 8 in step 619 (S619) following step 617 (S617). In the bundle scan 8, in the existence state where the sensing object 490 exists, the sensing signal Vdet1 and the sensing signal Vdet2 are generated for each proximity sensor HS using the configuration of unit 8 shown in FIG. 33.

The sensing signal Vdet1 or the sensing signal Vdet2 is as described in <1-3. Example of Sensing of Voltage Change in Self-capacitance Method>. A period for executing the bundle scan 8 is referred to as a ninth sensing voltage sensing period, the output signal Vout generated in the ninth sensing voltage sensing period is referred to as a ninth sensing voltage, and a plurality of ninth sensing voltages generated for each proximity sensor HS is collectively referred to as ninth sensing data RD8 in the driving method of the sensing device 10.

The calculation circuit 500 calculates the coordinates (y8, x8) of the sensing object 490 in the bundle scan 8 using the output signal Vout generated for each proximity sensor HS. For example, the same method as that described with reference to FIG. 16 to FIG. 19 can be used as the method for calculating the coordinates.

The calculation circuit 500 calculates the position coordinates (Y, X) of the sensing object 490 using the coordinates (y0, x0) of the sensing object 490 in the bundle scan 0, the coordinates (y1, x1) of the sensing object 490 in the bundle scan 1, the coordinates (y2, x2) of the sensing object 490 in the bundle scan 2, the coordinates (y3, x3) of the sensing object 490 in the bundle scan 3, the coordinates (y4, x4) of the sensing object 490 in the bundle scan 4, the coordinates (y5, x5) of the sensing object 490 in the bundle scan 5, the coordinates (y6, x6) of the sensing object 490 in the bundle scan 6, the coordinates (y7, x7) of the sensing object 490 in the bundle scan 7, and the coordinates (y8, x8) of the sensing object 490 in the bundle scan 8.

When step 500 (S619) ends, the calculation circuit 619 repeatedly executes step 409 (S409) to step 619 (S619). The calculation circuit 500 sends the output signal Vout detected in each of the repeatedly executed step 409 (S409) to step 619 (S619).

Similar to the fifth initial voltage sensing period, current fluctuation according to the AC square wave Vsig for the proximity sensor HSD is not converted into the voltage fluctuation, and the sensing signal Vdet corresponding to the proximity sensor HSD is not generated in the fifth sensing voltage sensing period. Similar to the sixth initial voltage sensing period, current fluctuation according to the AC square wave Vsig for the proximity sensor HSE is not converted into the voltage fluctuation, and the sensing signal Vdet corresponding to the proximity sensor HSE is not generated in the fifth sensing voltage sensing period. Similar to the seventh initial voltage sensing period, current fluctuation corresponding to the AC square wave Vsig for the proximity sensor HSF is not converted into the voltage fluctuation, and the sensing signal Vdet corresponding to the proximity sensor HSF is not generated in the seventh sensing voltage sensing period. Similar to the eight initial voltage sensing period in the eighth sensing voltage sensing period, current fluctuation according to the AC square wave Vsig for the proximity sensor HSG is not converted into the voltage fluctuation, and the sensing signal Vdet corresponding to the proximity sensor HSG is not generated. Similar to the initial voltage sensing period, current fluctuation according to the AC square wave Vsig for the proximity sensor HSH is not converted into the voltage fluctuation, and the sensing signal Vdet corresponding to the proximity sensor HSH is not generated in the ninth sensing voltage sensing period.

As described above, the first initial voltage sensing period, the second initial voltage sensing period, the third initial voltage sensing period, the fourth initial voltage sensing period, the fifth initial voltage sensing period, the sixth initial voltage sensing period, the seventh initial voltage sensing period, the eighth initial voltage sensing period, the ninth initial voltage sensing period, the first sensing voltage sensing period, the second sensing voltage sensing period, the third sensing voltage sensing period, the fourth sensing voltage sensing period, the fifth sensing voltage sensing period, the sixth sensing voltage sensing period, the seventh sensing voltage period, the eighth sensing voltage sensing period and the ninth sensing voltage sensing period appear continuously in the sensing device 10. That is, the plurality of sensing periods appear continuously in the sensing device 10 and the sensing device 10 controls the proximity sensors, the control circuit 200, the electrode selection circuit 300, the sensing circuit 400, the calculation circuit 500, and the like, so that the sensing electrode included in the sensing unit differs by 1 row in the row direction or by 1 column in the column direction for each sensing period in a succession of the plurality of sensing periods.

<3-12. Size Ratio of Sensing Electrode 180>

FIG. 34 is a diagram showing electrode ratios of the proximity sensor HS with respect to the bundle scan number (Bundle Scan No.). As shown in FIG. 34, in the sensing device 10, the electrode ratio of the proximity sensors HS at the four corners of unit (unit) of each bundle scan differs depending on the bundle scan. The proximity sensors at the four corners are the proximity sensor HS (1, 1), the proximity sensor HS (1, 4), the proximity sensor HS (10, 1), and the proximity sensor HS (10, 4).

The electrode ratio of the proximity sensor HS is the number of sensing electrodes 180 included in the proximity sensors HS at each of the four corners of the unit of the bundle scan 0 with respect to the number of sensing electrodes 180 included in the proximity sensors HS at each of the four corners of unit 0 of the bundle scan 0 in the sensing device 10 according to the present embodiment. Specifically, the electrode ratio is the number of sensing electrodes 180 included in the proximity sensors HS at each of the four corners of the unit of each bundle scan when the number of proximity sensors at the four corners of unit 0 of the bundle scan 0 is set to 1 unit.

For example, the number of sensing electrodes 180 included in the proximity sensor HS (1, 1) is four. In unit 0 of the bundle scan 0, the number of sensing electrodes 180 included in the proximity sensor HS (1, 1) is 4 in unit 1 of the bundle scan 1 (Bundle Scan No. 1). Therefore, the electrode ratio of the proximity sensor HS (1, 1) of the bundle scan 1 is 1. The number of sensing electrodes 180 included in the proximity sensor HS (1, 4) is 2 in unit 1 of the bundle scan 1. Therefore, the electrode ratio of the proximity sensor HS (1, 4) of the bundle scan 1 is 1/2.

The number of sensing electrodes 180 included in the proximity sensor HS (m, n) is 4 in unit 0 of the bundle scan 0.

The number of sensing electrodes 180 included in the proximity sensor HS (1, 1) is 4, the number of sensing electrodes 180 included in the proximity sensor HS (1, 4) is 2, the number of sensing electrodes 180 included in the proximity sensor HS (10, 1) is 4 and the number of sensing electrodes 180 included in the proximity sensor HS (10, 4) is 2 in unit 1 of the bundle scan 1 (Bundle Scan No. 1). Therefore, the electrode ratio of the proximity sensor HS (1, 1) is 1, the electrode ratio of the proximity sensor HS (1, 4) is 1/2, the electrode ratio of the proximity sensor HS (10, 1) is 1, and the electrode ratio of the proximity sensor HS (10, 4) is 1/2, in unit 1 of the bundle scan 1.

The number of sensing electrodes 180 included in the proximity sensor HS (1, 1) is 4, the number of sensing electrodes 180 included in the proximity sensor HS (1, 4) is 4, the number of sensing electrodes 180 included in the proximity sensor HS (10, 1) is 2 and the number of sensing electrodes 180 included in the proximity sensor HS (10, 4) is 2 in unit 2 of the bundle scan 2 (Bundle Scan No. 2). Therefore, the electrode ratio of the proximity sensor HS (1, 1) is 1, the electrode ratio of the proximity sensor HS (1, 4) is 1, the electrode ratio of the proximity sensor HS (10, 1) is 1/2, and the electrode ratio of the proximity sensor HS (10, 4) is 1/2 in unit 2 of the bundle scan 2.

The number of sensing electrodes 180 included in the proximity sensor HS (1, 1) is 4, the number of sensing electrodes 180 included in the proximity sensor HS (1, 4) is 2, the number of sensing electrodes 180 included in the proximity sensor HS (10, 1) is 2 and the number of sensing electrodes 180 included in the proximity sensor HS (10, 4) is 1 in unit 3 of the bundle scan 3 (Bundle Scan No. 3). Therefore, the electrode ratio of the proximity sensor HS (1, 1) is 1/2, the electrode ratio of the proximity sensor HS (1, 4) is 1/2, the electrode ratio of the proximity sensor HS (10, 1) is 1/2 and the electrode ratio of the proximity sensor HS (10, 4) is 1/4 in unit 3 of the bundle scan 3.

The number of sensing electrodes 180 included in the proximity sensor HS (1, 1) is 2, the number of sensing electrodes 180 included in the proximity sensor HS (1, 4) is 4, the number of sensing electrodes 180 included in the proximity sensor HS (10, 1) is 1 and the number of sensing electrodes 180 included in the proximity sensor HS (10, 4) is 2 in unit 4 of the bundle scan 4 (Bundle Scan No. 4). Therefore, the electrode ratio of the proximity sensor HS (1, 1) is 1/2, the electrode ratio of the proximity sensor HS (1, 4) is 1, the electrode ratio of the proximity sensor HS (10, 1) is 1/4 and the electrode ratio of the proximity sensor HS (10, 4) is 1 in unit 4 of the bundle scan 4.

The number of sensing electrodes 180 included in the proximity sensor HS (1, 1) is 2, the number of sensing electrodes 180 included in the proximity sensor HS (1, 4) is 4, the number of sensing electrodes 180 included in the proximity sensor HS (10, 1) is 2 and the number of sensing electrodes 180 included in the proximity sensor HS (10, 4) is 4 in unit 5 of the bundle scan 5 (Bundle Scan No. 5). Therefore, the electrode ratio of the proximity sensor HS (1, 1) is 1/2, the electrode ratio of the proximity sensor HS (1, 4) is 1, the electrode ratio of the proximity sensor HS (10, 1) is 1/2 and the electrode ratio of the proximity sensor HS (10, 4) is 1 in unit 5 of the bundle scan 5.

The number of sensing electrodes 180 included in the proximity sensor HS (1, 1) is 1, the number of sensing electrodes 180 included in the proximity sensor HS (1, 4) is 4, the number of sensing electrodes 180 included in the proximity sensor HS (10, 1) is 2 and the number of sensing electrodes 180 included in the proximity sensor HS (10, 4) is 4 in unit 6 of the bundle scan 6 (Bundle Scan No. 6). Therefore, the electrode ratio of the proximity sensor HS (1, 1) is 1/4, the electrode ratio of the proximity sensor HS (1, 4) is 1, the electrode ratio of the proximity sensor HS (10, 1) is 1/2 and the electrode ratio of the proximity sensor HS (10, 4) is 1 in unit 6 of the bundle scan 6.

The number of sensing electrodes 180 included in the proximity sensor HS (1, 1) is 2, the number of sensing electrodes 180 included in the proximity sensor HS (1, 4) is 2, the number of sensing electrodes 180 included in the proximity sensor HS (10, 1) is 4 and the number of sensing electrodes 180 included in the proximity sensor HS (10, 4) is 4 in unit 7 of the bundle scan 7 (Bundle Scan No. 7), t. Therefore, the electrode ratio of the proximity sensor HS (1, 1) is 1/2, the electrode ratio of the proximity sensor HS (1, 4) is 1/2, the electrode ratio of the proximity sensor HS (10, 1) is 1 and the electrode ratio of the proximity sensor HS (10, 4) is 1 in unit 7 of the bundle scan 7.

The number of sensing electrodes 180 included in the proximity sensor HS (1, 1) is 2, the number of sensing electrodes 180 included in the proximity sensor HS (1, 4) is 1, the number of sensing electrodes 180 included in the proximity sensor HS (10, 1) is 4 and the number of sensing electrodes 180 included in the proximity sensor HS (10, 4) is 2 in unit 8 of the bundle scan 8 (Bundle Scan No. 8). Therefore, the electrode ratio of the proximity sensor HS (1, 1) is 1/2, the electrode ratio of the proximity sensor HS (1, 4) is 1/4, the electrode ratio of the proximity sensor HS (10, 1) is 1 and the electrode ratio of the proximity sensor HS (10, 4) is 1/2 in unit 8 of the bundle scan 8.

In the sensing device 10 according to the third embodiment, in the proximity sensors HS at the four corners of a unit of the bundle scans, when the electrode ratio is 1/2, the amplitude of the AC square wave Vsig supplied to the sensing electrode 180 with the electrode ratio of 1/2 is corrected to twice the amplitude of the AC square wave Vsig supplied to the sensing electrode 180 with the electrode ratio of 1/4, and when the electrode ratio is 1/4, the amplitude of the AC square wave Vsig supplied to the sensing electrode 180 with the electrode ratio of 1/4 is corrected to four times the amplitude of the AC square wave Vsig supplied to the sensing electrode 180 with the electrode ratio of 1. In the sensing device 10 according to the third embodiment of the present invention, by correcting the amplitude of the square wave supplied to the electrodes with different electrode ratios of the proximity sensors HS at the four corners, the position coordinates (Y, X) of the sensing object 490 can be detected using the corrected sensing signal. As a result, it is possible to improve the sensing accuracy of the four corners of the sensing device 10 with respect to the existence state of the sensing object 490.

4. Fourth Embodiment

Figure 35:
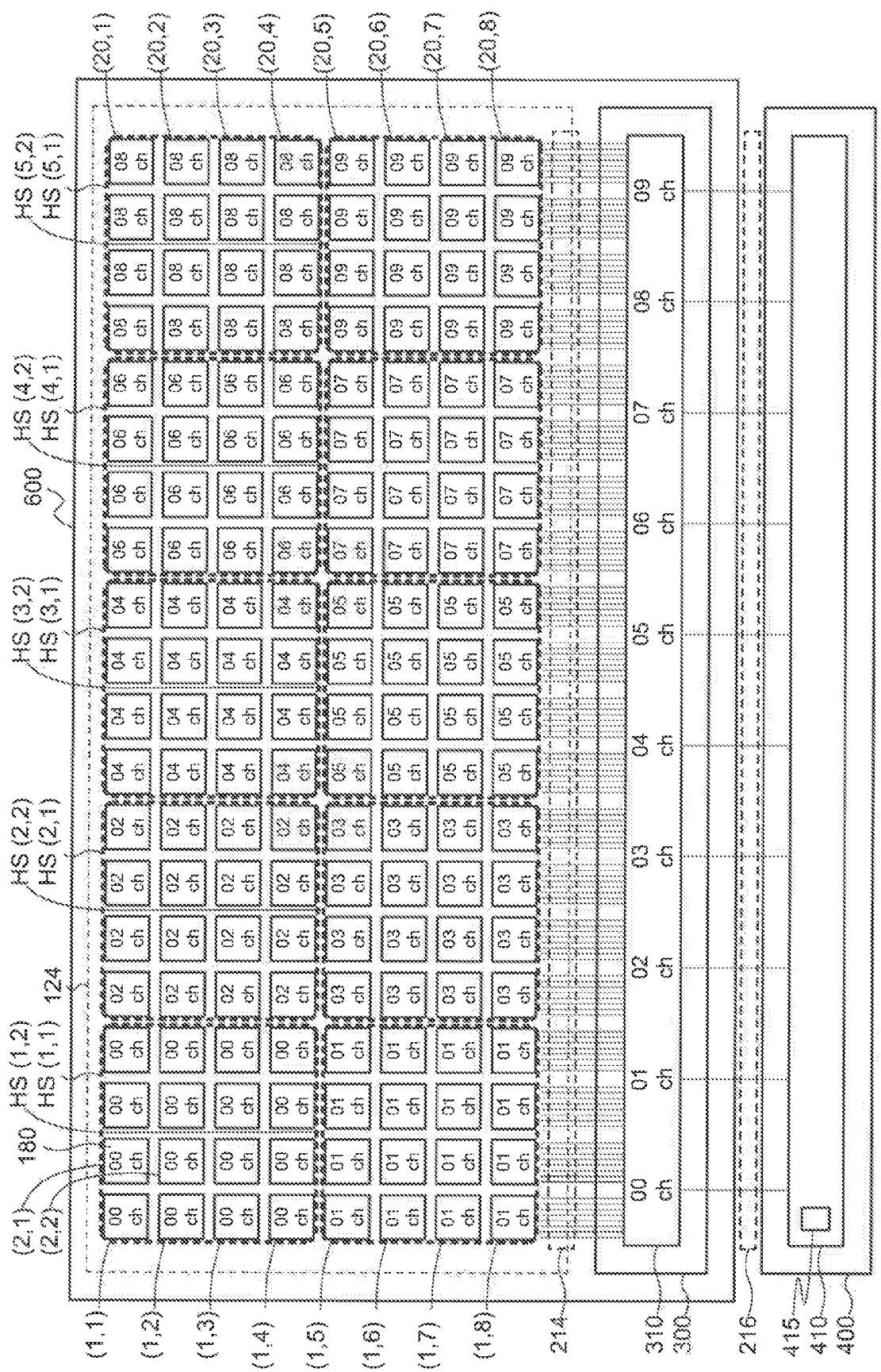
FIG. 35 is a schematic plan view showing a configuration of a sensing electrode, an electrode-connecting circuit, and a sensing circuit according to the fourth embodiment of the present invention.

In the sensing device 10 according to the fourth embodiment, the proximity sensor HS is composed of 16 sensing electrodes 180 (coefficient k=16) compared with the sensing device 10 according to the first embodiment. In the sensing device 10 according to the fourth embodiment of the present invention, since other configurations and functions are the same as those of the sensing device 10 according to the first embodiment, descriptions thereof are omitted. FIG. 35 is a schematic plan view showing configurations of the proximity sensor unit 124, the electrode selection circuit 300, and the sensing circuit 400 of the sensing device 10 according to the fourth embodiment. The driving method of the sensing device 10 shown in FIG. 35 is an example, and the driving method of the sensing device 10 is not limited to the configuration shown in FIG. 35. The same or similar components as those of FIG. 1 to FIG. 34 will not be described here.

As shown in FIG. 35, the proximity sensor HS is composed of 16 sensing electrodes 180. The plurality of proximity sensors HS is arranged in 5×2 pieces (5 columns 2 rows, M=5, N=2). In the fourth embodiment as well as the first embodiment, the coordinates of each of the plurality of sensing electrodes 180 are represented by (m, n), and the description of the coordinates is limited to a minimum for convenience of explanation.

As shown in FIG. 35, the proximity sensor HS (1, 1) is composed of the sensing electrodes 180 at the coordinates (1, 1), (1, 2), (1, 3), (1, 4), (2, 1), (2, 2), (2, 3), (2, 4), (3, 1), (3, 2), (3, 3), (3, 4), (4, 1), (4, 2), (4, 3), and (4, 4). Similar to the proximity sensor HS (1, 1), the proximity sensors HS (1, 2) to (5, 2) are composed of 16 corresponding sensing electrodes 180.

The multiplexer 310 has 5×2 channels 00 (00ch) to 09 (09ch) in the sensing device 10 according to the fourth embodiment of the present invention. The proximity sensor HS (1, 1) is electrically connected to 00 channel (00ch) in the multiplexer 310, and the proximity sensor HS (1, 2) is electrically connected to 01 channel (01ch) in the multiplexer 310. Similar to the proximity sensors HS (1, 1), (1, 2), each of the proximity sensors HS (2, 1) to (5, 2) is electrically connected to the channel in the corresponding multiplexer 310.

The same driving method can be used as in the driving method according to the first to third embodiments when the proximity sensor HS composed of four sensing electrodes 180 is changed to the proximity sensor HS composed of 16 sensing electrodes 180 in the driving method of the sensing device 10 according to the fourth embodiment.

The number of channels of the multiplexer 310 can be reduced by increasing the number of sensing electrodes 180 constituting the proximity sensor HS in the sensing device 10 according to the fourth embodiment.

5. Fifth Embodiment

In the sensing device 10 according to the fifth embodiment, as described in the sensing device 10 according to the first embodiment, a configuration in which a bundle scan driven by bundling the plurality of sensing electrodes 180 and an individual scan for individually scanning each sensing electrode 180 are enabled is described. In the sensing device 10 according to the fifth embodiment of the present invention, since other configurations and functions are the same as those of the sensing device 10 according to the first embodiment, descriptions thereof are omitted. FIG. 36 is a schematic plan view showing configurations of the proximity sensor unit 124, the electrode selection circuit 300, and the sensing circuit 400 of the sensing device 10 according to the fifth embodiment. The driving method of the sensing device 10 shown in FIG. 36 is an example, and the driving method of the sensing device 10 is not limited to the configuration shown in FIG. 36. The same or similar components as those of FIG. 1 to FIG. 35 will not be described here. Also, in the fifth embodiment as well as the first embodiment, the coordinates of each of the plurality of sensing electrodes 180 are represented by (m, n), and the description of the coordinates is limited to the minimum for convenience of explanation.

In order to enable individual scanning, as an example, as shown in FIG. 36, the plurality of proximity sensors HS In the sensing device 10 according to the fifth embodiment is arranged in 20×8 pieces (20 columns 8 rows, M=20, N=8), the plurality of proximity sensors HS corresponds to the sensing electrode 1:1, and the coordinates of the proximity sensor HS corresponds to the coordinates of the sensing electrode 180 1:1. In addition, the multiplexer 310 has 20×8 (20 columns 8 rows, M=20, N=8) channel 000 (000ch) to channel 159 (159ch), each of the channel 000 to channel 159 is electrically connected to the amplification circuit 415 included in the sensing signal amplification circuit 410 1:1. For example, the proximity sensor HS (1, 1) in the first row of the proximity sensor unit 124 is composed of the sensing electrode 180 with the coordinate (1, 1), and is electrically connected to the channel 000 (000ch), and the channel 000 (000ch) is electrically connected to the amplification circuit 415 corresponding to the channel 000. Similarly, the proximity sensor HS (20, 8) is composed of the sensing electrode 180 at the coordinates (1, 1), and is electrically connected to the channel 159 (159ch), and the channel 159 (159ch) is electrically connected to the amplification circuit 415 corresponding to the channel 159.

In addition, the sensing device 10 according to the fifth embodiment, similar to the first embodiment, can execute a bundle scan driven by bundling the plurality of sensing electrodes 180. For example, when executing a bundle scan driven by bundling four sensing electrodes 180 in the sensing device 10 according to the fifth embodiment, the connection of the switch included in the multiplexer 310 is switched, and four sensing electrodes 180 are controlled to be electrically connected to one amplification circuit 415 as in the first embodiment.

For example, in the sensing device 10 according to the fifth embodiment, a switch control signal (not shown) is sent from the sense timing control circuit 440 shown in FIG. 2 or FIG. 3 to the electrode selection circuit 300, the sensing signal amplification circuit 410, the AD conversion circuit 420, and the signal processing circuit 430, and it is possible to switch the channels 000 (001ch), 008 (008ch), and 009 (009ch) electrically connected to the coordinates (1, 1), (1, 2), (2, 1), and (2, 2) to be connected to one amplification circuit 415 (e.g., the amplification circuit 415 corresponding to the channel 000 (000ch)) using the switches included in the multiplexer 310.

In the driving method of the sensing device 10 according to the fifth embodiment, the same driving method can be used as in the driving method according to the first to third embodiments when the proximity sensor HS composed of four sensing electrodes 180 is changed to the proximity sensor HS composed of one sensing electrode 180.

In the sensing device 10 according to the fifth embodiment, the proximity sensor HS and the sensing electrode 180 correspond to each other 1:1, and the proximity sensor unit 124 is formed with high definition. Therefore, the sensing device 10 according to the fifth embodiment of the present invention can more accurately detect the coordinates of the sensing object 490 at the center and the four corners of the sensing device 10, as compared with the case where the configuration of the proximity sensor is rough.

6. Sixth Embodiment

Figure 37:
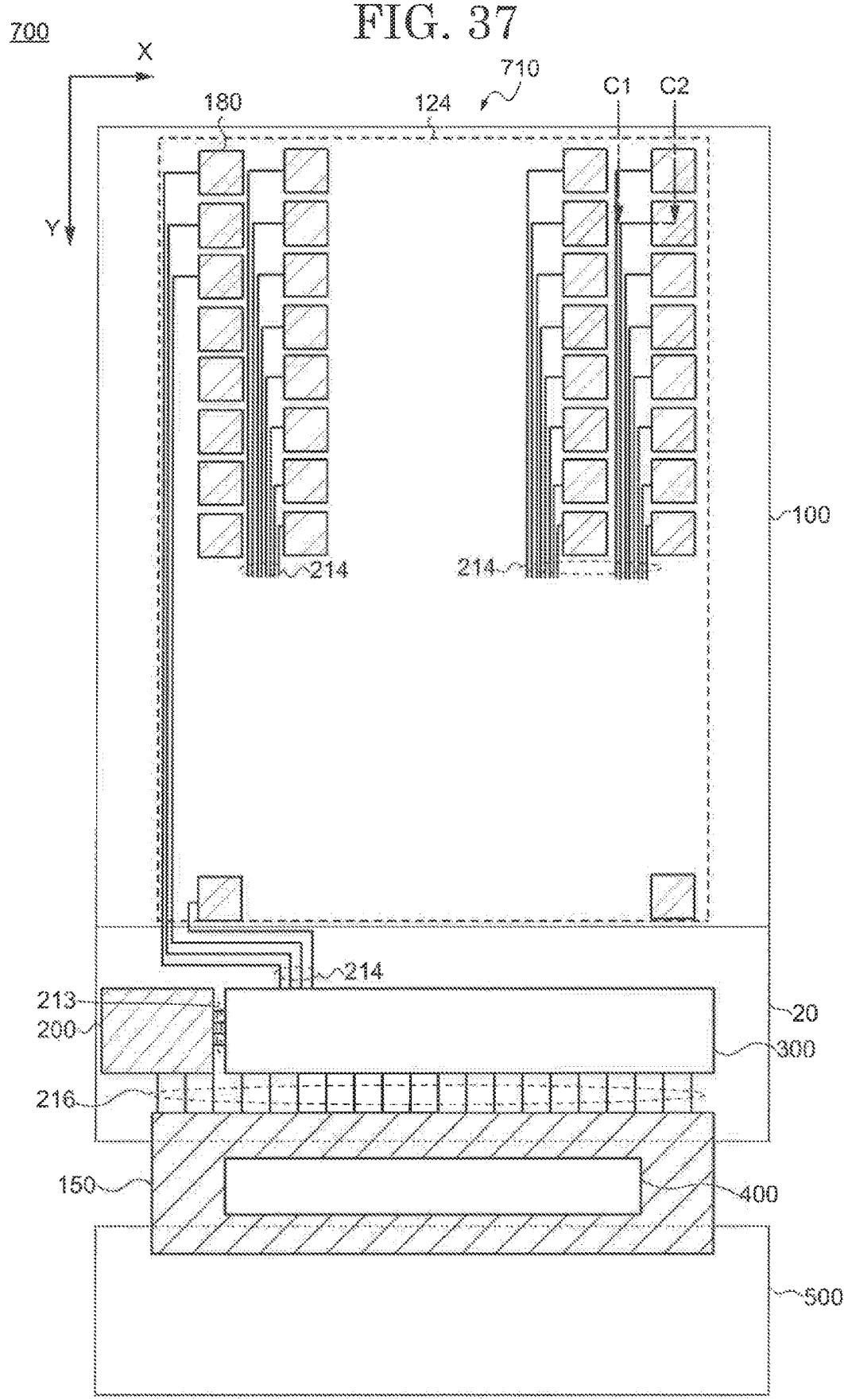
FIG. 37 is a schematic plan view showing a configuration of a sensing device according to the sixth embodiment of the present invention.
Figure 38:
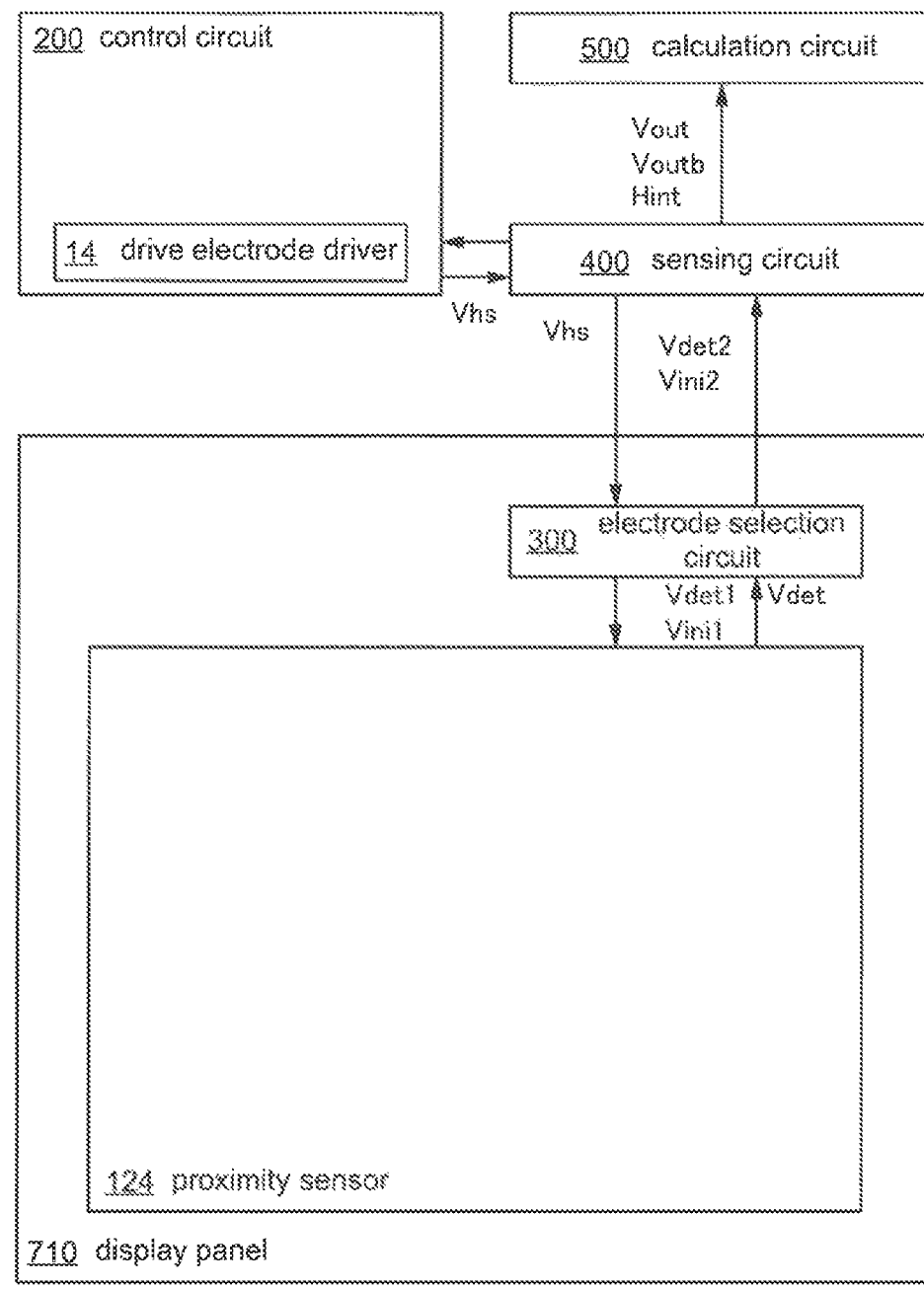
FIG. 38 is a plan view showing a functional configuration of a sensing device according to the sixth embodiment of the present invention.
Figure 39:
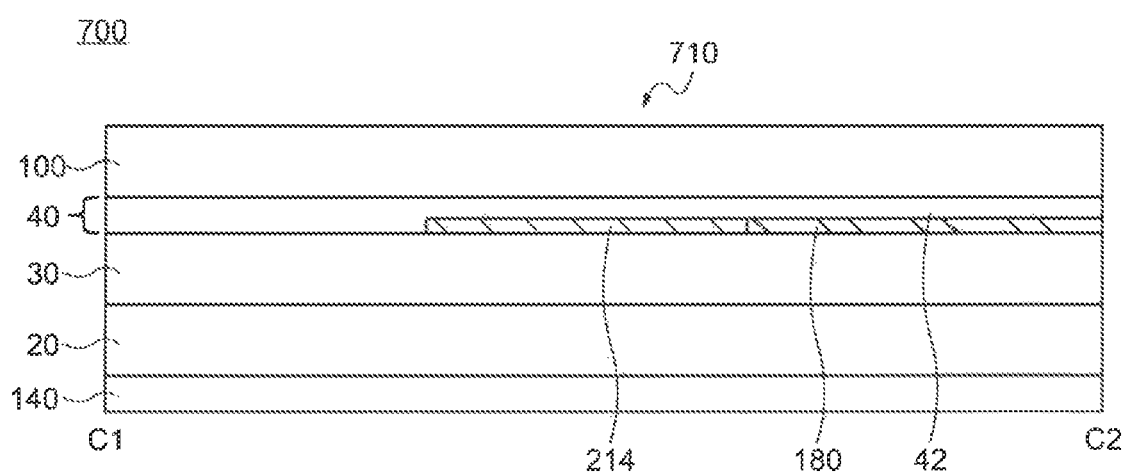
FIG. 39 is a schematic end portion cross-sectional view of a sensing device according to an embodiment of the present invention.

A sensing device 700 according to the sixth embodiment of the present invention does not include a configuration and a function related to display as compared with the sensing device 700 according to the first embodiment. Since other configurations and functions are the same as those of the sensing device 10 according to the first embodiment, descriptions thereof are omitted. FIG. 37 is a schematic plan view showing a configuration of the sensing device 700 according to the sixth embodiment. FIG. 38 is a plan view showing a functional configuration of the sensing device 700 according to the sixth embodiment. FIG. 39 is a schematic end portion cross-sectional view of the sensing device 700. The driving method of the sensing device 700 shown in FIG. 37 to FIG. 39 is an example, and the driving method of the sensing device 700 is not limited to the configuration shown in FIG. 37 to FIG. 39. The same or similar components as those of FIG. 1 to FIG. 36 will not be described here.

As shown in FIG. 37, the sensing device 700 includes the flexible printed substrate 150, the electrode selection circuit 300, the sensing circuit 400, the calculation circuit 500, and a sensing panel 710. The sensing panel 710 and the calculation circuit 500 are electrically connected using the flexible printed substrate 150. The sensing circuit 400 is provided on the flexible printed substrate 150.

The sensing panel 710 includes the substrate 20, a cover layer 100, the proximity sensor unit 124, the control circuit 200, the wiring 210, the wiring 212, the wiring 213, the wiring 214, the wiring 216, and the electrode selection circuit 300.

The sensing panel 710 has a configuration and a function that excludes the configuration and the function related to the display from the display panel 600 according to the first embodiment. In the sensing panel 710, since the configurations and functions other than the configurations and functions related to the display are the same as the display panel 600 according to the first embodiment, the descriptions thereof are omitted.

The cover layer 100 protects a sensing electrode layer 40 and suppresses breakage of the sensing electrode 180 and the inorganic film 42. The cover layer 100 is, for example, a cover glass. For example, the cover layer 100 and the sensing electrode layer 40 are bonded by a transparent adhesive layer (not shown) provided between the cover layer 100 and the sensing electrode layer 40. In the sensing panel 710 according to the sixth embodiment, although an example in which the cover layer 100 is provided is shown, the cover layer 100 is provided as necessary based on the use, specification, and the like of the sensing panel 710. The proximity sensor unit 124, the wiring 213, the wiring 214, and the wiring 216 are arranged on the substrate 20. The plurality of sensing electrodes 180 is arranged in a matrix in the lateral direction (row direction, X-direction) and the vertical direction (column direction, Y-direction) in the proximity sensor unit 124. Each of the plurality of sensing electrodes 180 is electrically connected to the electrode selection circuit 300 using the wiring 214.

As shown in FIG. 38, the control circuit 200 includes the drive electrode driver 14. The control circuit 200 has a configuration and a function that excludes the configuration and the function related to the gate driver 12 and the source driver 13 from the control circuit 200 according to the first embodiment. The drive electrode driver 14 is a circuit for supplying the control signal Vhs to the sensing electrode 180 of the sensing panel 710 via the electrode selection circuit 300.

The sensing device 700 has the configuration and functions of the same sensing electrode 180 as in the first embodiment, the configuration and functions of the proximity sensor HS, the configuration and functions of the electrode selection circuit 300, the configuration of the sensing circuit 400, and the configuration and functions of the calculation circuit 500. In addition, the sensing device 700 can execute the proximity sensing operation using the same driving method as the first embodiment.

FIG. 39 is a schematic end portion cross-sectional view of an area indicated by C1 and C2 shown in FIG. 37. The sensing panel 710 includes an electrode layer 140, the substrate 20, the TFT array layer 30, the sensing electrode layer 40, and the cover layer 100.

The electrode layer 140 is provided, with respect to the substrate 20, on the surface opposite to the surface on which the TFT array layer 30 is provided. The electrode layer 140 is electrically connected to the sensing circuit 400 and the calculation circuit 500 using, for example, a through electrode (not shown) formed on the substrate 20 or a flexible substrate (not shown). In the proximity sensing operation of the sensing device 700, when the sensing device 700 executes, for example, the same bundle scan 1 as in the first embodiment (FIG. 13), the AC square wave Vsig is supplied to the proximity sensor HSA (FIG. 13). The electrode layer 140 is supplied with the AC square wave Vsig similar to the proximity sensor HSA. The electrode layer 140 can shield a signal from outside of the sensing device 700, or an electric field, or the like. As a result, the sensing device 700 can accurately detect the position of the sensing object 490.

The TFT array layer 30 includes the plurality of transistors 170, the capacity element, the resistance element, and the wiring. The TFT array layer 30 is arranged on the substrate 20. The sensing electrode layer 40 includes the inorganic film 42, the sensing electrode 180, and the wiring 214. The sensing electrode layer 40 is arranged on the TFT array layer 30. The sensing electrode 180 and the wiring 214 are arranged in the same layer, and the sensing electrode 180 is connected to the wiring 214. The electrode selection circuit 300, the wiring 213, and the wiring 216 are formed using the TFT array layer 30 of the TFT array-side substrate, the connection wiring layer 50, and the transistors provided in the sensing electrode layer 40, capacitance, resistance, wiring, and the like. The cover layer 100 is provided above the sensing electrode layer 40.

Similar to the first embodiment, the sensing device 700 according to the sixth embodiment of the present invention can detect the contact state and the non-contact state between the sensing object 490 and the sensing surface 102 of the cover layer 100, calculate the coordinates of the sensing object 490, and accurately calculate the position of the sensing object 490.

Each of the embodiments described above as an embodiment of the present invention can be appropriately combined and implemented as long as no contradiction is caused.

It is understood that, even if the effect is different from those provided by each of the above-described embodiments of the sensing device and the driving method of the sensing device described above, the effect obvious from the description in the specification or easily predicted by persons ordinarily skilled in the art is apparently derived from the present disclosure.

What is claimed is:

1. A sensing device comprising:
   a plurality of sensing electrodes arranged in row and column directions to detect a close object;
   a plurality of wirings connected to each of the plurality of sensing electrodes;
   a sensing circuit connected to the plurality of wirings and detecting voltage values of the plurality of sensing electrodes in a plurality of sensing periods; and
   a calculation circuit connected to the sensing circuit and calculating a position of the close object in proximity using the voltage values detected by the sensing circuit;
   wherein
   the sensing circuit uses a set of sensing electrodes adjacent to each other in the row direction and the column direction as a sensing unit, sets the plurality of sensing periods consecutively, and changes the sensing electrodes included in the sensing unit to be different by one row or one column for each of the sensing periods,
   the set of sensing electrodes includes a first set of sensing electrodes, the first set of sensing electrodes includes a first electrode, a second electrode arranged in the column direction with respect to the first electrode, a third electrode arranged in the row direction intersecting the first electrode in the column direction, and a fourth electrode arranged in the row direction relative to the third electrode,
   the plurality of sensing periods includes
   a first sensing voltage sensing period,
   a second sensing voltage sensing period following the first sensing voltage sensing period,
   a third sensing voltage sensing period following the second sensing voltage sensing period, and
   a fourth sensing voltage sensing period following the third sensing voltage sensing period,
   the voltage values include:
   a first sensing voltage value detected from the first electrode, the second electrode, the third electrode and the fourth electrode during the first sensing voltage sensing period,
   a second sensing voltage value detected from at least the second electrode and the fourth electrode during the second sensing voltage sensing period,
   a third sensing voltage value detected from at least the third electrode and the fourth electrode during the third sensing voltage sensing period, and
   a fourth sensing voltage value detected from at least the fourth electrode during the fourth sensing voltage sensing period, and
   the calculation circuit is configured to calculate the position of the close object by using the first through fourth sensing voltage values.

2. The sensing device according to claim 1, wherein
   the sensing circuit is configured to detect the first initial voltage value using the first electrode, the second electrode, the third electrode and the fourth electrode in the first initial voltage sensing period before the first sensing voltage sensing period, and
   the calculation circuit is configured to calculate a difference value using the first initial voltage value and the first sensing voltage value, compares the difference value with a predetermined threshold value and judges whether or not the close object is in proximity.

3. The sensing device according to claim 2, wherein
   the calculation circuit is configured to judge that the close object is in proximity when the difference value is larger than the predetermined threshold value, and
   depending on the first sensing voltage value, in the second sensing voltage sensing period following the first sensing voltage sensing period, the calculation circuit is configured to judge whether or not to interrupt the sensing of the second sensing voltage value.

4. The sensing device according to claim 1, wherein
   the set of sensing electrodes includes a second set of sensing electrodes adjacent to the first set of sensing electrodes, the second set of sensing electrodes has:
   a fifth electrode arranged on the opposite side of the first electrode in the row direction with respect to the third electrode,
   a sixth electrode arranged in the row direction with respect to the fifth electrode and opposite to the second electrode in the row direction with respect to the fourth electrode,
   a seventh electrode arranged on the opposite side of the third electrode in the row direction with respect to the fifth electrode, and
   an eighth electrode arranged in the row direction opposite to the fourth electrode with respect to the sixth electrode and arranged in the column direction with respect to the seventh electrode.

5. The sensing device according to claim 4, wherein
   the voltage values include:
   a fifth sensing voltage value detected using the fifth electrode, the sixth electrode, the seventh electrode and the eighth electrode during the first sensing voltage sensing period,
   a sixth sensing voltage value detected using at least the sixth electrode and the eighth electrode during the second sensing voltage sensing period,
   a seventh sensing voltage value detected using at least the seventh electrode and the eighth electrode during the third sensing voltage sensing period, and the third sensing voltage is detected using the third electrode, the fourth electrode, the fifth electrode and the sixth electrode,
   the fourth sensing voltage value detected by using at least the fourth electrode and the sixth electrode during the fourth sensing voltage sensing period, and
   an eighth sensing voltage value detected using at least the eighth electrode during the fourth sensing voltage sensing period, and
   the calculation circuit is configured to calculate the position of the close object by using at least the first sensing voltage value and the fifth sensing voltage value.

6. The sensing device according to claim 5, wherein
   the calculation circuit is configured to calculate the position of the close object using the first sensing voltage value, the second sensing voltage value, the third sensing voltage value, the fourth sensing voltage value, the fifth sensing voltage value, the sixth sensing voltage value, the seventh sensing voltage value and the eighth sensing voltage value.

7. The sensing device according to claim 5, wherein
the sensing circuit is configured to detect the first initial voltage value using the first electrode, the second electrode, the third electrode and the fourth electrode, and to detect the fifth initial voltage value using the fifth electrode, the sixth electrode, the seventh electrode, and the eighth electrode, in the first initial voltage sensing period before the first sensing voltage sensing period, and
the calculation circuit is configured to calculate the first difference value using the first initial voltage value and the first sensing voltage value, to calculate the fifth difference value using the fifth initial voltage value and the fifth sensing voltage value, to compare a value obtained by adding the first difference value and the fifth difference value with a predetermined threshold value and to judge whether or not the close object is in close proximity.

8. The sensing device according to claim 7, wherein
when the value obtained by adding the first difference value and the fifth difference value is larger than the predetermined threshold value, the calculation circuit is configured to judge that the close object is in close proximity, and
depending on the first sensing voltage and the fifth sensing voltage, in the second sensing voltage sensing period following the first sensing voltage sensing period, the calculation circuit is configured to judge whether or not to interrupt the sensing of the second sensing voltage value.

9. A driving method of a sensing device,
the sensing device including a plurality of sensing electrodes arranged in row and column directions to detect a close object, a plurality of wirings connected to each of the plurality of sensing electrodes, a sensing circuit connected to the plurality of wirings and detecting the voltage of the plurality of sensing electrodes by a plurality of sensing periods, and a calculation circuit connected to the sensing circuit,
the method comprising:
detecting voltage values of the plurality of sensing electrodes using a set of sensing electrodes adjacent to each other in the row direction and the column direction among the plurality of sensing electrodes that is used as a sensing unit, in a plurality of sensing periods;
calculating a position of a close object using the detected voltages of the plurality of sensing electrodes;
setting the plurality of sensing periods consecutively; and
changing the sensing electrodes included in the sensing unit to be different by one row in the row direction or one column in the column direction for each of the sensing periods;
wherein
the set of sensing electrodes includes a first set of sensing electrodes, the first set of sensing electrodes includes a first electrode, a second electrode arranged in the column direction with respect to the first electrode, a third electrode arranged in the row direction intersecting the first electrode in the column direction, and a fourth electrode arranged in the row direction relative to the third electrode,
detecting a first sensing voltage value from the first electrode, the second electrode, the third electrode and the fourth electrode during the first sensing voltage sensing period,
detecting a second sensing voltage value from at least the second electrode and the fourth electrode during the second sensing voltage sensing period,
detecting a third sensing voltage value from at least the third electrode and the fourth electrode during the third sensing voltage sensing period,
detecting a fourth sensing voltage value from at least the fourth electrode during the fourth sensing voltage sensing period, and
calculating the position of the close object by using the first through fourth sensing voltage values.

10. The driving method according to claim 9, further comprising
detecting the first initial voltage value using the first electrode, the second electrode, the third electrode and the fourth electrode in the first initial voltage sensing period before the first sensing voltage sensing period, and
calculating a difference value using the first initial voltage value and the first sensing voltage value, comparing the difference value with a predetermined threshold value and judging whether or not the close object is in proximity.

11. The driving method according to claim 10, further comprising
judging that the close object is in close proximity when the difference value is larger than the predetermined threshold value, and
judging whether or not to interrupt the sensing of the second sensing voltage value depending on the first sensing voltage value in the second sensing voltage sensing period following the first sensing voltage sensing period.

12. The driving method according to claim 9, wherein
the set of sensing electrodes includes a second set of sensing electrodes, the second set of sensing electrodes has:
a fifth electrode arranged on the opposite side of the first electrode in the row direction with respect to the third electrode,
a sixth electrode arranged in the row direction with respect to the fifth electrode and opposite to the second electrode in the row direction with respect to the fourth electrode,
a seventh electrode arranged on the opposite side of the third electrode in the row direction with respect to the fifth electrode, and
an eighth electrode arranged in the row direction opposite to the fourth electrode with respect to the sixth electrode and arranged in the column direction with respect to the seventh electrode.

13. The driving method according to claim 12, further comprising
detecting a fifth sensing voltage value using the fifth electrode, the sixth electrode, the seventh electrode and the eighth electrode during the first sensing voltage sensing period,
detecting a sixth sensing voltage value using at least the sixth electrode and the eighth electrode during the second sensing voltage sensing period,
during the third sensing voltage sensing period, detecting the third sensing voltage value using the third electrode, the fourth electrode, the fifth electrode and the sixth electrode, and detecting a seventh sensing voltage value detected using at least the seventh electrode and the eighth electrode, detecting the fourth sensing voltage value using at least the fourth electrode and the sixth electrode during the fourth sensing voltage sensing period, detecting an eighth sensing voltage value using at least the eighth electrode during the fourth sensing voltage sensing period, and calculating the position of the close object using at least the first sensing voltage value and the fifth sensing voltage value.

14. The driving method according to claim 13, further comprising calculating the position of the close object using the first sensing voltage value, the second sensing voltage value, the third sensing voltage value, the fourth sensing voltage value, the fifth sensing voltage value, the sixth sensing voltage value, the seventh sensing voltage value and the eighth sensing voltage value.

15. The driving method according to claim 13, further comprising in the first initial voltage sensing period before the first sensing voltage sensing period, detecting the first initial voltage value using the first electrode, the second electrode, the third electrode and the fourth electrode, detecting the fifth initial voltage value using the fifth electrode, the sixth electrode, the seventh electrode, and the eighth electrode, calculating the first difference value using the first initial voltage value and the first sensing voltage value, calculating the fifth difference value using the fifth initial voltage value and the fifth sensing voltage value, comparing a value obtained by adding the first difference value and the fifth difference value with a predetermined threshold value, and judging whether or not the close object is in close proximity.

16. The driving method according to claim 15, further comprising when the value obtained by adding is larger than the predetermined threshold value, judging that the close object is in close proximity, and in the second sensing voltage sensing period following the first sensing voltage sensing period, depending on the first sensing voltage and the fifth sensing voltage, judging whether or not to interrupt the sensing of the second sensing voltage value.

* * * * *